United States Patent
Agari et al.

(10) Patent No.: US 9,244,575 B2
(45) Date of Patent: Jan. 26, 2016

(54) TOUCH SCREEN, TOUCH PANEL, AND DISPLAY DEVICE HAVING THE SAME

(71) Applicants: Masafumi Agari, Chiyoda-ku (JP);
Naoki Nakagawa, Chiyoda-ku (JP);
Takeshi Ono, Chiyoda-ku (JP);
Seiichiro Mori, Chiyoda-ku (JP);
Takashi Miyayama, Chiyoda-ku (JP);
Takuji Imamura, Chiyoda-ku (JP);
Tatsuya Nakamura, Chiyoda-ku (JP)

(72) Inventors: Masafumi Agari, Chiyoda-ku (JP);
Naoki Nakagawa, Chiyoda-ku (JP);
Takeshi Ono, Chiyoda-ku (JP);
Seiichiro Mori, Chiyoda-ku (JP);
Takashi Miyayama, Chiyoda-ku (JP);
Takuji Imamura, Chiyoda-ku (JP);
Tatsuya Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 13/633,420

(22) Filed: Oct. 2, 2012

(65) Prior Publication Data
US 2013/0082964 A1    Apr. 4, 2013

(30) Foreign Application Priority Data

Oct. 3, 2011 (JP) ................................. 2011-219234

(51) Int. Cl.
*G06F 3/041* (2006.01)
*G06F 3/044* (2006.01)

(52) U.S. Cl.
CPC ..................... *G06F 3/044* (2013.01)

(58) Field of Classification Search
CPC .................. G06F 3/041; G06F 3/044; G06F 2203/04111; G06F 2203/04112

USPC .................................................. 345/173–175
See application file for complete search history.

(56) References Cited

U.S. PATENT DOCUMENTS

| | | |
|---|---|---|
| 5,565,658 A | 10/1996 | Gerpheide et al. |
| 5,844,506 A | 12/1998 | Binstead |
| 6,137,427 A | 10/2000 | Binstead |
| 6,452,514 B1 | 9/2002 | Philipp |
| 8,259,086 B2 | 9/2012 | Agari et al. |
| 8,269,744 B2 | 9/2012 | Agari et al. |
| 2009/0002337 A1* | 1/2009 | Chang ........................... 345/174 |
| 2009/0084611 A1* | 4/2009 | Liao et al. .................. 178/18.03 |
| 2009/0315859 A1* | 12/2009 | Chien et al. ..................... 345/175 |
| 2010/0007621 A1* | 1/2010 | Kang et al. ..................... 345/173 |
| 2010/0060602 A1* | 3/2010 | Agari et al. ..................... 345/173 |
| 2010/0309164 A1* | 12/2010 | Yeh et al. ....................... 345/174 |
| 2012/0293457 A1 | 11/2012 | Agari et al. |

FOREIGN PATENT DOCUMENTS

| | | |
|---|---|---|
| JP | 9-511086 | 11/1997 |
| JP | 11-505641 | 5/1999 |

(Continued)

*Primary Examiner* — Kent Chang
*Assistant Examiner* — Mark Edwards
(74) *Attorney, Agent, or Firm* — Oblon, McClelland, Maier & Neustadt, L.L.P.

(57) ABSTRACT

A touch screen includes a base substrate, a bundle of rectangular wirings in a column direction including a plurality of detection column wirings that are electrically connected in common, and a bundle of rectangular wirings in a row direction including a plurality of detection row wirings that are electrically connected in common, the bundle of wirings being formed on the base substrate. Also, a plurality of block areas obtained by dividing an intersection area in which the bundle of wirings in the column direction and the bundle of wirings in the row direction intersect in a plan view are defined, and only the detection column wiring or only the detection row wiring is provided in each of the block areas.

39 Claims, 32 Drawing Sheets

(56) References Cited

FOREIGN PATENT DOCUMENTS

| JP | 2003-526831 | 9/2003 |
| JP | 2009-9574 | 1/2009 |
| JP | 2010-61502 | 3/2010 |
| JP | 2010-97536 | 4/2010 |
| JP | 2011-175412 | 9/2011 |
| WO | WO 95/27334 A1 | 10/1995 |
| WO | WO 96/18179 A1 | 6/1996 |
| WO | WO 00/44018 A1 | 7/2000 |

* cited by examiner

F I G . 1
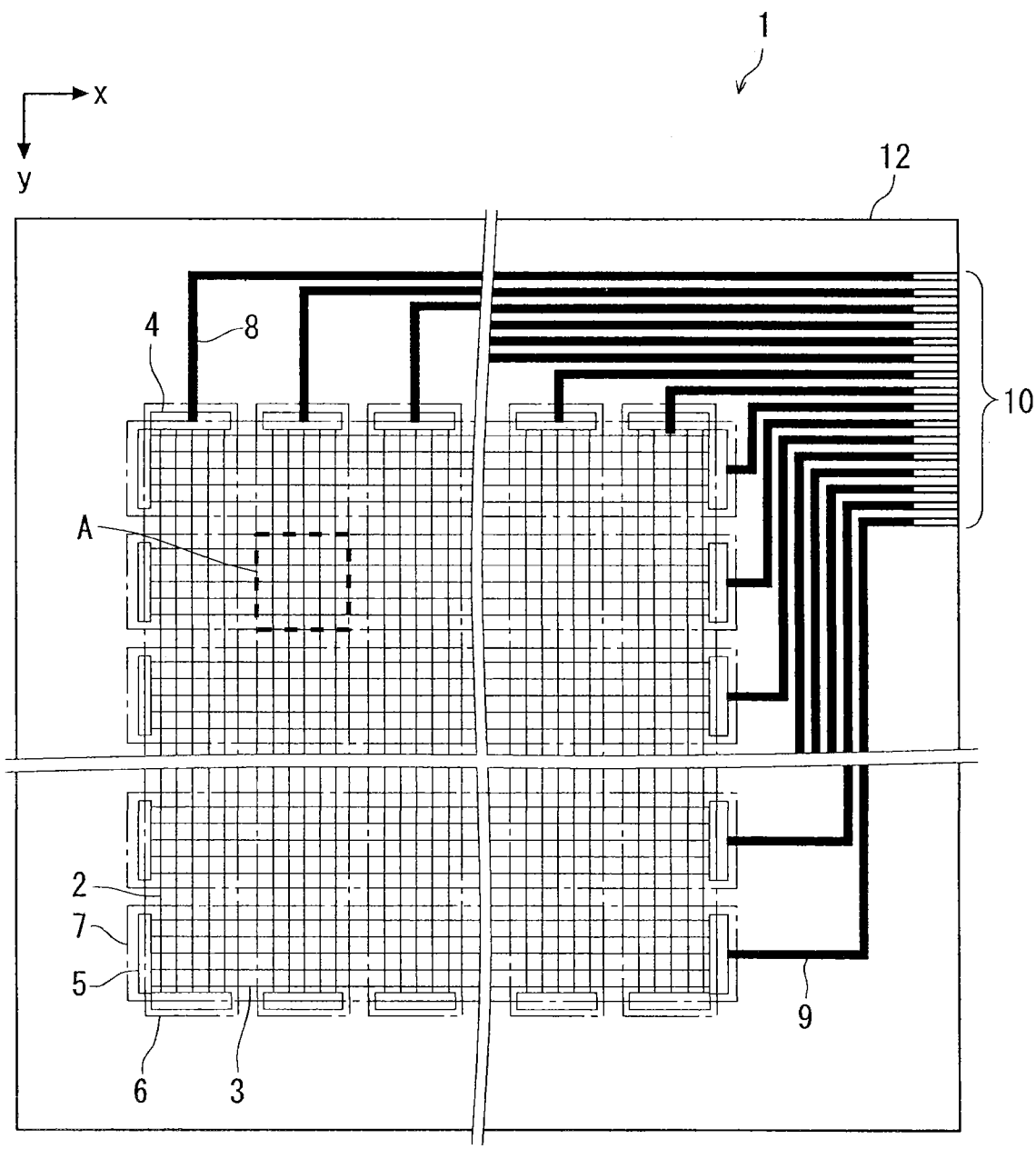

F I G . 2
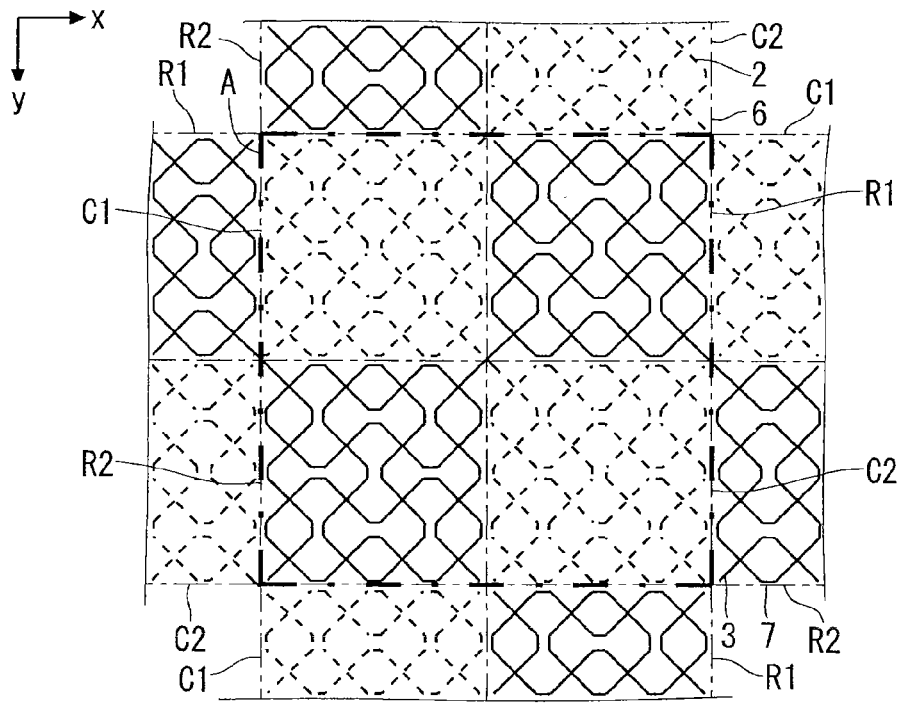
F I G . 3
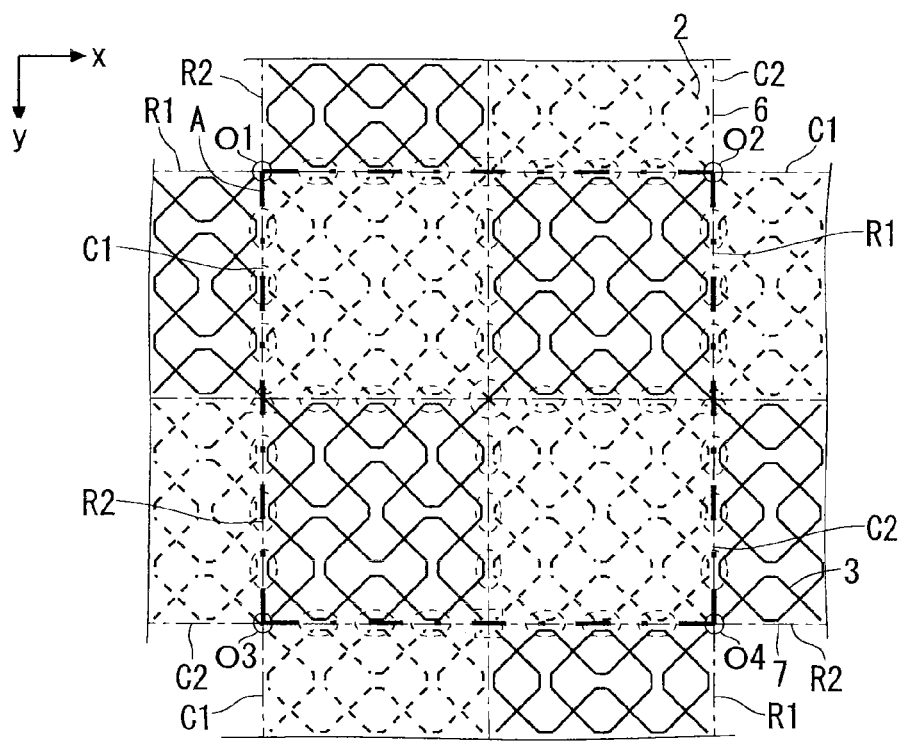

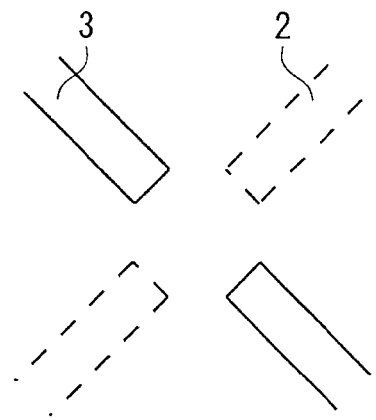
F I G. 7 A
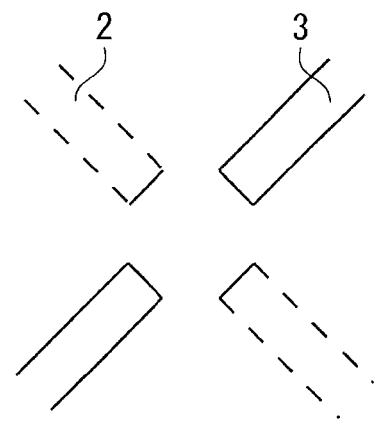
F I G. 7 B
F I G. 8
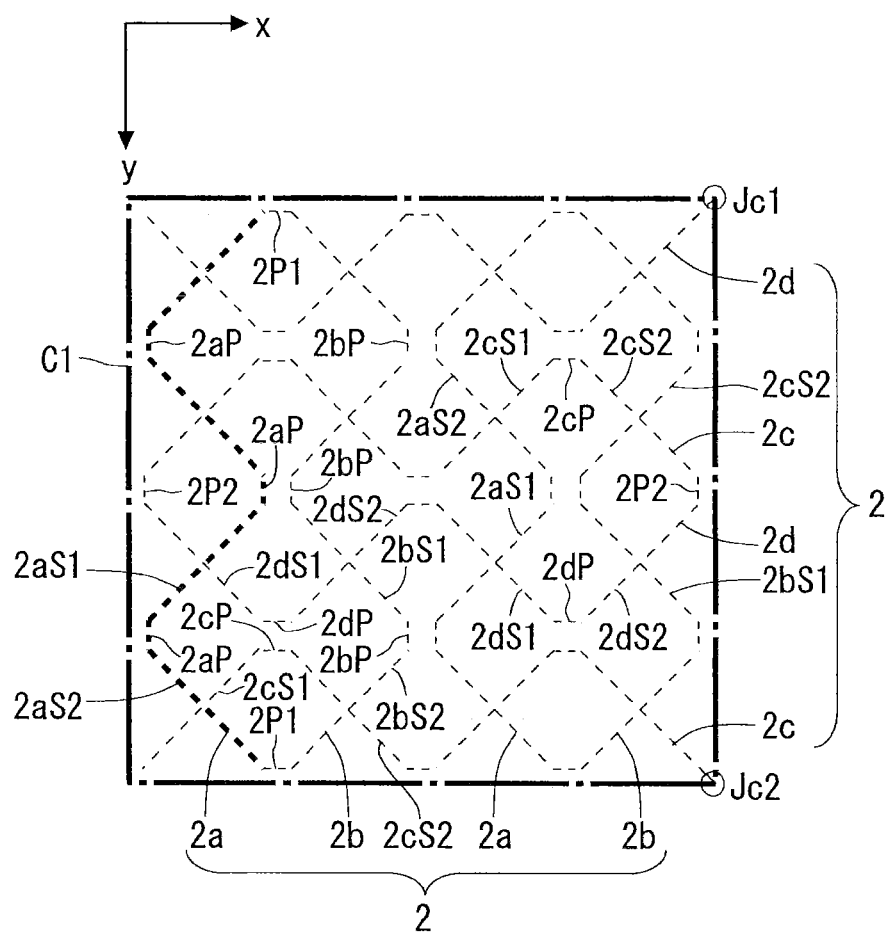

F I G . 9
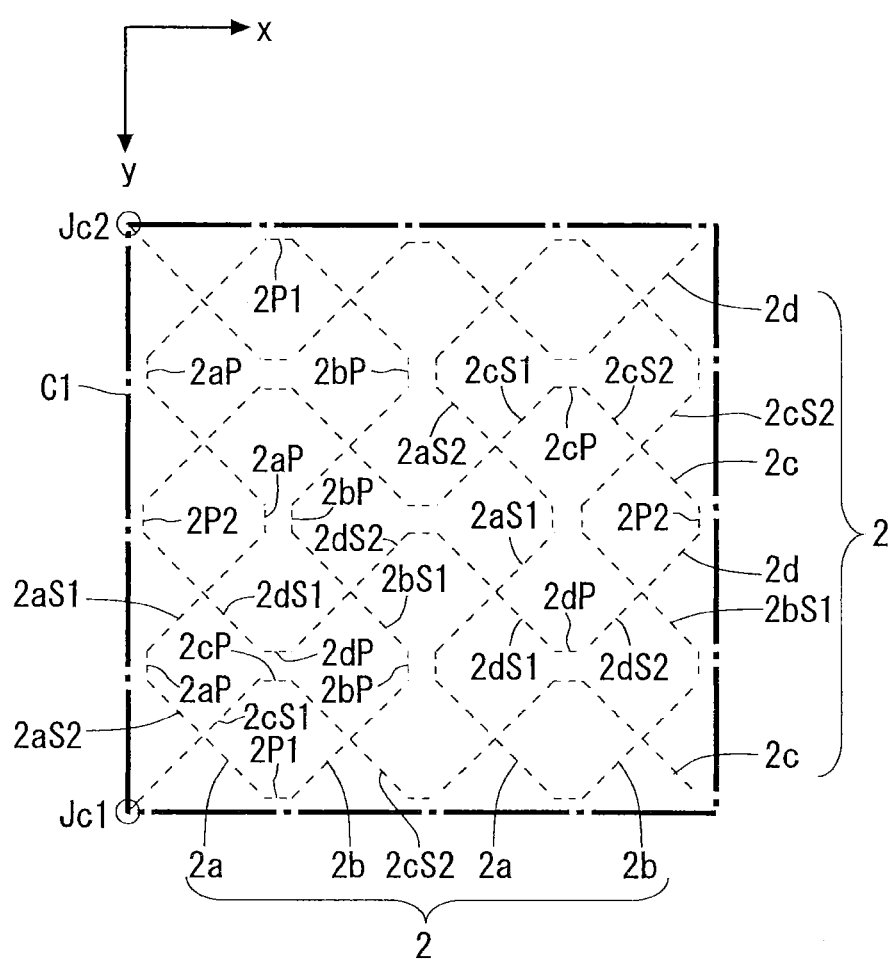

F I G. 1 0
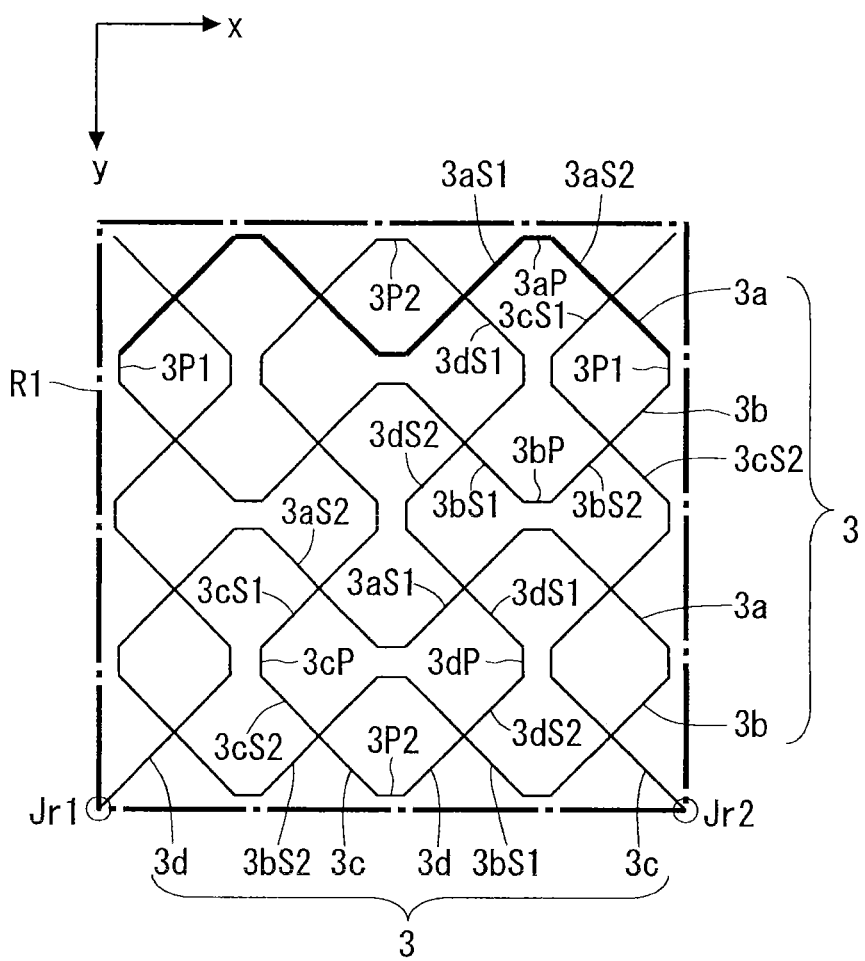

F I G. 1 4
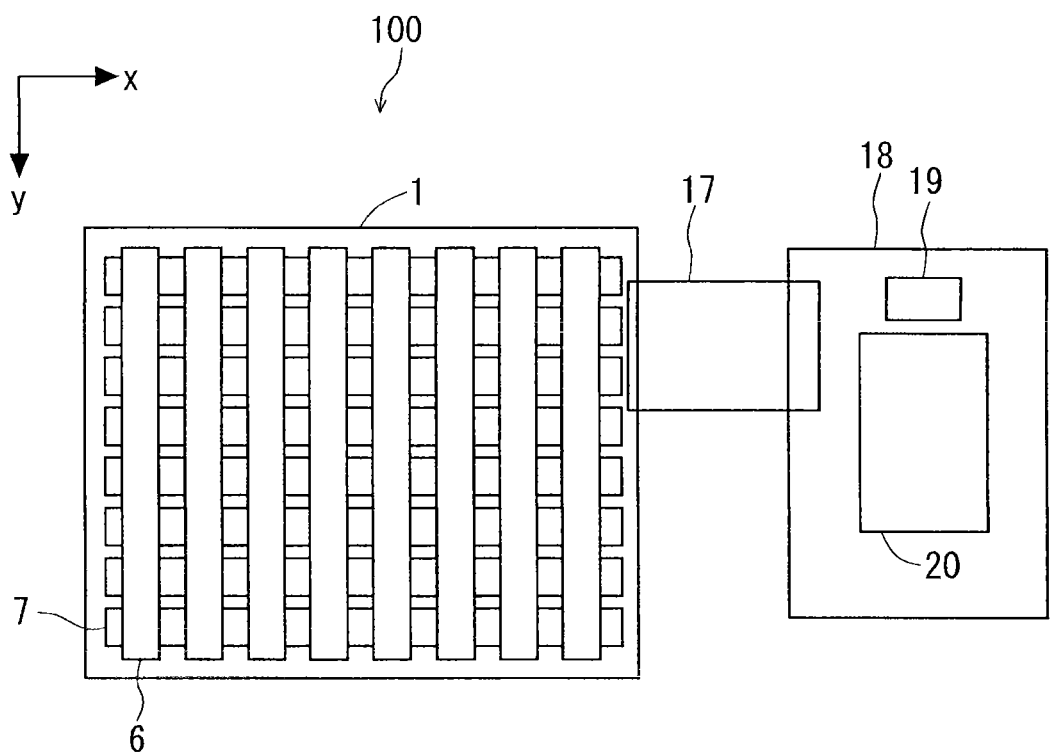

F I G . 1 9
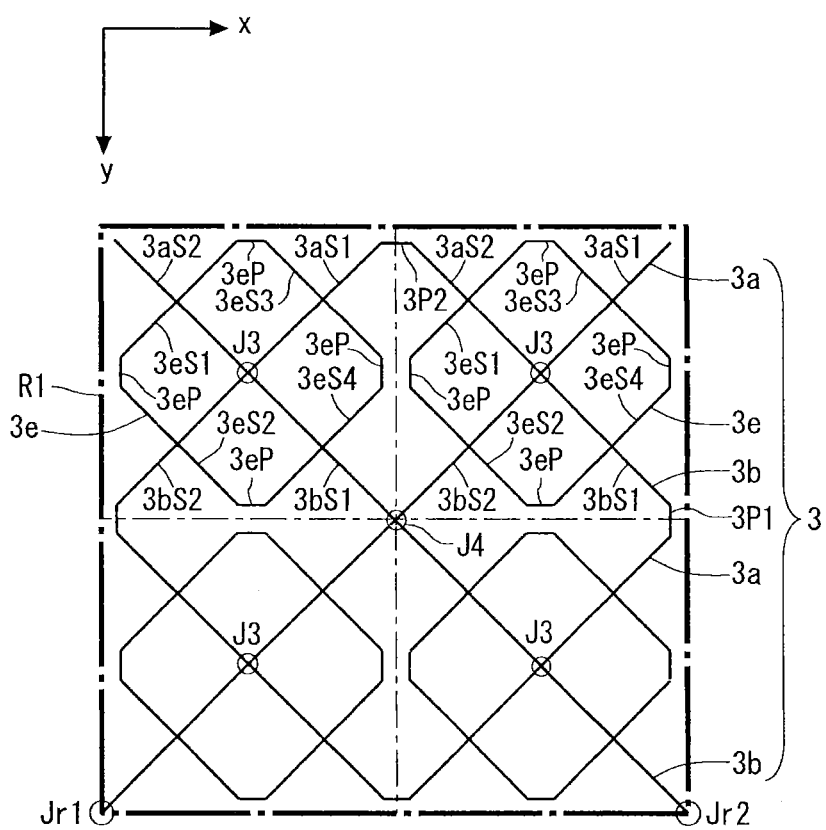

F I G . 2 0
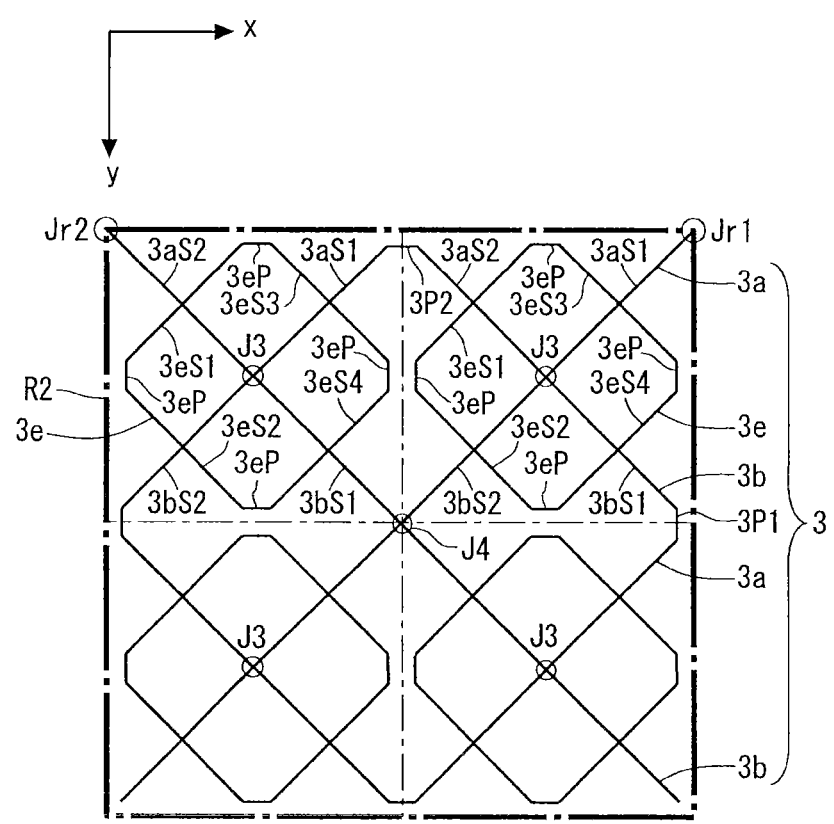

F I G . 2 6
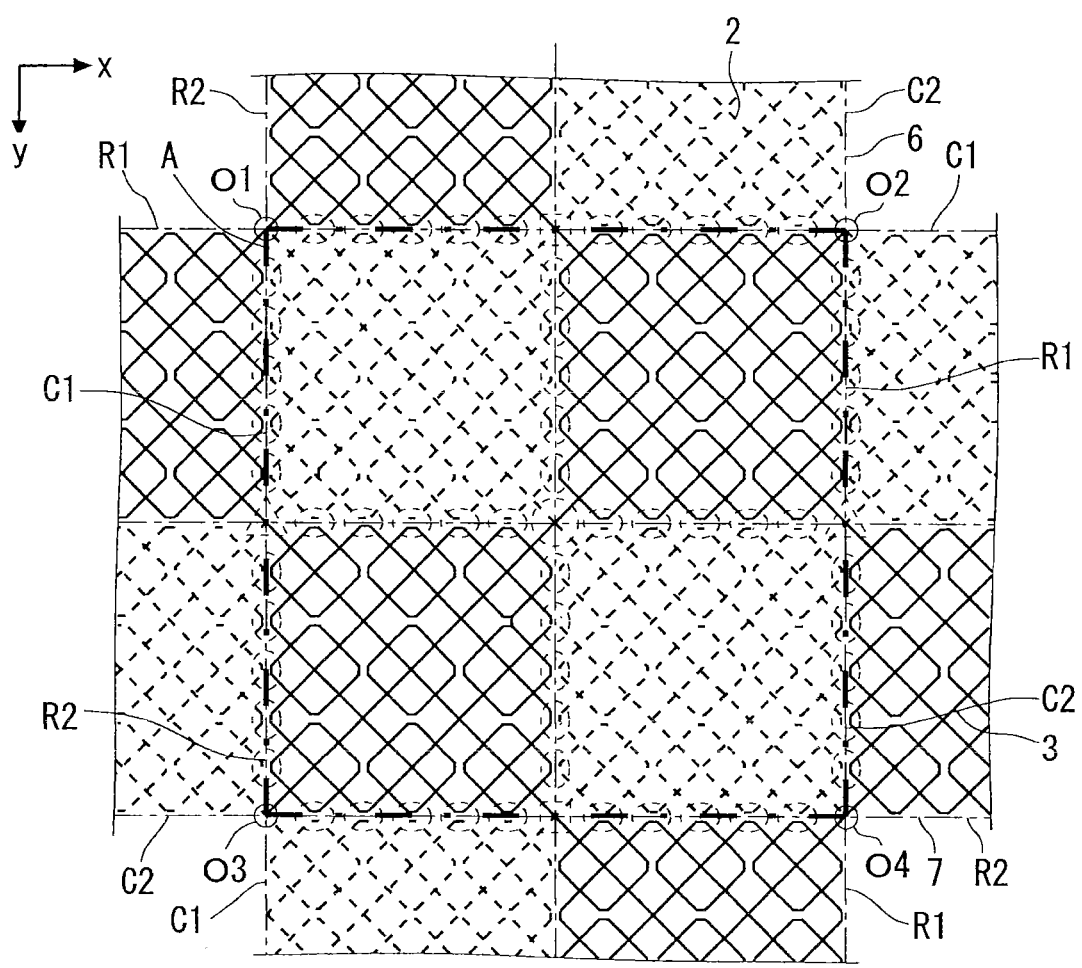

F I G . 2 9
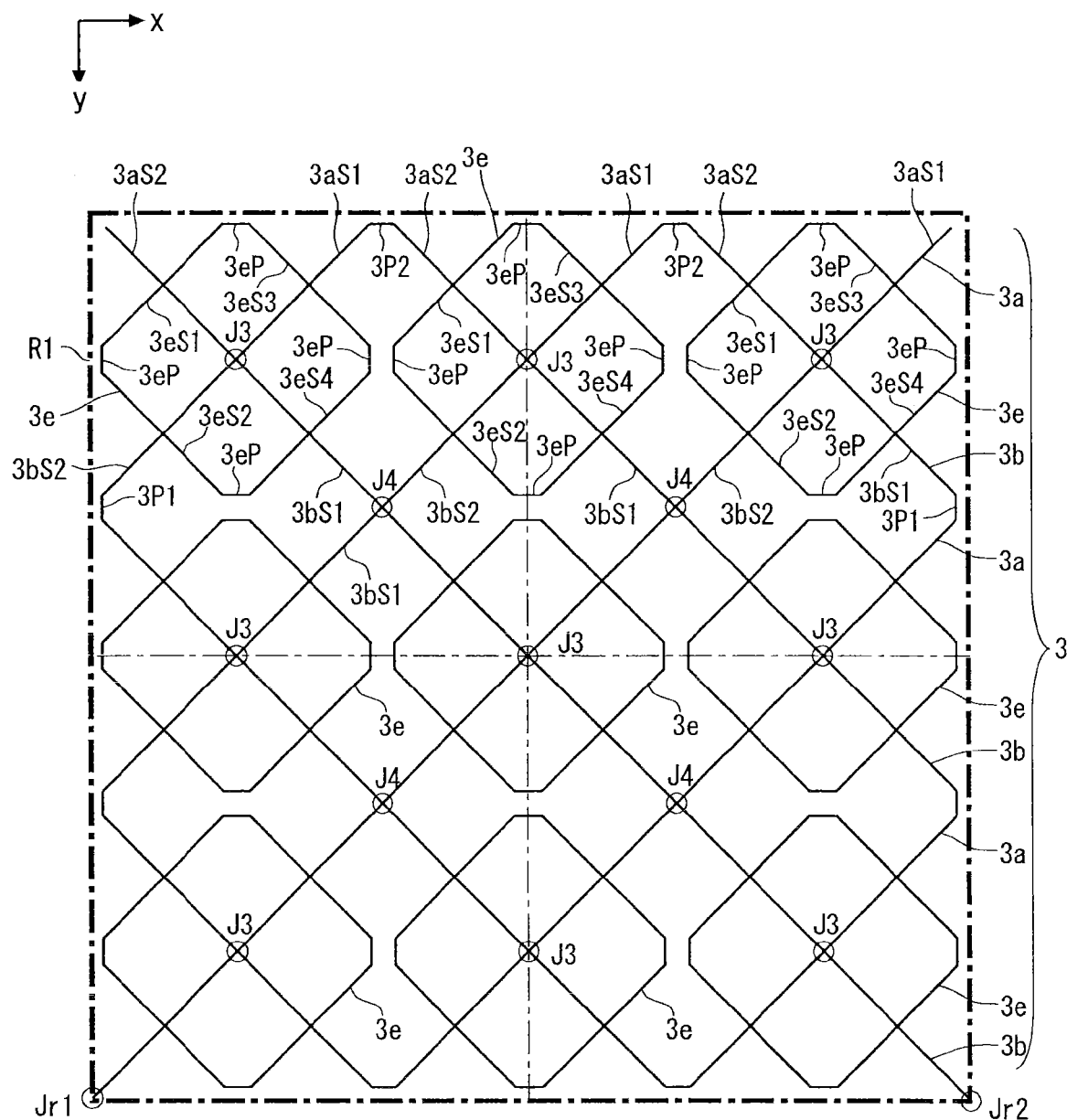

F I G . 3 7
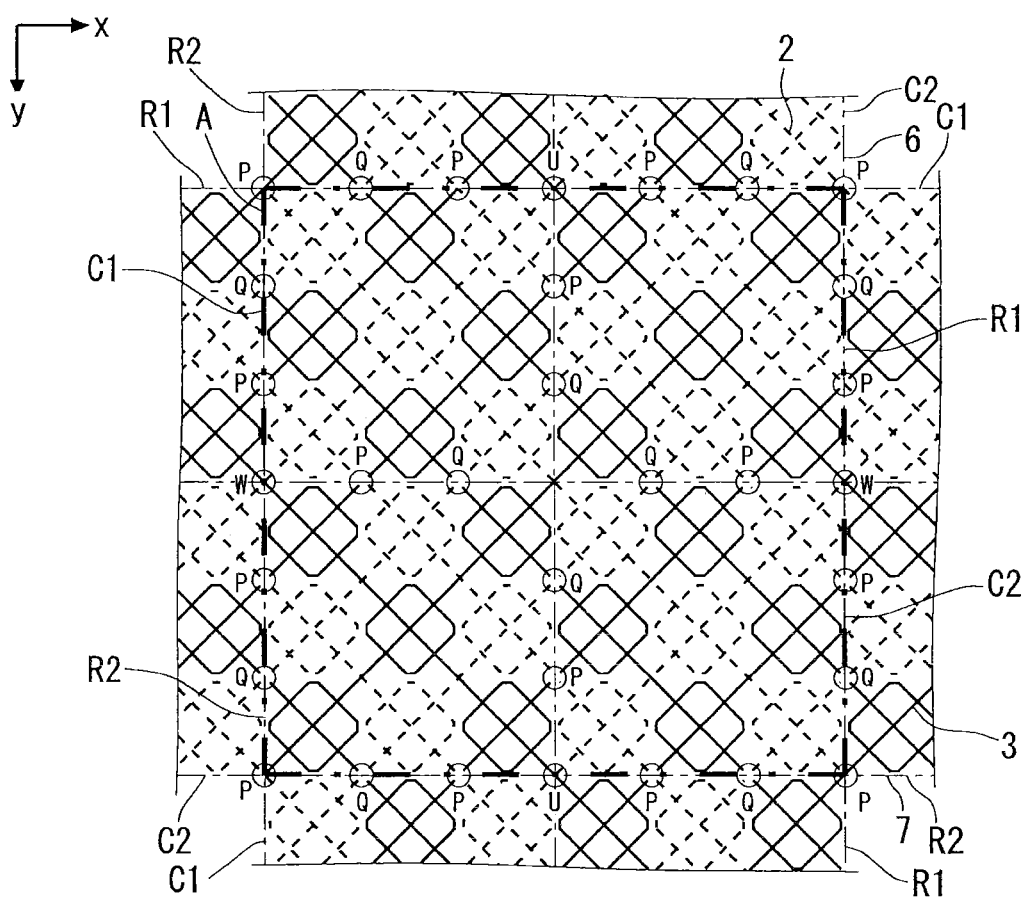

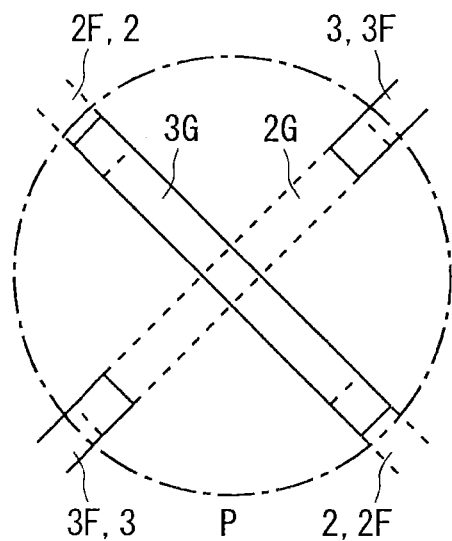
F I G. 3 8 A
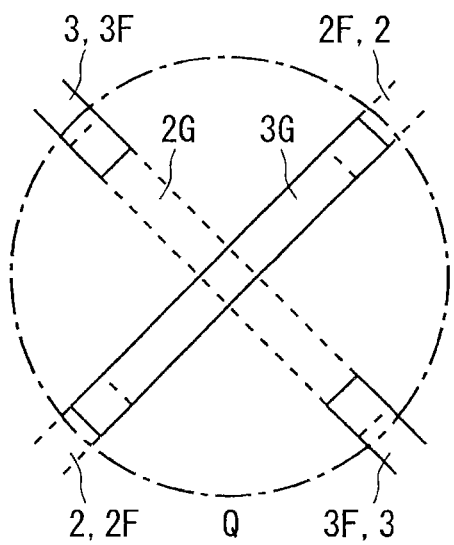
F I G. 3 8 B
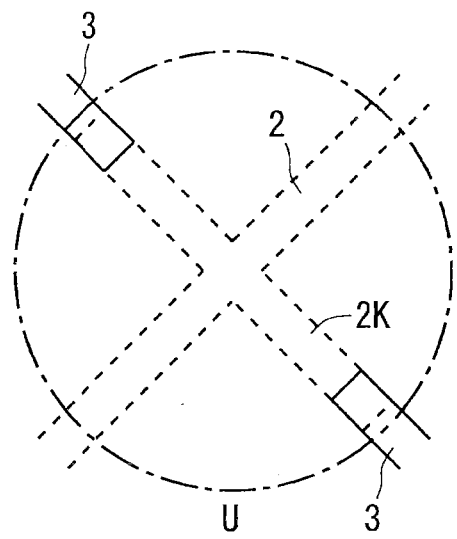
F I G. 3 8 C
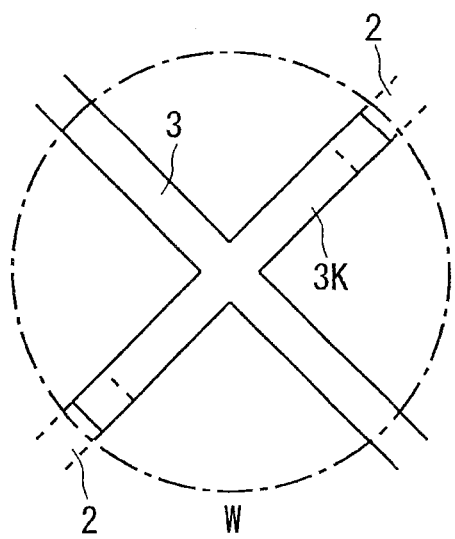
F I G. 3 8 D

TOUCH SCREEN, TOUCH PANEL, AND DISPLAY DEVICE HAVING THE SAME

BACKGROUND OF THE INVENTION

1. Field of the Invention

The present invention relates to a touch screen, a touch panel, and a display device having the same.

2. Description of the Background Art

In related art, a touch panel that detects touch of a pointer such as a finger and specifies coordinates of a touch position has attracted attention as excellent interface means. In this touch panel, various schemes such as a resistive scheme and a capacitive scheme have been discussed and commercialized.

As a type of touch panel using the capacitive scheme, a touch panel using a projected capacitive scheme discussed in Japanese Patent Application Laid-Open (Translation of PCT Application) No. 9-511086 (1997) is known. In the touch panel of the projected capacitive scheme, even when a front side of a touch screen having a touch sensor embedded therein is covered with a protective plate such as a glass plate having a thickness of a few mm, touch of, for example, a finger to the protective plate can be detected. Such a touch screen has excellent robustness, touch can be detected even when a user wears a glove, and the touch screen has a long life with no movable parts, and thus various technologies have been proposed based on these advantages.

For example, a touch screen constituting the touch panel discussed in Japanese Patent Application Laid-Open (Translation of PCT Application) No. 9-511086 (1997) includes a first series of conductor elements formed of a thin conductive film, and a second series of conductor elements formed on the first series of conductor elements via an insulating film, as detection wirings (detection electrodes) for detecting capacitance. Further, a plurality of intersections are formed without electrical contact between the conductor elements. According to technology discussed in Japanese Patent Application Laid-Open (Translation of PCT Application) No. 9-511086 (1997), capacitance formed between a pointer, such as a finger, and the conductor element, which is the detection wiring, is detected by a detection circuit, so that position coordinates of a position touched by the pointer can be specified. Further, a touch position between the conductor elements can be interpolated by relative values of detected capacitances of one or more conductor elements.

A touch screen constituting a touch panel discussed in Japanese Patent Application Laid-Open No. 2010-61502 includes detection column wirings and detection row wirings, and each of the wirings is formed as a metal wiring having a zigzag pattern in which the wiring is repeats a zigzag shape with inclined portions inclined at 45° in column and row directions. According to the technology discussed in Japanese Patent Application Laid-Open No. 2010-61502, high wiring density can be obtained and touch detection sensitivity can be improved without increasing parasitic capacitance between the detection wirings.

A touch screen constituting a touch panel discussed in Japanese Patent Application Laid-Open No. 2010-97536 includes detection column wirings and detection row wirings formed in a zigzag pattern, similar to the touch screen of Japanese Patent Application Laid-Open No. 2010-61502, and a wiring between the detection column wiring and the detection row wiring.

In Japanese Patent Application Laid-Open (Translation of PCT Application) No. 2003-526831, a detection scheme generally called a mutual-capacitance detection scheme has been discussed. Specifically, a key matrix discussed in Japanese Patent Application Laid-Open (Translation of PCT Application) No. 2003-526831 includes an array of a plurality of driving/receiving electrode pairs, and detects, as a charge amount, a change in coupling capacitance (mutual electrode capacitance) according to an electric field change between electrodes generated due to contact of a pointer, such as a finger, with a substrate.

A capacitance-based touch detection device discussed in Japanese Patent Application Laid-Open (Translation of PCT Application) No. 11-505641 (1999) includes an electrode array including an X electrode and a Y electrode. Mutual-capacitance between the X electrode and the Y electrode is detected by a capacitance measurement circuit. Also, an output voltage change indicating the measured capacitance is determined according to the mutual-capacitance, known reference capacitance, and a known driving voltage change.

According to the technologies discussed in Japanese Patent Application Laid-Open No. 2010-61502 and Japanese Patent Application Laid-Open No. 2010-97536 described above, high wiring density can be obtained without increasing inter-wiring capacitance (hereinafter, "capacitance between row and column wirings") formed between the detection column wiring and the detection row wiring. Further, the detection wirings arranged in a rectangular shape have advantages such as an easy coordinate interpolation process based on a detection result or high linearity of coordinates obtained by the interpolation process (particularly, in an oblique direction), as compared to detection wirings arranged in a diamond chain shape.

Meanwhile, capacitance between row and column wirings changed according to presence or absence of touch of a pointer, such as a finger, to a touch screen is closely related to detection sensitivity depending on detection methods. For example, according to the mutual-capacitance detection scheme discussed in Japanese Patent Application Laid-Open (Translation of PCT Application) No. 2003-526831, a high change in the capacitance between row and column wirings (a change in an electric field between electrodes) according to the touch of the pointer, such as the finger, can provide high detection sensitivity.

However, for example, in a configuration in which capacitance (electric field coupling) between a bundle of wirings in a column direction and a bundle of wirings in a row direction is high, like a configuration in which the detection method discussed in Japanese Patent Application Laid-Open No. 2010-97536 is applied to the touch screen discussed in Japanese Patent Application Laid-Open No. 2010-61502, it is difficult for a change in an electric field between the detection column wiring and the detection row wiring according to touch of the pointer, such as a finger, i.e., a change in capacitance between row and column wirings, to occur. Accordingly, when the mutual-capacitance detection scheme is applied in such a configuration, the touch detection sensitivity is low.

SUMMARY OF THE INVENTION

An object of the present invention is to provide technology capable of reducing capacitance between a bundle of wirings in a column direction and a bundle of wirings in a row direction.

The present invention provides a touch screen including a transparent substrate, a bundle of rectangular wirings in the column direction including a plurality of detection column wirings that are electrically connected in common, and a bundle of rectangular wirings in the row direction including a plurality of detection row wirings that are electrically connected in common, the bundle of wirings being formed on the transparent substrate. A plurality of block areas obtained by dividing an intersection area in which the bundle of wirings in the column direction and the bundle of wirings in the row direction intersect in a plan view are defined, and only the detection column wiring or only the detection row wiring is provided in each block area.

It is possible to reduce the number of intersection places between the detection column wiring and the detection row wiring. Accordingly, it is possible to reduce inter-wiring capacitance between the bundle of wirings in the column direction and the bundle of wirings in the row direction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view illustrating a configuration of a touch screen according to a first preferred embodiment;

FIGS. 2 and 3, FIGS. 4A and 4B, FIGS. 5A and 5B, FIGS. 6A and 6B, FIGS. 7A and 7B, and FIGS. 8 to 11 are enlarged plan views each illustrating the configuration of the touch screen according to the first preferred embodiment;

FIG. 14 is a diagram illustrating the configuration of the touch panel according to the first preferred embodiment;

FIGS. 15 to 23 are enlarged plan views each illustrating a configuration of a touch screen according to a second preferred embodiment;

FIGS. 25 to 30 are enlarged plan views each illustrating a configuration of a touch screen according to a third preferred embodiment;

FIG. 37 and FIGS. 38A to 38D are enlarged plan views each illustrating a configuration of a touch screen according to a fifth preferred embodiment;

DESCRIPTION OF THE PREFERRED EMBODIMENTS

First Preferred Embodiment

Figure 4A:
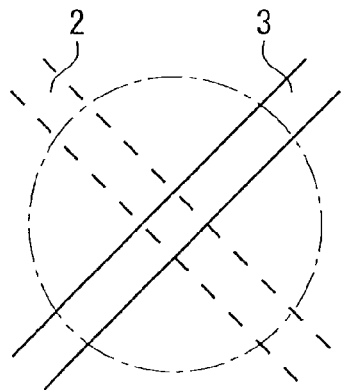

FIG. 1 is a plan view schematically illustrating a configuration of a touch screen 1 included in a touch panel according to a first preferred embodiment of the present invention. Hereinafter, the configuration of the touch screen 1 according to the present preferred embodiment will be described with reference to, for example, FIG. 1. Further, reference numerals assigned to components described in the present preferred embodiment are assigned to components of second and third preferred embodiments that are the same or similar to such components.

As illustrated in FIG. 1, the touch screen 1 includes a base substrate 12 that is a transparent substrate formed of a transparent glass material or transparent resin, (1) a plurality of detection column wirings 2 extending in a column direction (corresponding to a y direction in FIG. 1), and (2) a plurality of detection row wirings 3 extending in a row direction (corresponding to an x direction in FIG. 1). Also, the plurality of detection column wirings 2 and the plurality of detection row wirings 3 are formed on the base substrate 12. While the detection column wirings 2 and the detection row wirings 3 are shown as straight lines in FIG. 1 for convenience of illustration, in fact, the detection column wirings 2 and the detection row wirings 3 have a zigzag shape, as illustrated in, for example, FIG. 2.

The plurality of detection column wirings 2 are electrically connected in common by a connection wiring 4. Also, in the present preferred embodiment, the plurality of detection column wirings 2 that are electrically connected in common are included in a bundle of rectangular wirings 6 in the column direction extending in the column direction y. That is, the bundle of wirings 6 in the column direction includes the plurality of detection column wirings 2 that are electrically connected in common. Further, while the detection column wiring 2 is described above as extending in the column direction y, the present invention is not limited thereto and the detection column wiring 2 may be a wiring not extending in the column direction y. A wiring is referred to as the detection column wiring 2 as long as the wiring constitutes the bundle of wirings 6 in the column direction.

Similarly, the plurality of detection row wirings 3 are electrically connected in common by a connection wiring 5. Also, in the present preferred embodiment, the plurality of detection row wirings 3 that are electrically connected in common are included in a bundle of rectangular wirings 7 in a row direction extending in the row direction x. That is, the bundle of wirings 7 in the row direction includes a plurality of detection row wirings 3 that are electrically connected in common. Further, while the detection row wiring 3 is described above as extending in the row direction x, the present invention is not limited thereto and the detection row wiring 3 may be a wiring not extending in the row direction x. A wiring is referred to as the detection row wiring 3 as long as the wiring constitutes the bundle of wirings 7 in the row direction.

As illustrated in FIG. 1, the plurality of bundles of wirings 6 in the column direction and the plurality of bundles of wirings 7 in the row direction are arranged in parallel to the row direction x and the column direction y, respectively, and arranged in a matrix shape. Further, the numbers of the bundle of wirings 6 in the column direction and the bundle of wirings 7 in the row direction, the number of detection column wirings 2 constituting each bundle of wirings 6 in the column direction, and the number of detection row wirings 3 constituting each bundle of wirings 7 in the row direction are appropriately selected and set according to required resolution of a position (a touch coordinate value) of touch of a pointer, such as a finger, to the touch panel.

The bundle of wirings 6 in the column direction and the bundle of wirings 7 in the row direction are connected to terminals 10 provided in an end part of the base substrate 12 by pull-out wirings 8 and 9, respectively. Further, here, each of the pull-out wirings 8 and 9 is drawn as one wiring for convenience of illustration, but one pull-out wiring 8 may be arranged for each of the detection column wirings 2 constituting the bundle of wirings 6 in the column direction and one pull-out wiring 9 may be arranged for each of the detection row wirings 3 constituting the bundle of wirings 7 in the row direction.

In the touch screen 1 configured as described above, it is possible to increase wiring density of the detection column wirings 2 and the detection row wirings 3. Accordingly, in a detection scheme for detecting capacitance (touch capacitance) formed between the pointer and each of the bundle of wirings 6 in the column direction and the bundle of wirings 7 in the row direction (generally referred to as a self-capacitance detection scheme), it is possible to increase touch capacitance to be detected.

Next, a configuration of the bundle of wirings 6 in the column direction and the bundle of wirings 7 in the row direction will be described in detail.

FIG. 2 is an enlarged view illustrating an area in which the bundle of rectangular wirings 6 in the column direction and the bundle of rectangular wirings 7 in the row direction intersect in a plan view. More specifically, the vicinity of the intersection area A indicated by a thick dotted line in FIG. 1 is enlarged. Further, in the following description, this intersection area A is referred to as "grid A." Further, in drawings described below, the detection column wiring 2 is indicated by a dotted line, and the detection row wiring 3 is indicated by a solid line.

In the touch screen 1 according to the preferred embodiment, a plurality of (here, 4) rectangular block areas C1, C2, R1, and R2 indicated by a thin alternate long and short dash line, which are obtained by dividing the intersection area A (grid A) indicated by a thick alternate long and short dash line in FIG. 2, are defined. Also, only the detection row wiring 2 indicated by thin dotted lines is provided in each of the block areas C1 and C2 (first block areas), and only the detection row wiring 3 indicated by a thin solid line is provided in each of the block areas R1 and R2 (second block areas).

Here, in the grid A, the block area C1 is arranged at an upper left side (a negative x side and a negative y side), the block area C2 is arranged at a lower right side (a positive x side and a positive y side), the block area R1 is arranged at an upper right side (the positive x side and the negative y side), and the block area R2 is arranged at a lower left side (the negative x side and the positive y side).

In the present preferred embodiment, the block areas C1, C2, R1, and R2 are defined over the bundle of wirings 6 in the column direction and the bundle of wirings 7 in the row direction. That is, the block areas C1 and C2 (the first block areas) in which only the detection column wirings 2 are provided and the block areas R1 and R2 (the second block areas) in which only the detection row wirings 3 are provided are alternately arranged in the column direction y and the row direction x as a whole, and form a checker pattern.

Further, in the present preferred embodiment, one detection column wiring 2 that diagonally connects between the block areas C1 and C2 that are diagonally adjacent and one detection row wiring 3 that diagonally connects between the block areas R1 and R2 that are diagonally adjacent in a complementary manner with the block areas C1 and C2 intersect three-dimensionally in one grid A. Also, in the grid A, the three-dimensional intersection between the detection column wiring 2 and the detection row wiring 3 is included only at one dotted circle (one place at which the block areas C1, C2, R1 and R2 contact) in FIG. 3. This will be described in detail below.

Figure 4B:
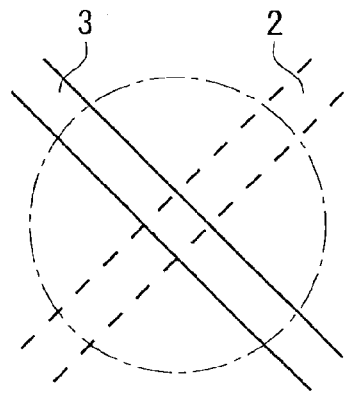

FIGS. 4A and 4B are enlarged views of the dotted circle in FIG. 3. Further, when the touch screen 1 has a configuration as illustrated in FIG. 3, the touch screen 1 is configured as an arrangement illustrated in FIG. 4A. It is understood that the touch screen 1 may be configured as an arrangement illustrated in FIG. 4B (the same applies to FIGS. 5A to 7B, which will be described below). At the dotted circle, one detection column wiring 2 in the block area C1 and one detection column wiring 2 in the block area C2 are coupled and one detection row wiring 3 in the block area R1 and one detection row wiring 3 in the block area R2 are coupled, as illustrated in FIGS. 4A and 4B.

Next, dotted triangles in FIG. 3, i.e., places at which the block areas C1 and R2 of the grid A and the block areas R1 and C2 adjacent to a left side (a negative x side) of the block areas C1 and R2 contact, and places at which the block areas C2 and R1 of the grid A and the block areas R2 and C1 adjacent to a right side (a positive x side) of the block areas C2 and R1 contact will be described.

Figure 5A:
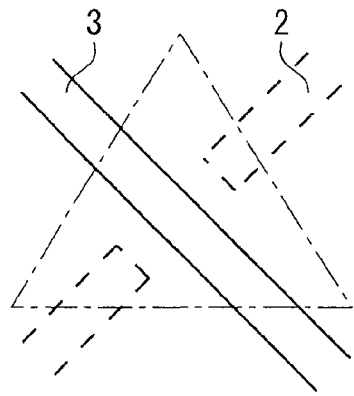
Figure 5B:
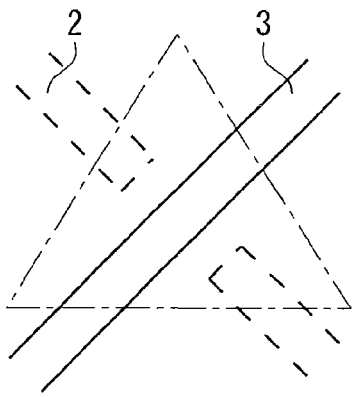

FIGS. 5A and 5B are enlarged views of this. At the dotted triangles illustrated in FIG. 3, one detection row wiring 3 in the block area R1 and one detection row wiring 3 in the block area R2 are coupled as illustrated in FIGS. 5A and 5B, but the detection column wiring 2 in the block area C1 and the detection column wiring 2 in the block area C2 are arranged so that a coupling portion of the detection row wirings 3 is interposed therebetween, and are not coupled.

Next, the dotted squares in FIG. 3, i.e., places at which the block areas C1 and R1 in the grid A and the block areas R2 and C2 adjacent to an upper side (the negative y side) of the block areas C1 and R1 contact and places at which the block areas C2 and R2 of the grid A and the block areas R1 and C1 adjacent to a lower side (the positive y side) of the block areas C2 and R2 contact will be described.

Figure 6A:
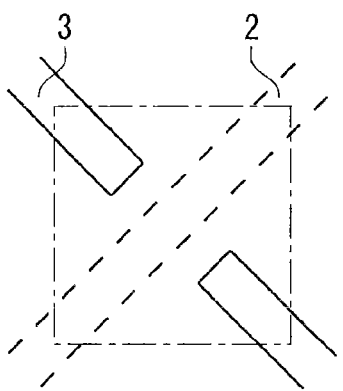
Figure 6B:
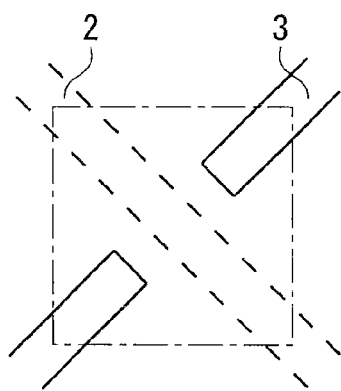

FIGS. 6A and 6B are enlarged views of this. At the dotted square illustrated in FIG. 3, one detection column wiring 2 in the block area C1 and one detection column wiring 2 in the block area C2 are coupled as illustrated in FIGS. 6A and 6B, but the detection row wiring 3 in the block area R1 and the detection row wiring 3 in the block area R2 are arranged so that a coupling portion of the detection column wirings 2 is interposed therebetween, and are not coupled.

Next, solid circles O1 to O4 illustrated in FIG. 3, i.e., four corners of the grid A, will be described.

FIGS. 7A and 7B are enlarged views of one of these. In the solid circles O1 to O4, the detection column wirings 2 in the block areas C1 and C2 are separated and not coupled and the detection row wirings 3 in the block areas R1 and R2 are separated and not coupled, as illustrated in FIGS. 7A and 7B.

Next, a configuration of the detection column wiring 2 provided in the block areas C1 and C2 will be described.

FIGS. 8 and 9 are enlarged views illustrating configurations of the detection column wirings 2 provided in the block areas C1 and C2, respectively. As illustrated in FIGS. 8 and 9, each of the detection column wirings 2 in the block areas C1 and C2 includes inclined portions 2aS1, 2bS2, 2cS1 and 2dS2 each constituting a first inclined part, and inclined portions 2aS2, 2bS1, 2cS2, and 2dS1 each constituting a second inclined part.

Here, the first inclined part (the inclined portions 2aS1, 2bS2, 2cS1, and 2dS2) is a partial wiring having a straight line shape, and is repeatedly arranged with a predetermined pitch in the column direction y and in the row direction x, and inclined at an inclination angle (a first angle) of +45° with respect to the column direction y. The second inclined part (the inclined portions 2aS2, 2bS1, 2cS2, and 2dS1) is a partial wiring having a straight line shape, and is repeatedly arranged with the above-described predetermined pitch in the column direction y and the row direction x, and inclined in a direction opposite to the first inclined part with respect to the column direction y. That is, the second inclined part is inclined at an inclination angle of −45° with respect to the column direction y.

Also, the inclined portions 2aS1, 2aS2, 2bS1 and 2bS2 and the inclined portions 2dS1, 2cS1, 2dS2, and 2cS2 are connected to intersect with each other, respectively. In particular, in the present preferred embodiment, the inclined portions 2aS1, 2aS2, 2bS1 and 2bS2 and the inclined portions 2dS1, 2cS1, 2dS2, and 2cS2 are connected to be perpendicular to each other, and the inclined portions intersect at a midpoint, respectively.

Next, a configuration of the detection column wiring 2 provided in the block area C1 will be described in greater detail with respect to FIG. 8.

This detection column wiring 2 includes a first zigzag wiring 2a (a first detection column wiring) extending in the column direction y, a second zigzag wiring 2b (a second detection column wiring) extending in the column direction y, a third zigzag wiring 2c extending in the row direction x, and a fourth zigzag wiring 2d extending in the row direction x. Further, in FIG. 8, only one first zigzag wiring 2a is indicated by a thick dotted line.

The first zigzag wiring 2a includes the inclined portion 2aS1 inclined at an inclination angle of +45° with respect to the column direction y, the inclined portion 2aS2 inclined at an inclination angle of −45° with respect to the column direction y, and a coupling portion 2aP that couples the inclined portions, and the portions are repeatedly arranged in the column direction y. The second zigzag wiring 2b includes the inclined portion 2bS1 inclined at an inclination angle of −45° with respect to the column direction y, the inclined portion 2bS2 inclined at an inclination angle of +45° with respect to the column direction y, a coupling portion 2bP that couples the inclined portions, and the portions are repeatedly arranged in the column direction y. Further, the first and second zigzag wirings 2a and 2b have a line symmetrical relationship.

Also, both ends in an extending direction of the first and second zigzag wirings 2a and 2b that are adjacent are coupled in a coupling portion 2P1. Further, in the example illustrated in FIG. 8, the two first zigzag wirings 2a and the two second zigzag wirings 2b are provided in one block area C1.

The third zigzag wiring 2c includes the inclined portion 2cS1 at an inclination angle of +45° with respect to the row direction x, the inclined portion 2cS2 inclined at an inclination angle of −45° with respect to the row direction x, and a coupling portion 2cP that couples the inclined portions, and the portions are repeatedly arranged in the row direction x. The fourth zigzag wiring 2d includes the inclined portion 2dS1 inclined at an inclination angle of −45° with respect to the row direction x, the inclined portion 2dS2 inclined at an inclination angle of +45° with respect to the row direction x, and a coupling portion 2dP that couples the inclined portions, and the portions are repeatedly arranged in the row direction x. Further, the third and fourth zigzag wirings 2c and 2d have a line symmetrical relationship.

Also, in the example illustrated in FIG. 8, the two third zigzag wirings 2c and the two fourth zigzag wirings 2d are provided in one block area C1. Among them, both ends in the extending direction adjacent to the third and fourth zigzag wirings 2c and 2d are coupled in a coupling portion 2P2 except for one third zigzag wiring 2c located at an upper end (the negative y side end) of the block area C1 and one fourth zigzag wiring 2d located at a lower end (the positive y side end) of the block area C1. Meanwhile, one ends (here, a positive x side end) in the extending direction of the third and fourth zigzag wirings 2c and 2d located at a lower end (the positive y side end) and an upper end (the negative y side end) extend to vertexes Jc2 and Jc1 of the block area C1. Also, the detection column wiring 2 in the block area C1 is electrically connected with the detection column wiring 2 in the block area C2 located at a lower right side (the positive x side and the positive y side) and an upper right side (the positive x side and the negative y side) at the vertexes jc2 and Jc1.

Next, a configuration of the detection column wiring 2 provided in the block area C2 will be described with respect to FIG. 9. The detection column wiring 2 in the block area C2 is configured similar to the detection column wiring 2 in the block area C1 described above. However, in this block area C2, the other ends (here, the negative x side end) in the extending direction of the third and fourth zigzag wirings 2c and 2d located in the lower end (the positive y side end) and upper end (the negative y side end) extend to the vertexes Jc1 and Jc2 of the block area C2. Also, the detection column wiring 2 in the block area C2 is coupled and electrically connected with the detection column wiring 2 in the block area C1 located in the lower left side (the negative x side and the positive y side) and an upper left side (the negative x side and the negative y side) at the vertexes Jc1 and Jc2.

Next, a configuration of the detection row wirings 3 provided in the block areas R1 and R2 will be described. Further, a configuration of the detection row wiring 3 that will be described herein is basically the same as the configuration of the detection column wiring 2 described above.

Figure 11:
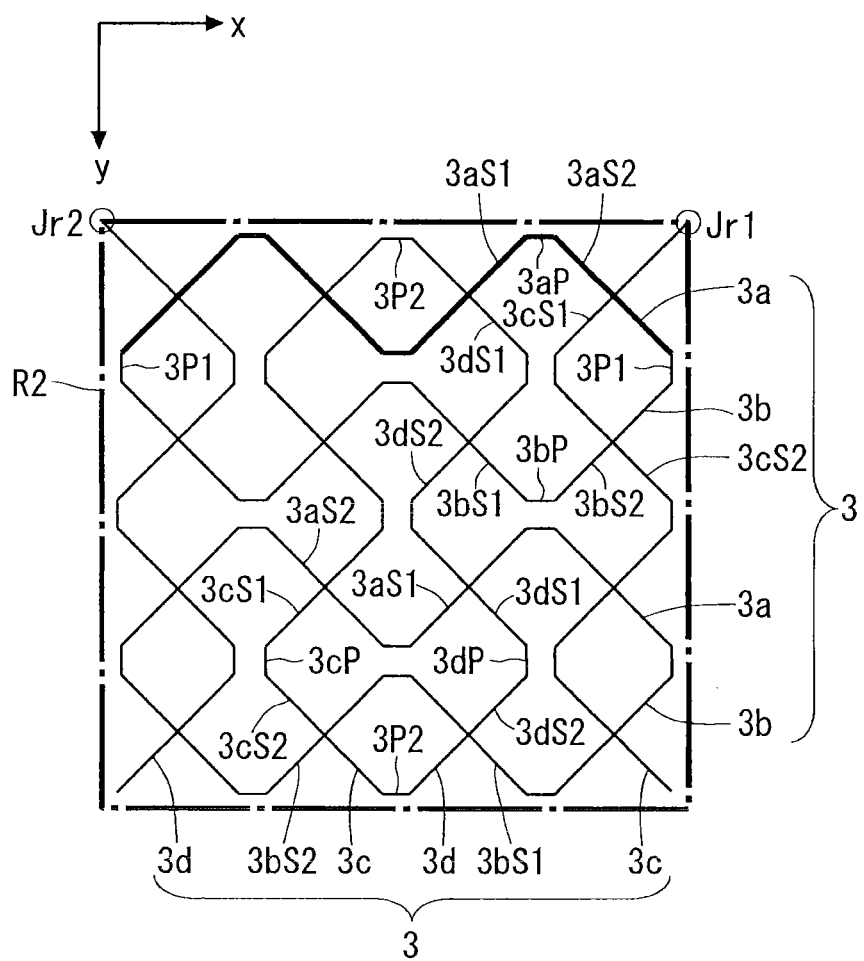

FIGS. 10 and 11 are enlarged views illustrating configurations of the detection row wirings 3 provided in the block areas R1 and R2, respectively. As illustrated in FIGS. 10 and 11, each of the detection row wirings 3 in the block areas R1 and R2 includes inclined portions 3aS1, 3bS2, 3cS1 and 3dS2 each constituting a third inclined part and inclined portions 3aS2, 3bS1, 3cS2, and 3dS1 each constituting a fourth inclined part.

Here, the third inclined part (the inclined portions 3aS1, 3bS2, 3cS1 and 3dS2) is a partial wiring having a straight line shape, and is repeatedly arranged with the above-described predetermined pitch in the column direction y and the row direction x and inclined at an inclination angle of +45° (a second angle) with respect to the row direction x. The fourth inclined part (the inclined portions 3aS2, 3bS1, 3cS2 and 3dS1) is a partial wiring having a straight line shape, and is repeatedly arranged with the above-described predetermined pitch in the column direction y and the row direction x and inclined in a direction opposite to the third inclined part with respect to the row direction x. That is, the fourth inclined part is inclined at an inclination angle of −45° with respect to the row direction x.

Also, the inclined portions 3aS1, 3aS2, 3bS1 and 3bS2 and the inclined portions 3dS1, 3cS1, 3dS2 and 3cS2 are connected to intersect with each other, respectively. In particular, in the present preferred embodiment, the inclined portions 3aS1, 3aS2, 3bS1 and 3bS2 and the inclined portions 3dS1, 3cS1, 3dS2 and 3cS2 are connected to be perpendicular to each other, and the inclined portions intersect at a midpoint, respectively.

Next, a configuration of the detection row wiring 3 provided in the block area R1 will be described in greater detail with reference to FIG. 10.

The detection row wiring 3 includes a fifth zigzag wiring 3a (a first detection row wiring) extending in the row direction x, a sixth zigzag wiring 3b (a second detection row wiring) extending in the row direction x, a seventh zigzag wiring 3c extending in the column direction y, and an eighth zigzag wiring 3d extending in the column direction y. Further, in FIG. 10, only one fifth zigzag wiring 3a is indicated by a thick solid line.

The fifth zigzag wiring 3a includes the inclined portion 3aS1 inclined at an inclination angle of +45° with respect to the row direction x, the inclined portion 3aS2 inclined at an inclination of −45° with respect to the row direction x, and a coupling portion 3aP that couples the inclined portions, and the portions are repeatedly arranged in the row direction x. The sixth zigzag wiring 3b includes the inclined portion 3bS1 inclined at an inclination angle of −45° with respect to the row direction x, the inclined portion 3bS2 inclined at an inclination angle of +45° with respect to the row direction x, and a coupling portion 3bP that couples the inclined portions, and the portions are repeatedly arranged in the row direction x. Further, the fifth and sixth zigzag wirings 3a and 3b have a line symmetrical relationship.

Also, both ends in the extending direction of the fifth and sixth zigzag wirings 3a and 3b that are adjacent are coupled in a coupling portion 3P1. Further, in the example illustrated in FIG. 10, the two fifth zigzag wirings 3a and the two sixth zigzag wirings 3b are provided in one block area R1.

The seventh zigzag wiring 3c includes the inclined portion 3cS1 inclined at an inclination angle of +45° with respect to the column direction y, the inclined portion 3cS2 inclined at an inclination angle of −45° with respect to the column direction y, and a coupling portion 3cP that couples the inclined portions, and the portions are repeatedly arranged in the column direction y. The eighth zigzag wiring 3d includes the inclined portion 3dS1 inclined at an inclination angle of −45° with respect to the column direction y, the inclined portion 3dS2 inclined at an inclination angle of +45° with respect to the column direction y, and a coupling portion 3dP that couples the inclined portions, and the portions are repeatedly arranged in the column direction y. Further, the seventh and eighth zigzag wirings 3c and 3d have a line symmetrical relationship.

Also, in the example illustrated in FIG. 10, the two seventh zigzag wirings 3c and the two eighth zigzag wirings 3d are provided in one block area R1. Among them, both ends in the extending direction of the seventh and eighth zigzag wirings 3c and 3d that are adjacent are coupled in a coupling portion 3P2 except for one seventh zigzag wiring 3c located in a right end (a positive x side end) of the block area R1, and one eighth zigzag wiring 3d located in a left end (a negative x side end) of the block area R1. Meanwhile, one ends (here, the positive y side end) in the extending direction of the seventh and eighth zigzag wirings 3c and 3d located in a right end (the positive x side end) and a left end (the negative x side end) extend to vertexes Jr2 and Jr1 of the block area R1. Also, the detection row wiring 3 of the block area R1 is coupled and electrically connected with the detection row wiring 3 in the block area R2 located in the lower right side (the positive x side and the positive y side) and the lower left side (the negative x side and the positive y side) at the vertexes Jr2 and Jr1.

Next, a configuration of the detection row wiring 3 provided in the block area R2 will be described with reference to FIG. 11. The detection row wiring 3 in this block area R2 is configured similar to the detection row wiring 3 in the block area R1 described above. However, in the block area R2, the other ends (here, a negative y side end) in the extending direction of the seventh and eighth zigzag wirings 3c and 3d located in a right end (a positive x side end) and a left end (a negative x side end) extend to vertexes Jr1 and Jr2 of the block area R2. Also, the detection row wiring 3 in the block area R2 is coupled and electrically connected with the detection row wiring 3 of the block area R1 located in an upper right side (the positive x side and the negative y side) and upper left side (the negative x side and the negative y side) at the vertexes Jr1 and Jr2.

Now, with the touch screen 1 configured as described above according to the present preferred embodiment, inter-wiring capacitance of the bundle of wirings 6 in the column direction and the bundle of wirings 7 in the row direction can be reduced. Hereinafter, this will be described.

The inter-wiring capacitance of the bundle of wirings 6 in the column direction and the bundle of wirings 7 in the row direction includes (1) coupling capacitance near an intersection place between the detection column wiring 2 and the detection row wiring 3 (the dotted circle in FIG. 3), and (2) a coupling capacitance near a side-by-side travel place of the coupling portion between the detection column wiring 2 and the detection row wiring 3 (the dotted ellipse in FIG. 3). Accordingly, if the coupling capacitances of (1) and (2) can be reduced, the inter-wiring capacitance of the bundle of wirings 6 in the column direction and the bundle of wirings 7 in the row direction can be reduced.

It is effective to reduce the number of intersection places in order to reduce the coupling capacitance of (1). Further, as a configuration for reducing this coupling capacitance, a configuration in which a thickness of an interlayer insulation film 13 is great is also considered, but even in this configuration, the inter-wiring capacitance of the bundle of wirings 6 in the column direction and the bundle of wirings 7 in the row direction was barely reduced, as was confirmed through a test element group (TEG) experiment by the inventors. Meanwhile, in order to reduce the coupling capacitance of (2), it is effective to increase a distance (space) between the coupling portions in the side-by-side travel place.

Figure 40:
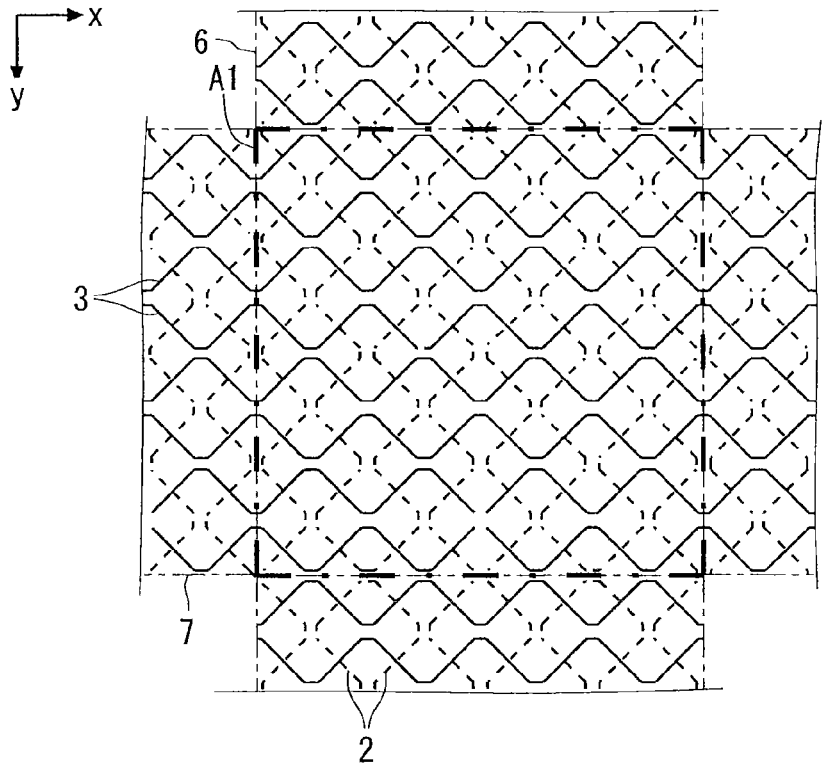
FIGS. 40 and 41 are enlarged plan views each illustrating a configuration of a comparative touch screen.

Here, a configuration of the touch screen described in Japanese Patent Application Laid-Open No. 2010-61502 compared with the present preferred embodiment (hereinafter referred to as "a comparative touch screen") is illustrated in FIG. 40. FIG. 40 is an enlarged view illustrating a portion (a grid A1) of the comparative touch screen corresponding to the above-described grid A. Further, in the comparative touch screen, a repetition pitch (a predetermined pitch of the above-described inclined portion) of a zigzag of the detection column wiring 2 and the detection row wiring 3 within the grid A1 is ¼ of one side of the square grid A1, and is equal to the pitch of the detection column wiring 2 and the detection row wiring 3 in the grid A illustrated in FIG. 2 according to the present preferred embodiment.

Figure 41:
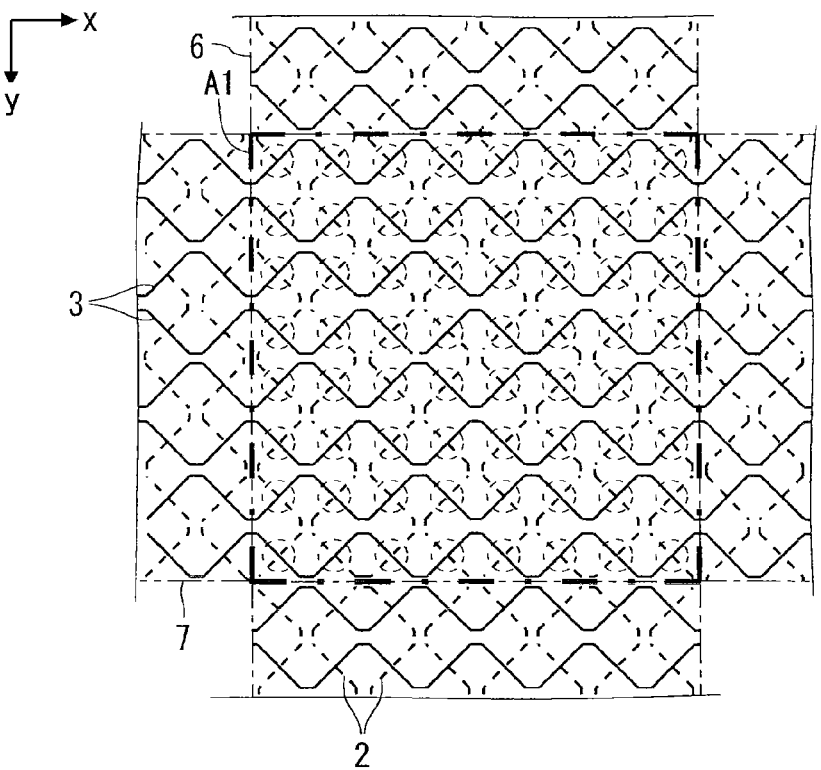

As illustrated in FIG. 41, the number of intersection places between the detection column wiring 2 and the detection row wiring 3 within the grid A1 in the comparative touch screen, i.e., dotted circles, is 64 (=8×8). On the other hand, as illustrated in FIG. 3, the above-described number of intersection places within the grid A in the touch screen 1 according to in the present preferred embodiment is only 1. Accordingly, with the touch screen 1 according to the present preferred embodiment, the number of intersection places of the detection column wiring 2 and the detection row wiring 3 can be reduced as compared to the comparative touch screen, and coupling capacitance of all the intersection places, i.e., the above-described coupling capacitance of (1), can be reduced.

Meanwhile, the number of side-by-side travel places of the coupling portions within the grid A1 in the comparative touch screen is 0, as illustrated in FIG. 41. On the other hand, as illustrated in FIG. 3, the number of the dotted ellipse side-by-side travel places of the coupling portions within the grid A in the touch screen 1 according to the present preferred embodiment is 24 (however, ellipses of the side-by-side travel places with an adjacent grid are counted to be ½, and the same applies to the second preferred embodiment). Accordingly, the number of side-by-side travel places in the touch screen 1 according to the present preferred embodiment increases as compared to the comparative touch screen, so that coupling capacitance of all the side-by-side travel places, i.e., the above-described coupling capacitance of (2), slightly increases.

However, as described above, when a distance between the coupling portions in the side-by-side travel place increases, the coupling capacitance in the side-by-side travel place can be reduced. For example, a distance between the detection column wiring 2 and the detection row wiring 3 increases from 10 µm to 130 µm, so that the coupling capacitance (inter-wiring capacitance) between the detection column wiring 2 and the detection row wiring in the side-by-side travel place could be reduced by about 40%, as was confirmed through the TEG experiment of the inventors.

From the above, with the touch screen 1 according to the present preferred embodiment, the coupling capacitance in the side-by-side travel place can be suppressed and the coupling capacitance at the intersection place can be reduced. As a result, the inter-wiring capacitance between the bundle of wirings 6 in the column direction and the bundle of wirings 7 in the row direction can be reduced.

Figure 12:
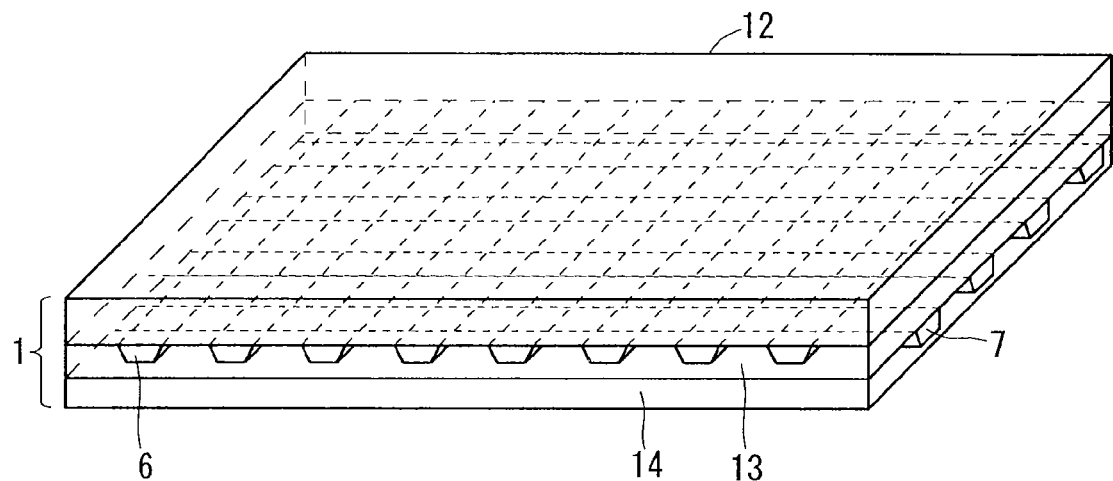
FIGS. 12 and 13 are perspective views each illustrating the configuration of the touch screen according to the first preferred embodiment.

FIG. 12 is a perspective view schematically illustrating an example of a stack structure of the touch screen 1 according to the present preferred embodiment. Further, in FIG. 12, the pull-out wirings 8 and 9 or the terminals 10 illustrated in FIG. 1 are not illustrated. Next, the stack structure of the touch screen 1 will be described with reference to FIG. 12.

As illustrated in FIG. 12, an upper surface layer of the touch screen 1 is the base substrate 12 described above, and a plurality of bundles of wirings 6 in the column direction formed of an opaque high-conductivity metal wiring material, such as aluminum, are formed on the base substrate 12 (on a lower surface in FIG. 12). Further, in FIG. 12, each bundle of wirings 6 in the column direction is not illustrated to have the zigzag pattern described above, but is illustrated as a straight line, for convenience of illustration.

Also, the transparent interlayer insulation film 13, such as a silicon nitride or silicon oxide film, is formed on the base substrate 12 (on the lower surface in FIG. 12) to cover all the bundles of wirings 6 in the column direction. A plurality of bundles of wirings 7 in the row direction formed of an opaque high-conductivity metal wiring material, such as aluminum, are formed on the interlayer insulation film 13 (on the lower surface in FIG. 12). Further, in FIG. 12, each bundle of wirings 7 in the row direction is not illustrated to have the above-described zigzag pattern, but is illustrated as a straight line, for convenience of illustration. A protective film 14 is formed on the interlayer insulation film 13 (on the lower surface in FIG. 12).

Further, while the configuration in which the bundle of wirings 6 in the column direction, the interlayer insulation film 13 and the bundle of wirings 7 in the row direction are formed on the base substrate 12 in this order has been described herein, a configuration having a reverse arrangement of the wirings, i.e., a configuration in which the bundle of wirings 7 in the row direction, the interlayer insulation film 13 and the bundle of wirings 6 in the column direction are formed on the base substrate 12 in this order, may be used.

Figure 13:
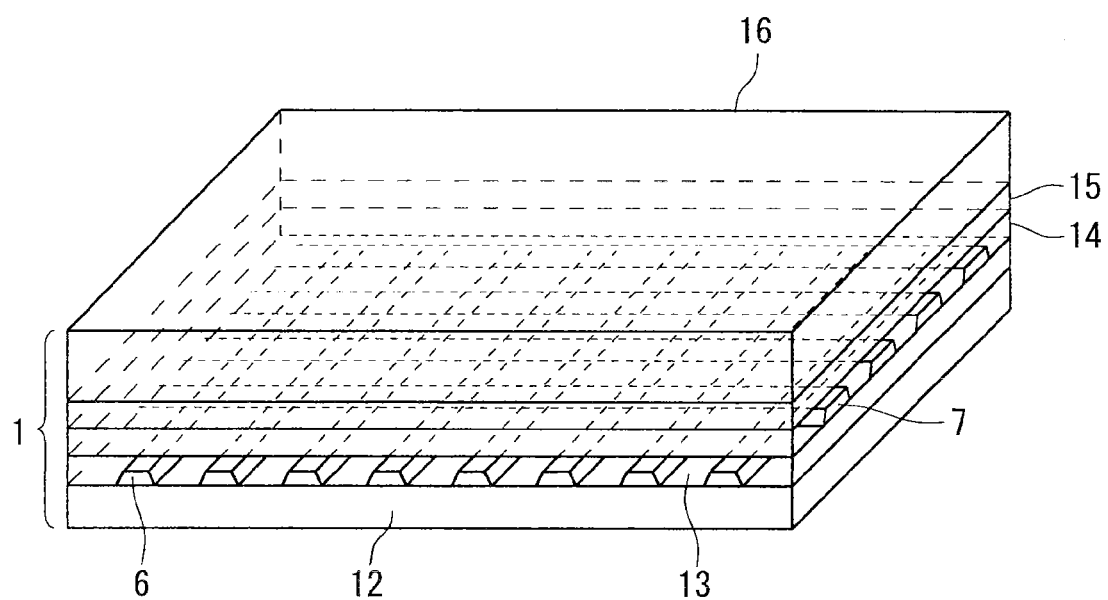

FIG. 13 is a perspective view schematically illustrating an example of a stack structure other than the touch screen 1 illustrated in FIG. 12. The touch screen 1 illustrated in FIG. 13 is illustrated as a vertical reverse of the touch screen 1 illustrated in FIG. 12. Here, a protective glass 16 is adhered and fixed to a protective film 14 via an adhesion layer 15. Further, when a thickness of the protective glass 16 is a few mm, it is possible to improve the strength of the touch screen 1 and obtain a highly robust touch screen 1.

FIG. 14 is a schematic diagram illustrating a configuration of the entire touch panel 100 including the touch screen 1 according to the present preferred embodiment. This touch panel 100 includes a flexible printed circuit (FPC) 17, a controller board 18, and a switch circuit 19 and a detection processing circuit 20 mounted on the controller board 18, in addition to the touch screen 1 described above.

Each terminal of the FPC 17 is mounted on the corresponding terminal 10 of the touch screen 1 using an anisotropic conductive film (ACF) that is not illustrated. A detection wiring group (the bundle of wirings 6 in the column direction and the bundle of wirings 7 in the row direction) of the touch screen 1 and circuits such as the switch circuit 19 and the detection processing circuit 20 mounted on the controller board 18 are electrically connected via the FPC 17. Accordingly, the touch screen 1 functions as a primary component of the touch panel 100.

The switch circuit 19 sequentially selects each of the plurality of bundles of wirings 6 in the column direction and each of the plurality of bundles of wirings 7 in the row direction. The detection processing circuit 20 detects touch coordinates in the touch screen 1 indicating a touch position of the pointer that touches the touch screen 1.

Here, as schemes for detecting the touch coordinates of the pointer, a self-capacitance detection scheme and a mutual-capacitance detection scheme are considered.

In the self-capacitance detection scheme, when the pointer touches a surface of the transparent base substrate 12 of the touch screen 1 (in the stack structure of FIG. 12) or when the pointer touches a surface of the protective glass 16 (in the stack structure of FIG. 13), touch capacitance formed between each detection column wiring 2 and the pointer, and touch capacitance formed between each detection row wiring 3 and the pointer are detected so that the touch coordinates are detected.

Accordingly, if detection using the self-capacitance detection scheme is desired to be realized, a circuit capable of performing a process of calculating the touch coordinates of the pointer based on a result of detecting capacitance formed between the bundle of wirings 6 in the column direction selected by the switch circuit 19 and the pointer, and capacitance formed between the bundle of wirings 7 in the row direction selected by the switch circuit 19 and the pointer may be used as the detection processing circuit 20. Also, a value of the touch coordinates calculated by the detection processing circuit 20 may be output as detection coordinate data to an external device (e.g., a computer) that is not illustrated.

Meanwhile, in the mutual-capacitance detection scheme, a change in mutual-capacitance between the detection column wiring 2 and the detection row wiring 3 in a touch position generated when the pointer touches the surface of the transparent base substrate 12 of the touch screen 1 (in the stack structure of FIG. 12) or when the pointer touches the surface of the protective glass 16 (in the stack structure of FIG. 13) is detected so that the touch coordinates are detected.

Accordingly, if detection using the mutual-capacitance detection scheme is desired to be realized, a circuit capable of performing a process of calculating the touch coordinates of the pointer based on a result of detecting the change in the mutual-capacitance between the bundle of wirings 6 in the column direction and the bundle of wirings 7 in the row direction selected by the switch circuit 19 according to touch of the pointer to the touch screen 1 may be used as the detection processing circuit 20. Also, a value of the touch coordinates calculated by the detection processing circuit 20 may be output as detection coordinate data to an external device (e.g., a computer) that is not illustrated.

According to the touch screen 1 and the touch panel 100 configured in this manner according to the present preferred embodiment, only the detection column wiring 2 or only the detection row wiring 3 is provided in each of the block areas C1, C2, R1, and R2, and the block areas C1 and C2 (the first block areas) in which only the detection column wirings 2 are provided and the block areas R1 and R2 (the second block areas) in which only the detection row wirings 3 are provided are alternately arranged in the column direction y and the row direction x. Accordingly, the number of the intersection places of the detection column wiring 2 and the detection row wiring 3 can be reduced and the inter-wiring capacitance between the bundle of wirings 6 in the column direction and the bundle of wirings 7 in the row direction can be reduced.

Further, in the present preferred embodiment, one detection column wiring 2 that diagonally connects between the first block areas (e.g., the block areas C1 and C2) that are diagonally adjacent, and one detection row wiring 3 that diagonally connects between the second block areas (e.g., the block areas R1 and R2) that are diagonally adjacent in a complementary manner with the first block areas intersect three-dimensionally. Accordingly, it is possible to reduce the inter-wiring capacitance between the bundle of wirings 6 in the column direction and the bundle of wirings 7 in the row direction, as compared to the comparative touch screen.

In particular, in the present preferred embodiment, since the three-dimensional intersection between the detection column wiring 2 and the detection row wiring 3 is included only at one place in the intersection area A (the grid A), the inter-wiring capacitance between the bundle of wirings 6 in the column direction and the bundle of wirings 7 in the row direction can be appropriately reduced.

Further, according to the present preferred embodiment, even in a configuration using the mutual-capacitance detection scheme in which the touch coordinates are detected based on an electric field change (a mutual-capacitance change) between the bundle of wirings 6 in the column direction and the bundle of wirings 7 in the row direction according to the touch of the pointer, the inter-wiring capacitance (electric field coupling) can be similarly reduced. Thus, it is possible to realize a high-sensitivity touch screen 1.

Further, according to the present preferred embodiment, even in the configuration as discussed in Japanese Patent Application Laid-Open (Translation of PCT Application) No. 11-505641 (1999), i.e., the configuration in which a capacitance measurement circuit, in which a voltage obtained by capacitance-dividing a driving voltage by the mutual-capacitance (the capacitance between row and column wirings at the intersection place) and known reference capacitance is applied to an input of differential amplifier, is applied, the capacitance between the row and column wirings relative to the reference capacitance can be similarly reduced. Accordingly, the capacitance-divided voltage can be suppressed, so that detection can be performed by effectively using a dynamic range of the circuit. Further, since the reference capacitance according to the inter-wiring capacitance between the bundle of wirings 6 in the column direction and the bundle of wirings 7 in the row direction can be suppressed, the wiring resistance of the detection column wiring 2 and the detection row wiring 3 and combined capacitance between the capacitance between the row and the column and the reference capacitance can be suppressed. Thus, it is possible to shorten a setting time of a detection output voltage due to charging and discharging, i.e., a detection time, and improve a response of the touch panel 100.

Further, according to the present preferred embodiment, each of the detection column wirings 2 in the block areas C1 and C2 includes the first inclined part (e.g., inclined portions $2aS1$, $2bS2$, $2cS1$ and $2dS2$) and the second inclined part (e.g., inclined portions $2aS2$, $2bS1$, $2cS2$ and $2dS1$) with a predetermined pitch in the column direction y and the row direction x. Also, each of the detection row wirings 3 in the block areas R1 and R2 includes the third inclined part (e.g., inclined portions $3aS1$, $3bS2$, $3cS1$, and $3dS2$) and the fourth inclined part (e.g., inclined portions $3aS2$, $3bS1$, $3cS2$ and $3dS1$) with a predetermined pitch in the column direction y and the row direction x. Accordingly, the arrangement of the detection column wirings 2 and the arrangement of the detection row wirings 3 can be made uniform.

Here, when the touch screen 1 according to the present preferred embodiment is mounted on a display panel such as a liquid crystal display panel, some pixels of the display panel are uniformly covered with the detection column wiring 2 and the detection row wiring 3. As a result, even when the detection column wiring 2 and the detection row wiring 3 are formed of an opaque high-conductivity material, transmittance when display light output from the entire display panel passes through the touch screen 1 can be made uniform and generation of moiré fringes can be suppressed.

Further, according to the present preferred embodiment, the first inclined part and the second inclined part are perpendicular to each other, the third inclined part and the fourth inclined part are perpendicular to each other, and an inclination angle of the parts is ±45°. Accordingly, the arrangement of the detection column wirings 2 and the arrangement of the detection row wirings 3 are further made uniform. Thus, it is possible to further make transmittance of the touch screen 1 uniform and to further suppress the generation of the moiré fringes.

Further, according to the present preferred embodiment, since the first inclined part and the second inclined part intersect at a midpoint and the third inclined part and the fourth inclined part intersect at a midpoint, the arrangement of detection column wirings 2 and the arrangement of the detection row wirings 3 is further made uniform. Accordingly, it is possible to further make transmittance of the touch screen 1 uniform and to further suppress the generation of the moiré fringes.

Second Preferred Embodiment

In a second preferred embodiment of the present invention, shapes of the detection column wiring 2 and the detection row wiring 3 provided in the block areas C1, C2, R1, and R2 differ from those in the first preferred embodiment.

Figure 15:
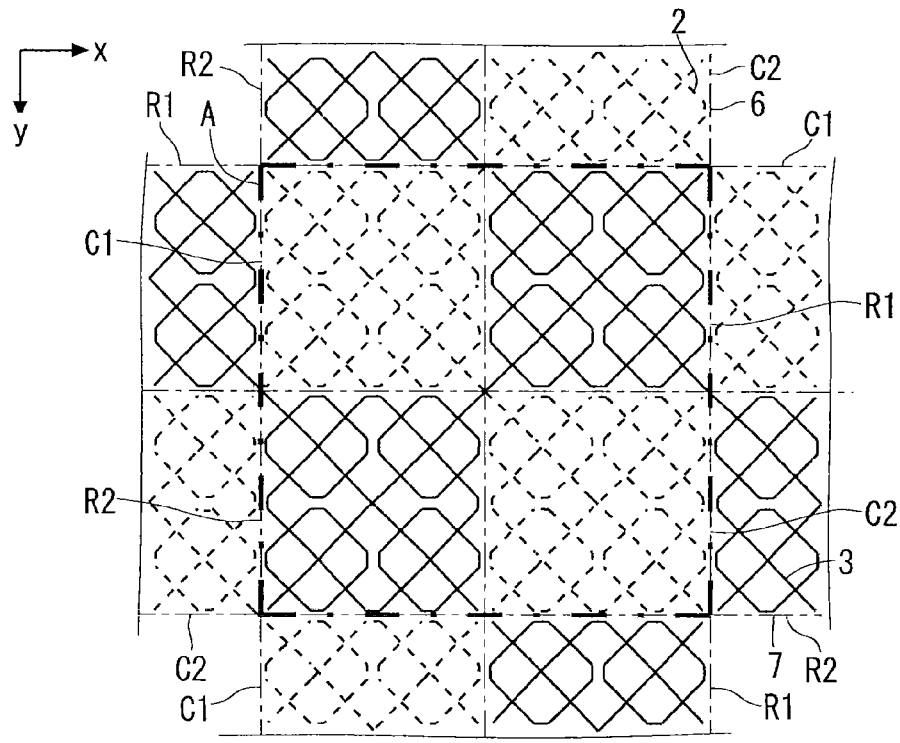

FIG. 15 is an enlarged view illustrating the vicinity of the grid A in the present preferred embodiment. Here, a plurality of (here 4) rectangular block areas C1, C2, R1, and R2 obtained by dividing the grid A are defined, only the detection column wiring 2 is provided in each of the block areas C1 and C2 (first block areas), and only the detection row wiring 3 is provided in each of the block areas R1 and R2 (second block areas), similar to the first preferred embodiment. Further, the block areas C1 and C2 in which the detection column wiring 2 is provided and the block areas R1 and R2 in which the detection row wiring 3 is provided are alternately arranged in the column direction y and the row direction x as a whole, and form a checker pattern.

Figure 16:
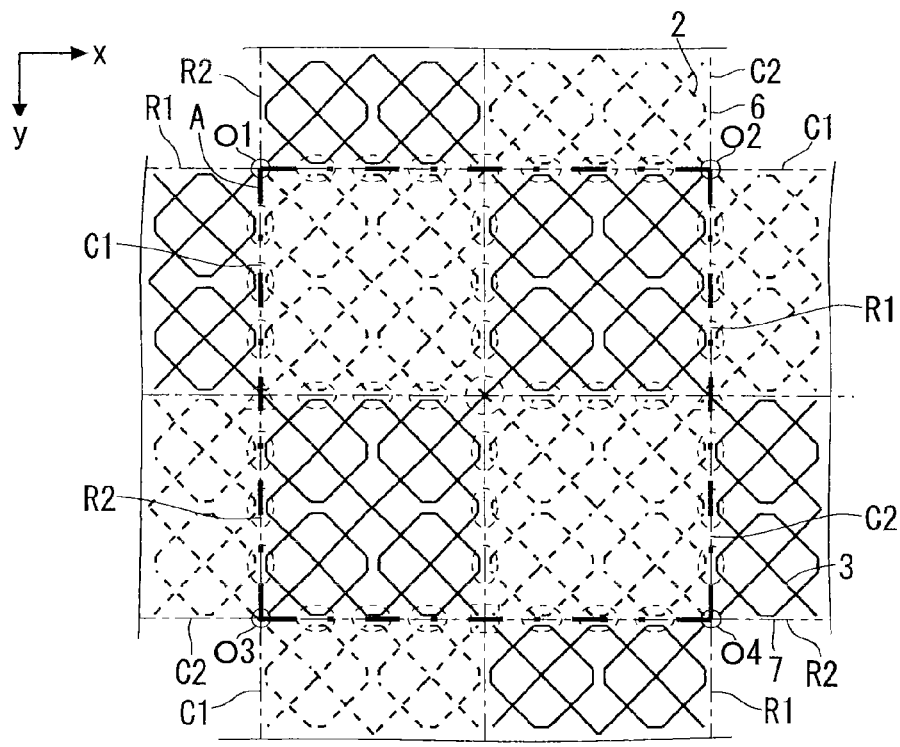

Further, in one grid A, a three-dimensional intersection of the detection column wiring 2 and the detection row wiring 3 is included at one dotted circle (one place at which the block areas C1, C2, R1 and R2 contact) in FIG. 16, similar to the first preferred embodiment. That is, at the dotted circle in FIG. 16, one detection column wiring 2 in the block area C1 and one detection column wiring 2 in the block area C2 are coupled, and one detection row wiring 3 in the block area R1 and one detection row wiring 3 in the block area R2 are coupled.

Also, one detection row wiring 3 in the block area R1 and one detection row wiring 3 in the block area R2 are coupled at a dotted triangle place illustrated in FIG. 16, but the detection column wiring 2 in the block area C1 and the detection column wiring 2 in the block area C2 are arranged so that a coupling portion of the detection row wirings 3 is interposed therebetween, and are not coupled. Further, at the dotted square illustrated in FIG. 16, one detection column wiring 2 in the block area C1 and one detection column wiring 2 in the block area C2 are coupled, but the detection row wiring 3 of the block area R1 and the detection row wiring 3 in the block area R2 are arranged so that a coupling portion of the detection column wirings 2 is interposed therebetween, and are not coupled. Further, in FIG. 16, at four solid circle places O1 to O4, the detection column wirings 2 in the block areas C1 and C2 are separated and not coupled, and the detection row wirings 3 in the block areas R1 and R2 are separated and not coupled.

Figure 17:
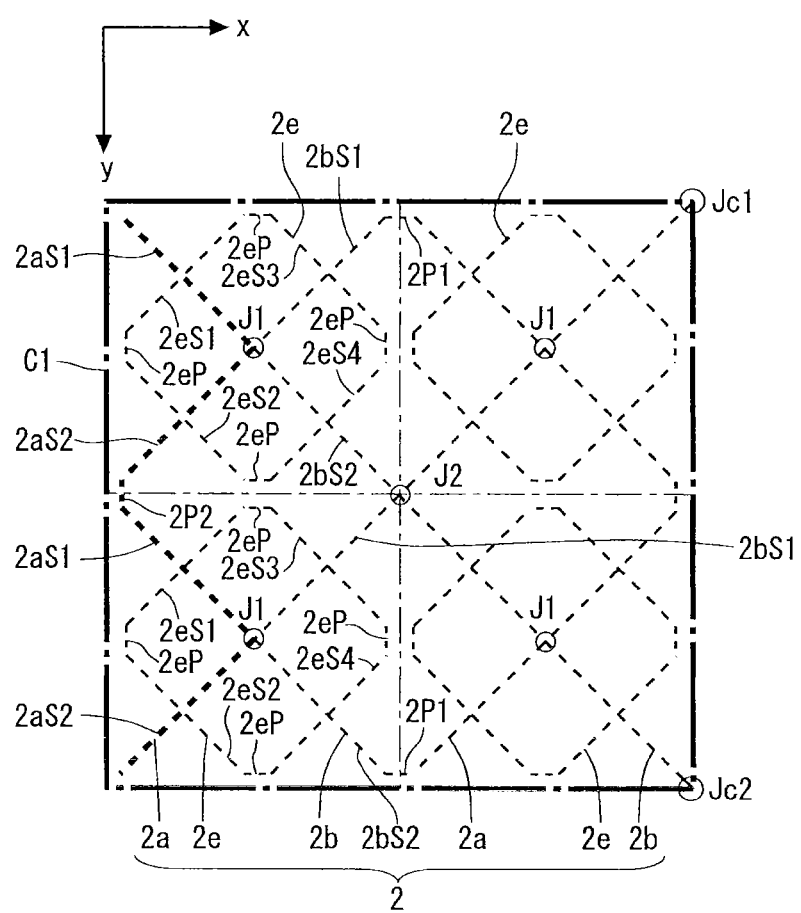
Figure 18:
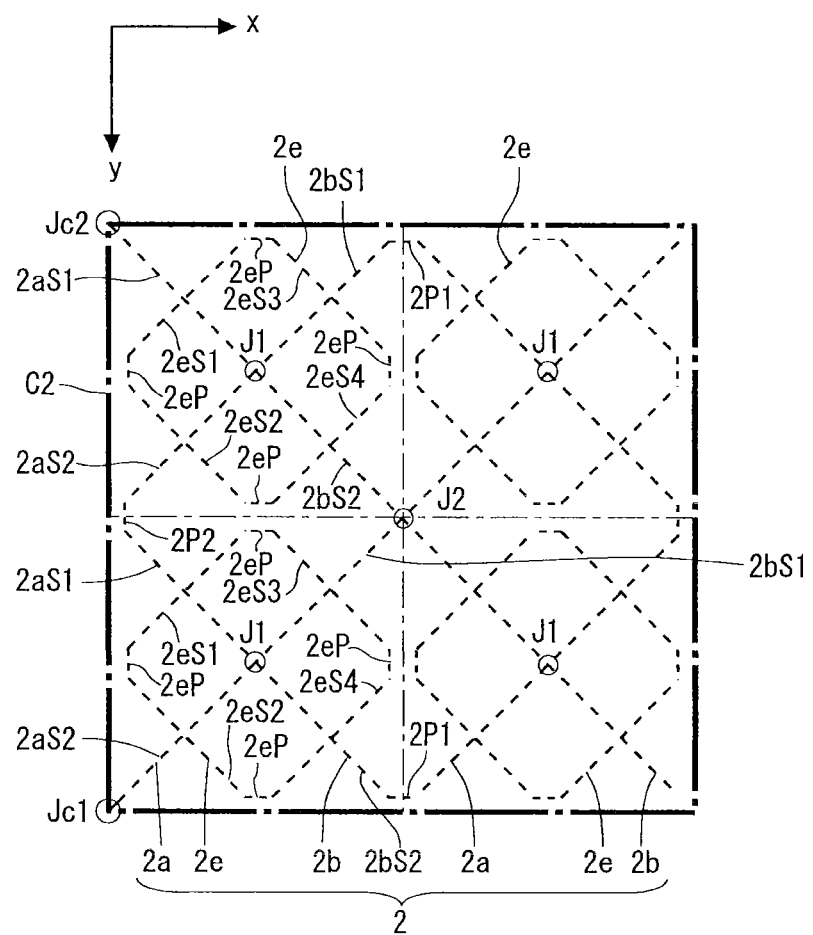

FIGS. 17 and 18 are enlarged views illustrating configurations of the detection column wirings 2 in the block areas C1 and C2, respectively. As illustrated in FIGS. 17 and 18, each of the detection column wirings 2 in the block areas C1 and C2 includes inclined portions $2aS1$ and $2bS2$ each constituting the first inclined part and inclined portions $2aS2$ and $2bS1$ each constituting the second inclined part.

Here, the first inclined part (the inclined portions $2aS1$ and $2bS2$) is a partial wiring in a straight line shape having one end connected to a coupling point J1, and is repeatedly arranged with a predetermined pitch in the column direction y and the row direction x and inclined at the inclination angle of +45° (the first angle) with respect to the column direction y. Further, a positive direction of the inclination angle with respect to the column direction y on the drawings in the present preferred embodiment is opposite to the positive direction of the inclination angle with respect to the column direction y on the drawing in the first preferred embodiment.

The second inclined part (the inclined portions $2aS2$ and $2bS1$) is a partial wiring in a straight line shape having one end connected to a coupling point J1, and is repeatedly arranged with the above-described predetermined pitch in the column direction y and the row direction x and inclined in a direction opposite to the first inclined part with respect to the column direction y. That is, the second inclined part is inclined at an inclination angle of −45° with respect to the column direction y.

Next, a configuration of the detection column wiring 2 provided in the block area C1 will be described in greater detail with reference to FIG. 17.

The detection column wiring 2 includes a first zigzag wiring $2a$ (a first detection column wiring) extending in the column direction y, and a second zigzag wiring $2b$ (a second detection column wiring) extending in the column direction y. Further, in FIG. 17, only one first zigzag wiring $2a$ is indicated by a thick dotted line. The detection column wiring 2 also includes a branch wiring $2e$ (a first branch wiring) that couples the first zigzag wiring $2a$ with the second zigzag wiring $2b$.

The first zigzag wiring $2a$ includes the inclined portion $2aS1$ inclined at an inclination angle of +45° with respect to the column direction y, the inclined portion $2aS2$ inclined at an inclination angle of −45° with respect to the column direction y, and a coupling portion $2P2$ and the coupling point J1 that couple the inclined portions, and the portions are repeatedly arranged in the column direction y. The second zigzag wiring $2b$ includes the inclined portion $2bS1$ inclined at an inclination angle of −45° with respect to the column direction y, the inclined portion $2bS2$ inclined at an inclination angle of +45° with respect to the column direction y, and the coupling points J1 and J2 that couple the inclined portions, and the portions are repeatedly arranged in the column direction y. Further, the first and second zigzag wirings $2a$ and $2b$ have a line symmetrical relationship.

Further, the first and second zigzag wirings $2a$ and $2b$ are alternately arranged in the row direction x in the block area C1, and coupled by the coupling point J1, a coupling portion $2P1$ and the coupling point J2. Further, in the present preferred embodiment, one set of first and second zigzag wirings $2a$ and $2b$ and the other set of first and second zigzag wirings $2a$ and $2b$ are arranged in positions that are horizontally line symmetrical to a center line along the column direction y of the block area C1.

Further, both ends (a negative y side end and a positive y side end) in the extending direction of the second zigzag wiring $2b$ located at a right end (a positive x side end) extend to vertexes Jc2 and Jc1 of the block area C1. Also, the detection column wiring 2 in the block area C1 is coupled and electrically connected with the detection column wiring 2 in the block area C2 located at a lower right side (the positive x side and the positive y side) and an upper right side (the positive x side and the negative y side) at the vertexes Jc2 and Jc1.

The branch wiring $2e$ includes an inclined part (inclined portions $2eS2$ and $2eS3$) similar to the first inclined part (the inclined portions $2aS1$ and $2bS2$), an inclined part (inclined portions $2eS1$ and $2eS4$) similar to the second inclined part (the inclined portions $2aS2$ and $2bS1$), and a coupling portion $2eP$ that couples two of the inclined portions $2eS1$ to $2eS4$. In the branch wiring $2e$ configured in this manner, the inclined portions $2eS2$ and $2eS3$ are parallel to the inclined portions $2aS1$ and $2bS2$, and the inclined portions $2eS1$ and $2eS4$ are parallel to the inclined portions $2aS2$ and $2bS1$.

Next, a configuration of the detection column wiring 2 provided in the block area C2 will be described with reference to FIG. 18. The detection column wiring 2 in this block area C2 is configured similar to the detection column wiring 2 in the block area C1 described above. However, in this block area C2, both ends (here, a negative y side end and a positive y side end) in the extending direction of the first zigzag wiring $2a$ located at a left end (a negative x side end) extend to vertexes Jc1 and Jc2 of the block area C2. Also, the detection column wiring 2 in the block area C2 is coupled and electrically connected with the detection column wiring 2 in the block area C1 located at a lower left side (a negative x side and a positive y side) and an upper left side (a negative x side and a negative y side) at the vertexes Jc1 and Jc2. Further, the detection column wirings 2 in the block areas C1 and C2 have substantially the same shape before and after rotation even when the detection column wirings 2 are rotated 90° around each coupling point J2, and are point symmetrical to the coupling point J2.

FIGS. 19 and 20 are enlarged views illustrating configurations of the detection row wirings 3 in the block areas R1 and R2, respectively. The configurations of the detection row wirings 3 in the block areas R1 and R2 have configurations similar to the detection column wirings 2 in the block areas C1 and C2 illustrated in FIGS. 17 and 18.

That is, each of the detection row wirings 3 in the block areas R1 and R2 includes a third inclined part (inclined portions $3aS1$ and $3bS2$) repeatedly arranged with the above-described predetermined pitch in the column direction y and the row direction x and inclined at an inclination angle of +45° with respect to the row direction x, and a fourth inclined part (inclined portions 3aS2 and 3bS1) repeatedly arranged with the above-described predetermined pitch in the column direction y and the row direction x and inclined at an inclination angle of −45° with respect to the row direction x. Also, each of the detection row wirings 3 provided in the block areas R1 and R2 includes a fifth zigzag wiring 3a (a first detection row wiring) including the inclined portions 3aS1 and 3aS2 and extending in the row direction x, and a sixth zigzag wiring 3b (a second detection row wiring) including the inclined portions 3bS1 and 3bS2 and extending in the row direction x. Further, the fifth and sixth zigzag wirings 3a and 3b have a line symmetrical relationship.

Further, each of the detection row wirings 3 provided in the block areas R1 and R2 also includes a branch wiring 3e (a second branch wiring) that connects the fifth zigzag wiring 3a with the sixth zigzag wiring 3b. This branch wiring 3e includes an inclined part (inclined portions 3eS1 and 3eS4) similar to the third inclined part (the inclined portions 3aS1 and 3bS2), and an inclined part (inclined portions 3eS2 and 3eS3) similar to the fourth inclined part (the inclined portions 3aS2 and 3bS1).

However, portions at a lower left side (a negative x side and positive y side) and a lower right side (a positive x side and a positive y side) of the detection row wiring 3 of the block area R1 extend to vertexes Jr1 and Jr2 of the block area R1, respectively. Also, the detection row wiring 3 of the block area R1 is connected with the detection row wiring 3 in the block area R2 located at a lower left side (the negative x side and the positive y side) and a lower right side (a positive x side and the positive y side), at the vertexes Jr1 and Jr2. Further, portions at an upper left side (the negative x side and the negative y side) and an upper right side (the positive x side and the negative y side) of the detection row wiring 3 in the block area R2 extend to vertexes Jr2 and Jr1 of the block area R2, respectively. Also, the detection row wiring 3 in the block area R2 is connected with the detection row wiring 3 of the block area R1 located at an upper left side (the negative x side and the negative y side) and an upper right side (the positive x side and the negative y side), at the vertexes Jr1 and Jr2.

Figure 21:
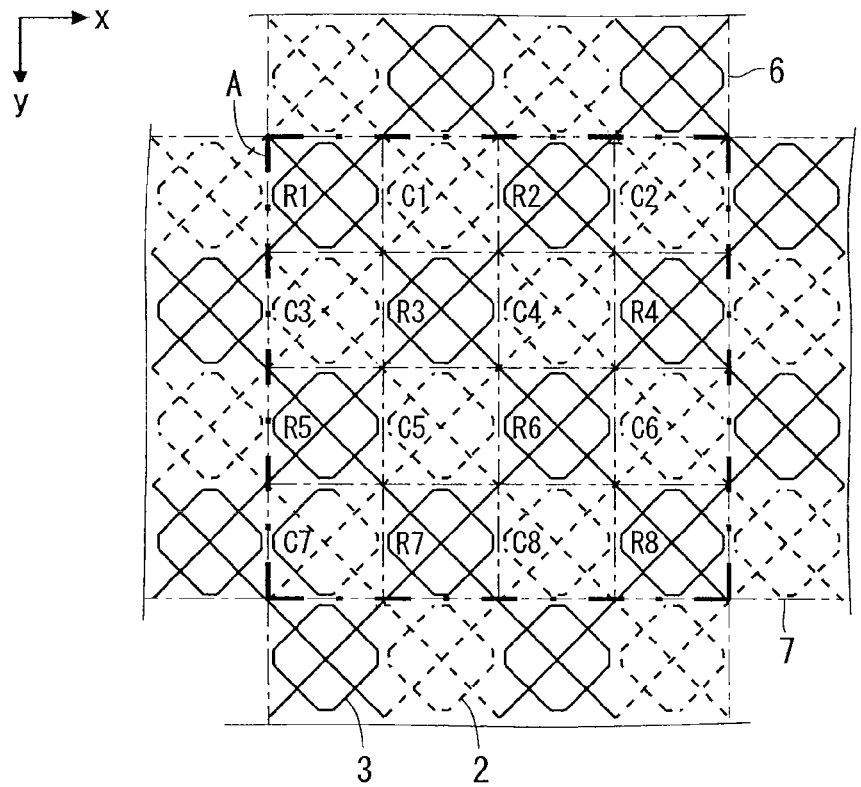

Here, a configuration of a touch screen other than the touch screens according to the present preferred embodiment (hereinafter referred to as "other touch screen") is illustrated in FIG. 21. FIG. 21 is an enlarged view illustrating a grid A of the other touch screen. The other touch screen illustrated in FIG. 21 has more block areas in the grid A than the touch screen 1 illustrated in FIG. 15, as will be described below. Further, in the other touch screen, a repetition pitch of a zigzag of the detection column wiring 2 and the detection row wiring 3 in the grid A (a predetermined pitch of the above-described inclined portion) is ¼ of one side of the square grid A and is equal to the pitch of the detection column wiring 2 and the detection row wiring 3 in the grid A illustrated in FIG. 15.

Figure 22:
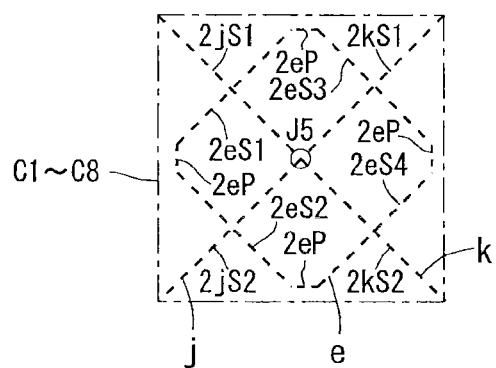

FIG. 22 is a view illustrating a basic wiring pattern of the detection column wiring 2 in the block areas C1 to C8 of the other touch screen illustrated in FIG. 21. Further, FIG. 22 illustrates the detection column wiring 2, but the same applies to the detection row wiring 3.

The basic wiring pattern illustrated in FIG. 22 includes a zigzag wiring j including inclined portions 2jS1 and 2jS2 and a coupling point J that couples the inclined portions, a zigzag wiring k including inclined portions 2kS1 and 2kS2 and a coupling point J that couples the inclined portions, and a branch wiring e including inclined portions 2eS1 to 2eS4 and coupling portions 2eP that couples the inclined portions. Further, the zigzag wiring j and the zigzag wiring k are coupled at a coupling point J5. The branch wirings e are arranged in substantially a diamond shape as a whole, and the inclined portion of the branch wiring e is perpendicular to any one of the inclined portions of the zigzag wirings j and k. Further, in the other touch screen, the length of one side of the block area is equal to a predetermined pitch of the inclined portion (the first to fourth inclined parts), as can be seen from FIG. 22.

The other touch screen configured in this manner illustrated in FIGS. 21 and 22 has more block areas defined in the grid A than the touch screen 1 illustrated in FIG. 15, as described above. Specifically, a total of 16 block areas, four in the column direction y and four in the row direction x, are provided within one grid A illustrated in FIG. 21. On the other hand, a total of four block areas, two in the column direction y and two in the row direction x, are provided within one grid A illustrated in FIG. 15.

Figure 23:
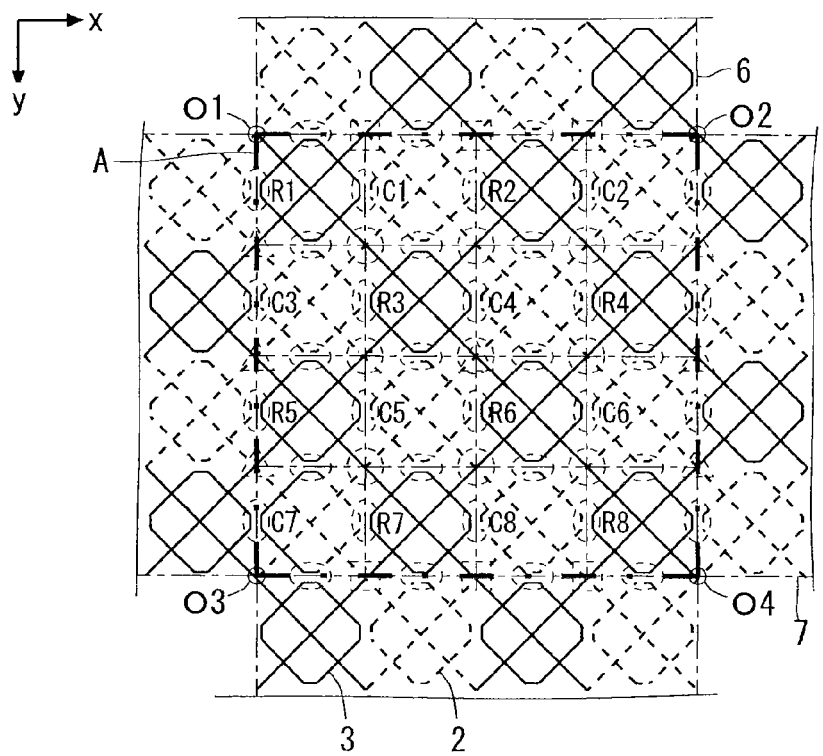

Next, a result of comparing the other touch screen illustrated in FIG. 21 with the touch screen 1 illustrated in FIG. 15 will be described with reference to FIGS. 23 and 16. As illustrated in FIG. 23, the number of intersection places between the detection column wiring 2 and the detection row wiring 3, i.e., the dotted circles within the grid A in the other touch screen, is 9 (=3×3). On the other hand, the above-described number of intersection places within the grid A in the touch screen 1 of FIG. 15 is only 1, as illustrated in FIG. 16.

Further, as illustrated in FIG. 23, the number of side-by-side travel places of the coupling portions, i.e., dotted ellipses within the grid A in the other touch screen, is 32. On the other hand, the above-described number of side-by-side travel places within the grid A in the touch screen 1 of FIG. 15 is 24, as illustrated in FIG. 16.

As can be seen above, when the number of block areas in the grid A is small, the number of intersection places between the detection column wiring 2 and the detection row wiring 3 is small, such that an effect of reducing the coupling capacitance (the above-described coupling capacitance of (1)) of all the intersection places can increase, and the number of side-by-side travel places of the coupling portions is small, such that an effect of reducing coupling capacitance (the above-described coupling capacitance of (2)) of all the side-by-side travel places can also increase. Accordingly, in order to increase the effect of reducing the inter-wiring capacitance of the bundle of wirings 6 in the column direction and the bundle of wirings 7 in the row direction by reducing the above-described coupling capacitances of (1) and (2), it is desirable that the length of one side of the block area be longer than a predetermined pitch of the inclined portion (the first to fourth inclined parts) and the number of block areas in the grid A be small, as illustrated in FIG. 15.

Figure 24:
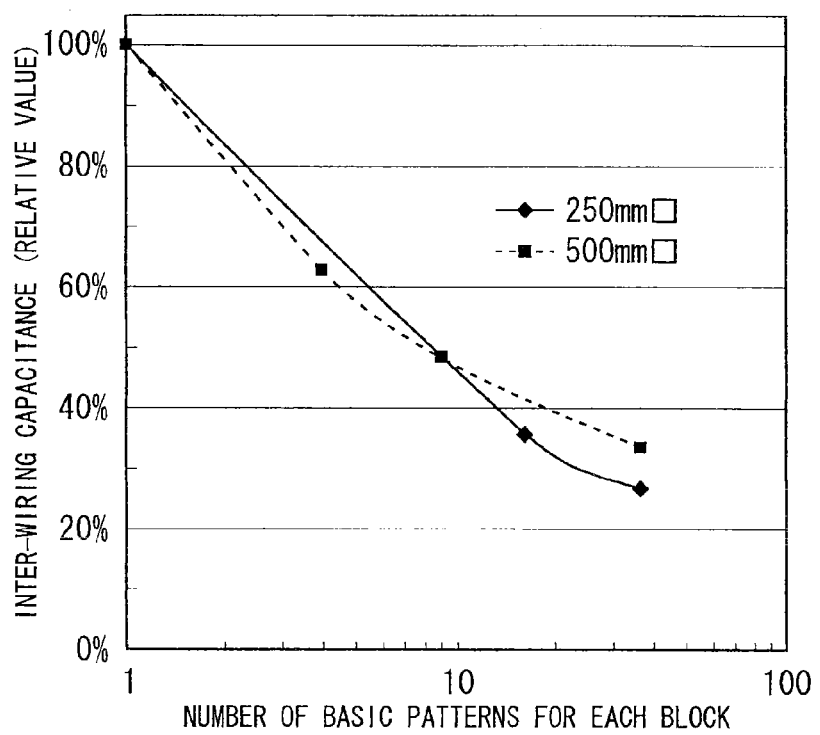
FIG. 24 is a diagram illustrating inter-wiring capacitance in the touch screen according to the second preferred embodiment.

Here, a tendency of the inter-wiring capacitance in the touch screen 1 according to the present preferred embodiment is illustrated in FIG. 24. This is a result of the TEG evaluation performed by the inventors. Here, inter-wiring capacitance when horizontal and vertical sizes of the grid A are about 5 mm and vertical and horizontal sizes of a basic pattern (a repetition pitch of the zigzag wiring) is 250 μm, and inter-wiring capacitance when the vertical and horizontal sizes are 500 μm are illustrated. Further, a length and a distance of the side-by-side travel place of the coupling portion are both about 20 μm.

FIG. 24 illustrates a result that matches the above-described comparison result. That is, increasing the number of basic patterns per block area makes the length of one side of the block area larger than the predetermined pitch of the inclined portion (the first to fourth inclined parts), and in any case, an effect of reducing the inter-wiring capacitance of the bundle of wirings 6 in the column direction and the bundle of wirings 7 in the row direction increases, as illustrated.

However, it is understood that even when each of the number of block areas in which the detection column wiring 2 is provided in the grid A and the number of block areas in which the detection row wiring 3 is provided is not 2, equivalent effects can be obtained and accordingly the number is not limited to 2.

Further, in the present preferred embodiment, the branch wiring 2e that electrically connects the first zigzag wiring 2a with the second zigzag wiring 2b, and the branch wiring 3e that electrically connects the fifth zigzag wiring 3a with the sixth zigzag wiring 3b are included, as described above. Accordingly, when one of the plurality of detection column wirings 2 and the plurality of detection row wirings 3 is disconnected, it is possible to suppress increase in resistance of the bundle of wirings 6 in the column direction and the bundle of wirings 7 in the row direction. Thus, it is possible to realize high-reliability touch position detection.

Further, the branch wirings 2e and 3e include inclined parts similar to the first and second inclined parts. Accordingly, the arrangement of detection column wirings 2 and the arrangement of the detection row wirings 3 can be made uniform. Thus, even when the detection column wiring 2 and the detection row wiring 3 are formed of an opaque high-conductivity material, transmittance when the display light output by the display panel passes through the touch screen 1 can be made uniform and generation of moiré fringes can be suppressed.

Third Preferred Embodiment

In the first and second preferred embodiments, each of the detection column wirings 2 provided in the block areas C1 and C2 constituting the grid A includes two sets of first and second zigzag wirings 2a and 2b, and each of the detection row wirings 3 provided in the block areas R1 and R2 constituting the grid A includes two sets of fifth and sixth zigzag wirings 3a and 3b. However, the sets of zigzag wirings included in each block area are not limited to two sets and three or more sets of zigzag wirings may be similarly used. In the present preferred embodiment, a configuration in which an odd number of sets (here, three sets) of zigzag wirings are included will be described.

Figure 25:
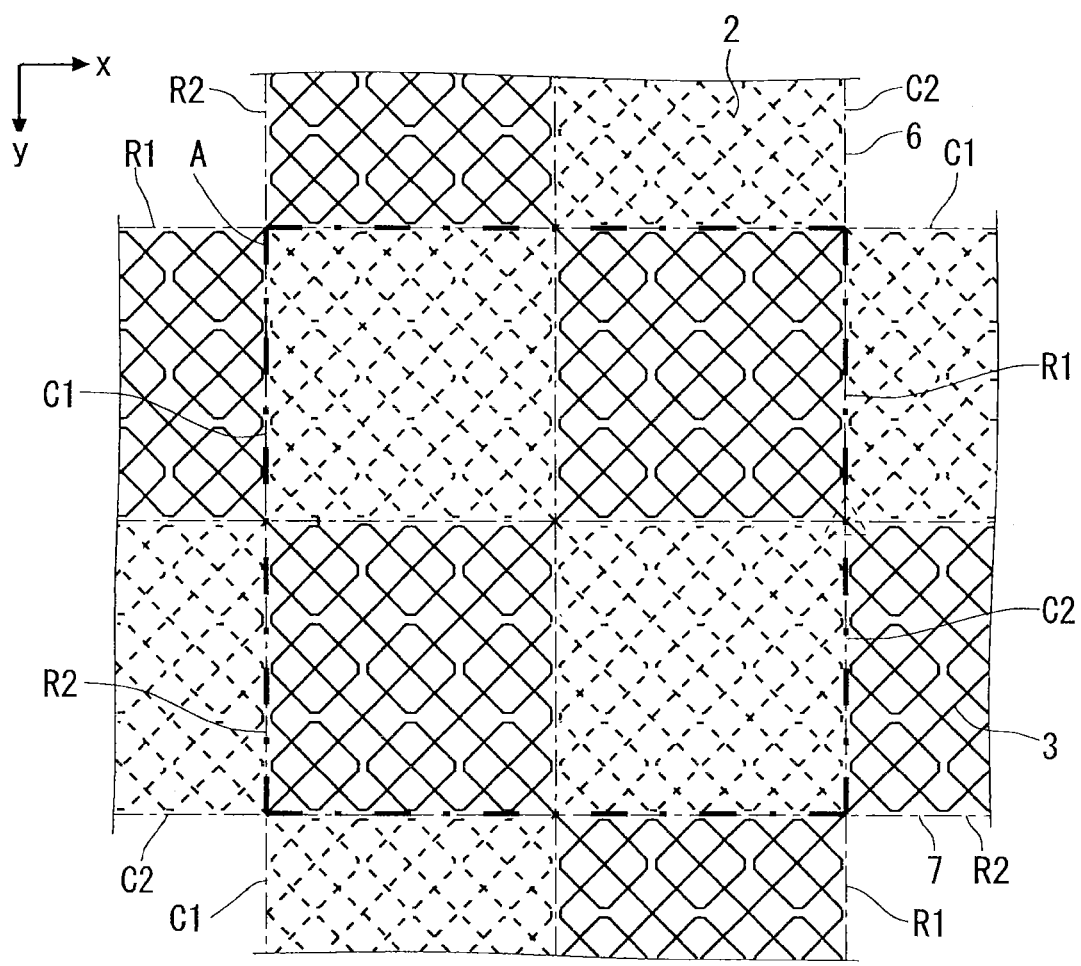

FIG. 25 is an enlarged view illustrating the vicinity of the grid A in the present preferred embodiment. Here, a plurality of (here, 4) rectangular block areas C1, C2, R1, and R2 obtained by dividing the grid A are defined, similar to the first and second preferred embodiments. Only a detection column wiring 2 is provided in each of the block areas C1 and C2 (the first block areas), and only a detection row wiring 3 is provided in each of the block areas R1 and R2 (second block areas). Further, the block areas C1 and C2 in which the detection column wirings 2 are provided and the block areas R1 and R2 in which the detection row wirings 3 are provided are alternately arranged in the column direction y and the row direction x as a whole, and form a checker pattern.

Further, in one grid A, a three-dimensional intersection between the detection column wiring 2 and the detection row wiring 3 is included only at one dotted circle (one place at which the block areas C1, C2, R1 and R2 contact) in FIG. 26, similar to the first and second preferred embodiments. That is, at the dotted circle in FIG. 26, one detection column wiring 2 in the block area C1 and one detection column wiring 2 in the block area C2 are coupled, and one detection row wiring 3 in the block area R1 and one detection row wiring 3 in the block area R2 are coupled.

Also, at the dotted triangle in FIG. 26, one detection row wiring 3 in the block area R1 and one detection row wiring 3 in the block area R2 are coupled, but the detection column wiring 2 in the block area C1 and the detection column wiring 2 in the block area C2 are arranged so that a coupling portion of the detection row wirings 3 is interposed therebetween, and are not coupled. Further, at a dotted square in FIG. 26, one detection column wiring 2 in the block area C1 and one detection column wiring 2 in the block area C2 are coupled, but the detection row wiring 3 of the block area R1 and the detection row wiring 3 in the block area R2 are arranged so that a coupling portion of the detection column wirings 2 is interposed therebetween, and are not coupled. Further, at four solid circle places O1 to O4 in FIG. 26, the detection column wirings 2 in the block areas C1 and C2 are separated and not coupled and the detection row wirings 3 in the block areas R1 and R2 are separated and not coupled.

Figure 27:
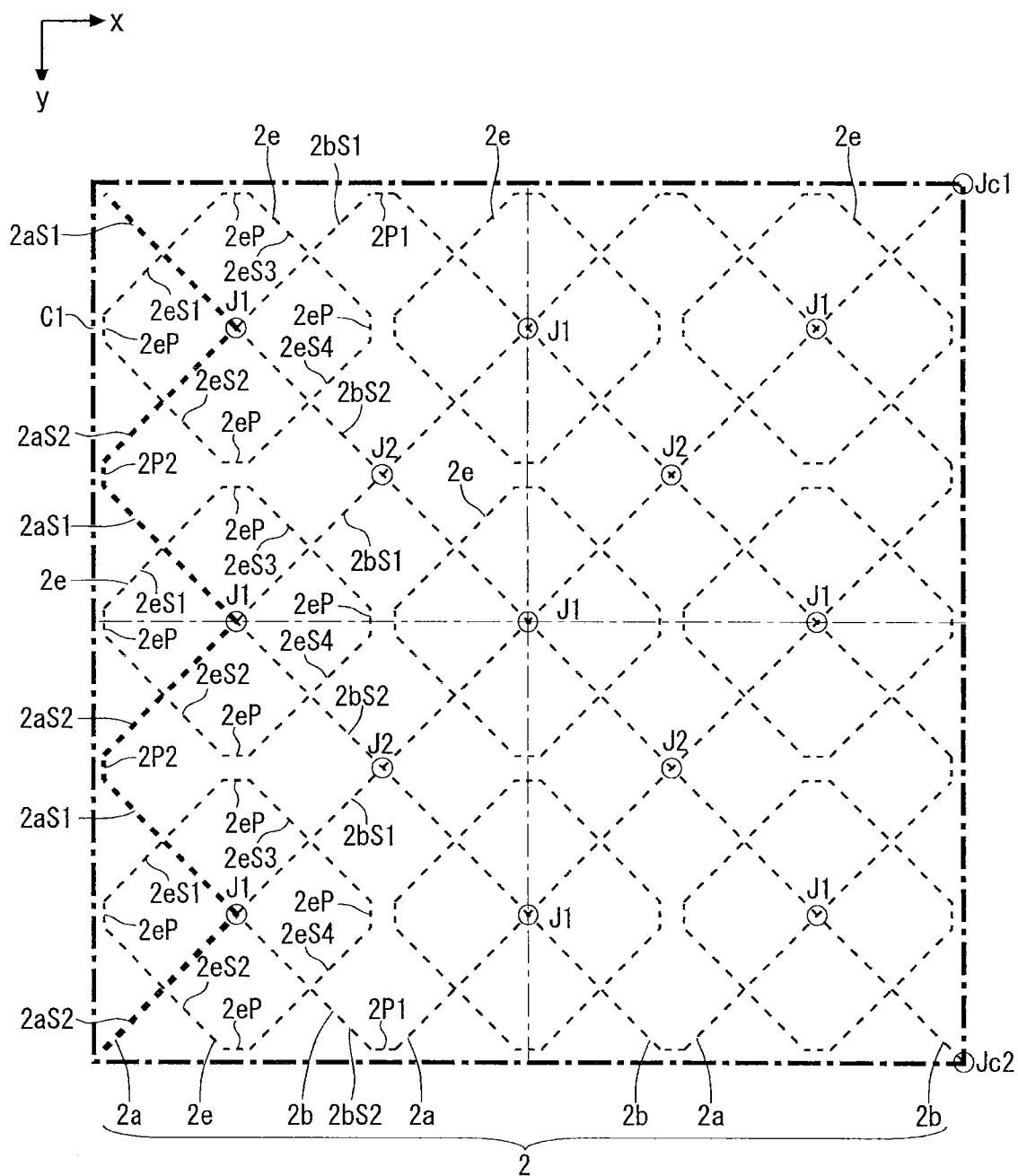
Figure 28:
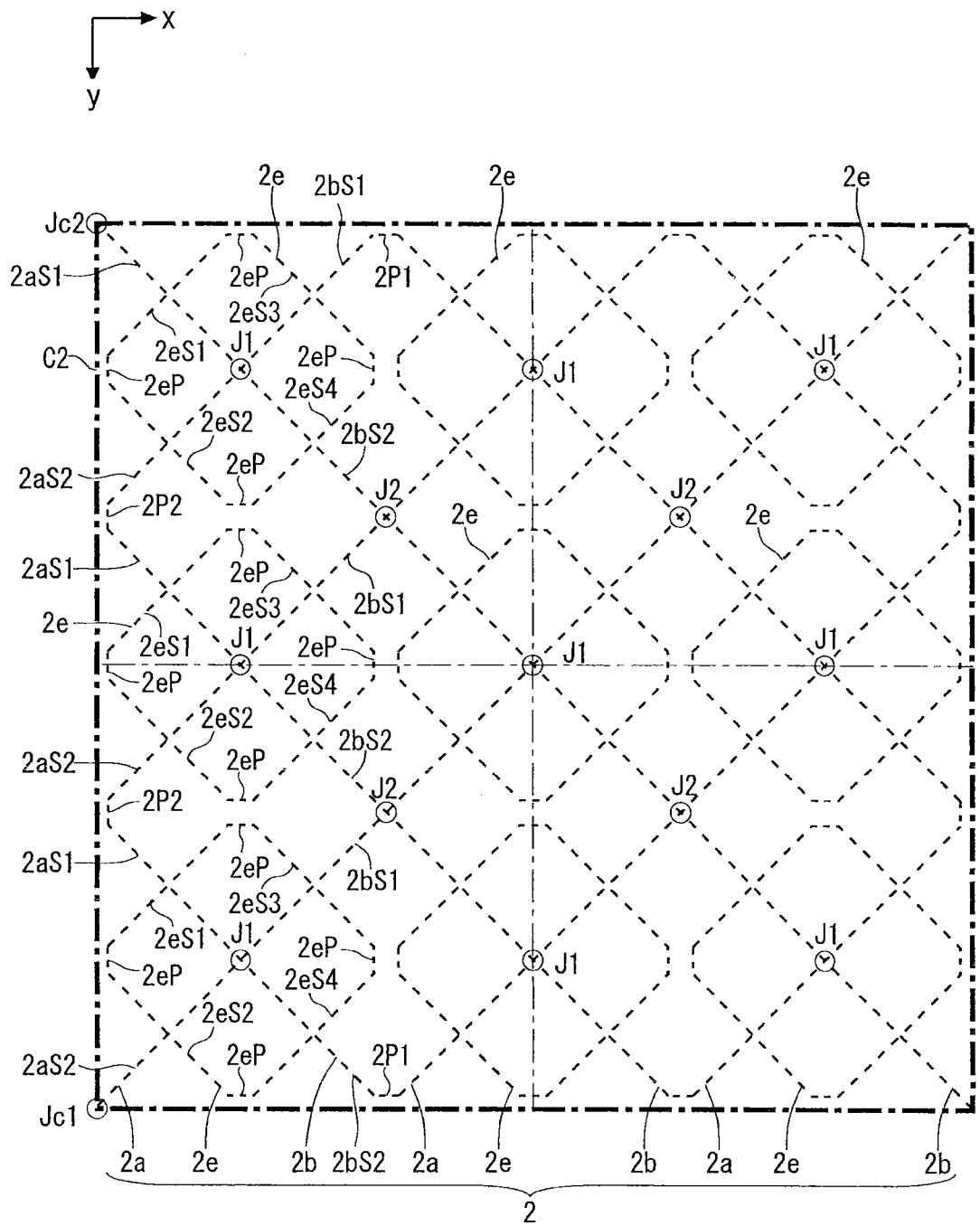

FIGS. 27 and 28 are enlarged views illustrating configurations of the detection column wirings 2 in the block areas C1 and C2, respectively. As illustrated in FIGS. 27 and 28, each of the detection column wirings 2 in the block areas C1 and C2 includes inclined portions 2aS1 and 2bS2 each constituting a first inclined part, and inclined portions 2aS2 and 2bS1 each constituting a second inclined part.

Here, the first inclined part (the inclined portions 2aS1 and 2bS2) is a partial wiring in a straight line shape having one end connected to a coupling point J1, and is repeatedly arranged with a predetermined pitch in the column direction y and the row direction x and inclined at an inclination angle of +45° (a first angle) with respect to the column direction y. Further, a positive direction of the inclination angle with respect to the column direction y in the drawings in the present preferred embodiment is opposite to the positive direction of the inclination angle with respect to the column direction y in the drawings in the first preferred embodiment.

The second inclined part (the inclined portions 2aS2 and 2bS1) is a partial wiring in a straight line shape having one end connected to the coupling point J1, and is repeatedly arranged with the above-described predetermined pitch in the column direction y and the row direction x and inclined in a direction opposite to the first inclined part with respect to the column direction y. That is, the second inclined part is inclined at the inclination angle of −45° with respect to the column direction y.

Next, a configuration of the detection column wiring 2 provided in the block area C1 will be described in greater detail with reference to FIG. 27.

This detection column wiring 2 includes a first zigzag wiring 2a (the first detection column wiring) extending in the column direction y, and a second zigzag wiring 2b (the second detection column wiring) extending in the column direction y. Further, in FIG. 27, only one first zigzag wiring 2a is indicated by a thick dotted line. Further, the detection column wiring 2 also includes a branch wiring 2e (the first branch wiring) that couples the first zigzag wiring 2a with the second zigzag wiring 2b.

The first zigzag wiring 2a includes the inclined portion 2aS1 inclined at an inclination angle of +45° with respect to the column direction y, the inclined portion 2aS2 inclined at an inclination angle of −45° with respect to the column direction y, and a coupling portion 2P2 and a coupling point J1 that couples the inclined portions, and the portions are repeatedly arranged in the column direction y. The second zigzag wiring 2b includes the inclined portion 2bS1 inclined at an inclination angle of −45° with respect to the column direction y, the inclined portion 2bS2 inclined at an inclination angle of +45° with respect to the column direction y, and the coupling points J1 and J2 that couple the inclined portions, and the portions are repeatedly arranged in the column direction y. Further, the first and second zigzag wirings 2a and 2b have a line symmetrical relationship.

Further, the first and second zigzag wirings 2a and 2b are alternately arranged in the row direction x in the block area C1, and coupled by the coupling point J1, the coupling portion 2P1 and the coupling point J2. Further, in the present preferred embodiment, three sets of first and second zigzag wirings 2a and 2b are arranged in the row direction x, the first set of the first zigzag wiring 2a and the second zigzag wiring 2b and the second set of the first zigzag wirings 2a, and the third set of the second zigzag wiring 2b and the first zigzag wiring 2a and the second set of the second zigzag wirings 2b are arranged in positions that are horizontally line symmetrical with respect to a center line along the column direction y of the block area C1.

Further, both ends (a negative y side end and a positive y side end) in the extending direction of the second zigzag wiring 2b located at a right end (a positive x side end) extend to vertexes Jc2 and Jc1 of the block area C1. Also, the detection column wiring 2 in the block area C1 is coupled and electrically connected with the detection column wiring 2 in the block area C2 located at a lower right side (the positive x side and the positive y side) and an upper right side (the positive x side and a negative y side) at the vertexes Jc2 and Jc1.

The branch wiring 2e includes an inclined part (inclined portions 2eS2 and 2eS3) similar to the first inclined part (the inclined portions 2aS1 and 2bS2), an inclined part (inclined portions 2eS1 and 2eS4) similar to the second inclined part (the inclined portions 2aS2 and 2bS1), and a coupling portion 2eP that connects two of the inclined portions 2eS1 to 2eS4. In the branch wiring 2e configured in this manner, the inclined portions 2eS2 and 2eS3 are parallel to the inclined portions 2aS1 and 2bS2, and the inclined portions 2eS1 and 2eS4 are parallel to the inclined portions 2aS2 and 2bS1.

Next, a configuration of the detection column wiring 2 provided in the block area C2 will be described with reference to FIG. 28. The detection column wiring 2 in this block area C2 is configured similar to the detection column wiring 2 in the block area C1 described above. However, in this block area C2, both ends (here, a negative y side end and a positive y side end) in the extending direction of the first zigzag wiring 2a located at a left end (a negative x side end) extend to vertexes Jc1 and Jc2 of the block area C2. Also, the detection column wirings 2 in the block area C2 are coupled and electrically connected with the detection column wirings 2 in the block area C1 located at a lower left side (a negative x side and a positive y side) and an upper left side (a negative x side and a negative y side) at the vertexes Jc1 and Jc2. Further, the detection column wirings 2 in the block areas C1 and C2 have substantially the same shape before and after rotation even when the detection column wirings 2 are rotated 90° around the coupling point J1 centered at each of the block areas C1 and C2 and are point symmetrical to the coupling point J1.

Figure 30:
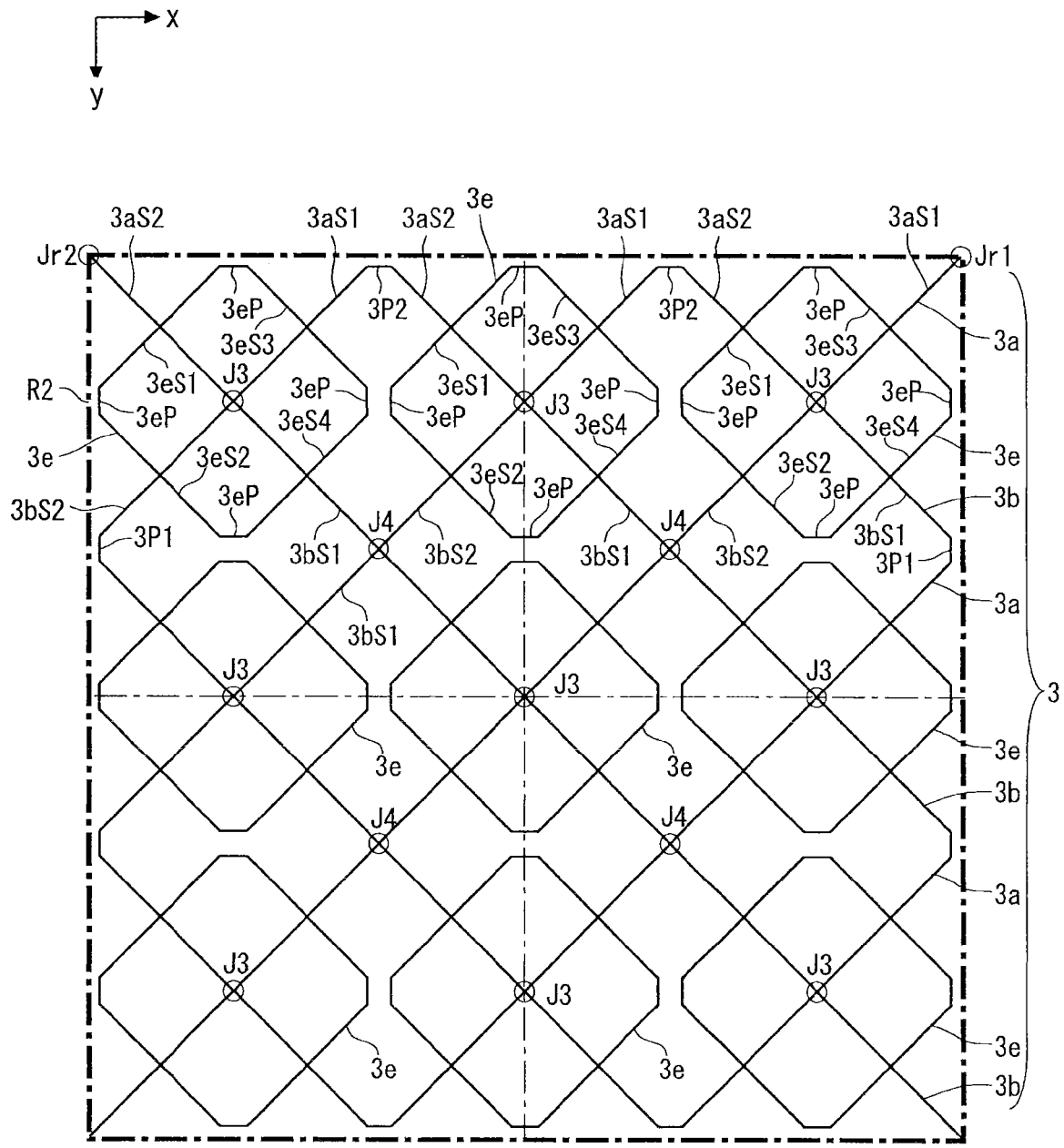

FIGS. 29 and 30 are enlarged views illustrating configurations of the detection row wirings 3 in the block areas R1 and R2. The configuration of the detection row wirings 3 in the block areas R1 and R2 is similar to that of the detection column wirings 2 in the block areas C1 and C2 illustrated in FIGS. 27 and 28.

That is, the detection row wiring 3 in the block areas R1 and R2 includes a third inclined part (inclined portions 3aS1 and 3bS2) repeatedly arranged with the above-described predetermined pitch in the column direction y and the row direction x and inclined at an inclination angle of +45° with respect to the row direction x, and a fourth inclined part (inclined portions 3aS2 and 3bS1) repeatedly arranged with the above-described predetermined pitch in the column direction y and the row direction x and inclined at an inclination angle of −45° with respect to the row direction x. Also, each of the detection row wirings 3 provided in the block areas R1 and R2 includes a fifth zigzag wiring 3a (the first detection row wiring) including inclined portions 3aS1 and 3aS2 and extending in the row direction x, and a sixth zigzag wiring 3b (the second detection row wiring) including inclined portions 3bS1 and 3bS2 and extending in the row direction x. Further, the fifth and sixth zigzag wirings 3a and 3b have a line symmetrical relationship.

Further, the detection row wirings 3 provided in the block areas R1 and R2 also include a branch wiring 3e (a second branch wiring) that connects the fifth zigzag wiring 3a with the sixth zigzag wiring 3b. This branch wiring 3e includes an inclined part (inclined portions 3eS1 and 3eS4) similar to the third inclined part (the inclined portions 3aS1 and 3bS2), and an inclined part (inclined parts 3eS2 and 3eS3) similar to the fourth inclined part (the inclined portions 3aS2 and 3bS1).

However, portions at a lower left side (a negative x side and a positive y side) and a lower right side (a positive x side and a positive y side) of the detection row wiring 3 of the block area R1 extend to vertexes Jr1 and Jr2 of the block area R1, respectively. Also, the detection row wiring 3 of the block area R1 is coupled with the detection row wiring 3 in the block area R2 located at a lower left side (the negative x side and the positive y side) and a lower right side (a positive x side and a positive y side), at the vertexes Jr1 and Jr2. Further, portions at an upper left side (the negative x side and the negative y side) and an upper right side (the positive x side and the negative y side) of the detection row wiring 3 in the block area R2 extend to vertexes Jr2 and Jr1 of the block area R2, respectively. Also, the detection row wiring 3 in the block area R2 is coupled with the detection row wiring 3 in block area R1 located at the upper left side (the negative x side and the negative y side) and the upper right side (the positive x side and the negative y side), at the vertexes Jr1 and Jr2.

Thus, while the two sets of first zigzag wirings 2a and second zigzag wirings 2b are provided in the block areas C1 and C2, respectively, in the first and second preferred embodiments, three sets of first zigzag wirings 2a and second zigzag wirings 2b are provided in the present preferred embodiment. Similarly, three sets of first zigzag wirings 3a and second zigzag wirings 3b are provided in the block areas R1 and R2, respectively.

As described above, according to the present preferred embodiment, the intersection area (the grid A) between the bundle of wirings 6 in the column direction and the bundle of wirings 7 in the row direction is divided into a plurality of block areas, only any one of the detection column wiring 2 and the detection row wiring 3 is included in each block area, and the block area including only the detection column wiring 2 and the block area including only the detection row wiring 3 are alternately arranged in row and column directions, similar to the first and second preferred embodiments. Accordingly, the number of intersections between the detection column wiring 2 and the detection row wiring 3 can be greatly reduced and the inter-wiring capacitance between the detection column wiring 2 and the detection row wiring 3 near the intersection portion can be reduced.

Fourth Preferred Embodiment

The detection column wirings 2 provided in the block areas C1 and C2 and the detection row wirings 3 provided in the block areas R1 and R2 described above are wirings of the separate wiring layers. For this reason, even when the wiring patterns of the block areas C1, C2, R1 and R2 are equivalent, wiring widths of the detection column wiring 2 and the detection row wiring 3 are slightly different, for example, due to constraints on manufacture, which may cause transmittance for a combined and used display light from the display device or reflectance for an external light, and wavelength spectra of a transmitted light or a reflected light to be different between the block areas C1 and C2 and the block areas R1 and R2. For this reason, there is a problem in that a difference in light and shade or color between the block areas C1 and C2 and the block areas R1 and R2 is visible as a pattern.

In the present preferred embodiment, some of the detection column wirings 2 in the block areas C1 and C2 of the grid A in the third preferred embodiment are replaced with the floating wiring 3F of the same layer as the detection row wiring 3, and some of the detection row wirings 3 in the block areas R1 and R2 are replaced with the floating wiring 2F of the same layer as the detection column wiring 2. Accordingly, in the present preferred embodiment, different light and shade or colored areas are finer than the block area, in other words, a repetition frequency (a repetition count) of a light and shade pattern or a colored pattern increases so that it is not easily visible.

Figure 31:
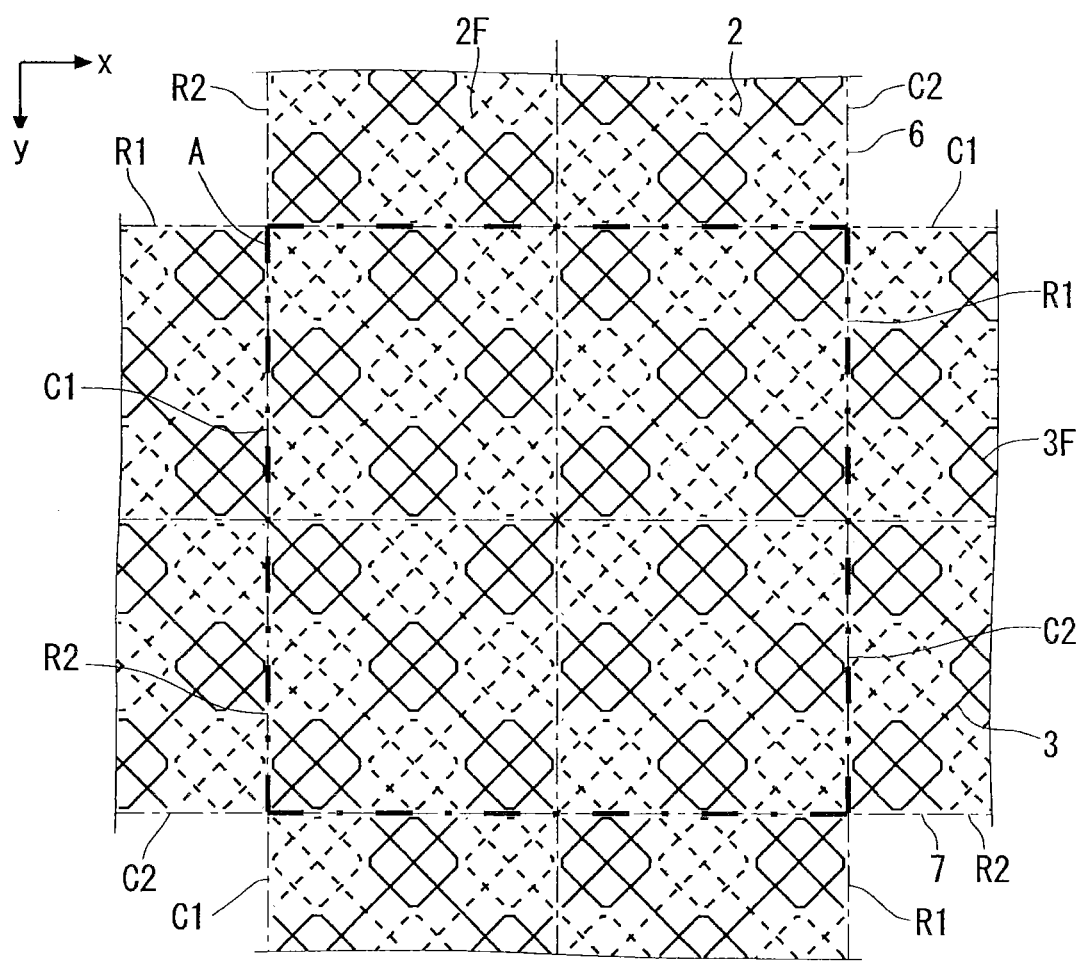
FIGS. 31 to 36 are enlarged plan views each illustrating a configuration of a touch screen according to a fourth preferred embodiment.

FIG. 31 is an enlarged view illustrating the vicinity of the grid A in the present preferred embodiment. Here, a plurality of (here, 4) rectangular block areas C1, C2, R1, and R2 obtained by dividing the grid A are defined, and detection column wirings 2 and floating wirings 3F (first floating wirings) formed in the same wiring layer as the bundle of wirings 7 in the row direction (detection row wirings 3) are provided in each of the block areas C1 and C2 (the first block areas). This floating wiring 3F is a wiring of the same wiring layer as the detection row wiring 3, but does not constitute a part of the bundle of wirings 7 in the row direction and is in a state of non-connection with the bundle of wirings 6 in the column direction and the bundle of wirings 7 in the row direction, i.e., in a floating state.

Further, the detection row wiring 3, and the floating wiring 2F (a second floating wiring) formed in the same wiring layer as the bundle of wirings 6 in the column direction (the detection column wiring 2) are provided in each of the block areas R1 and R2 (the second block areas). This floating wiring 2F is a wiring of the same wiring layer as the detection column wiring 2, but does not constitute a part of the bundle of wirings 6 in the column direction and is in a state of non-connection with the bundle of wirings 6 in the column direction and the bundle of wirings 7 in the row direction, i.e., in a floating state.

Further, the block areas C1 and C2 in which the detection column wirings 2 are provided and the block areas R1 and R2 in which the detection row wirings 3 are provided are alternately arranged in the column direction y and the row direction x as a whole, and form a checker pattern.

Figure 32:
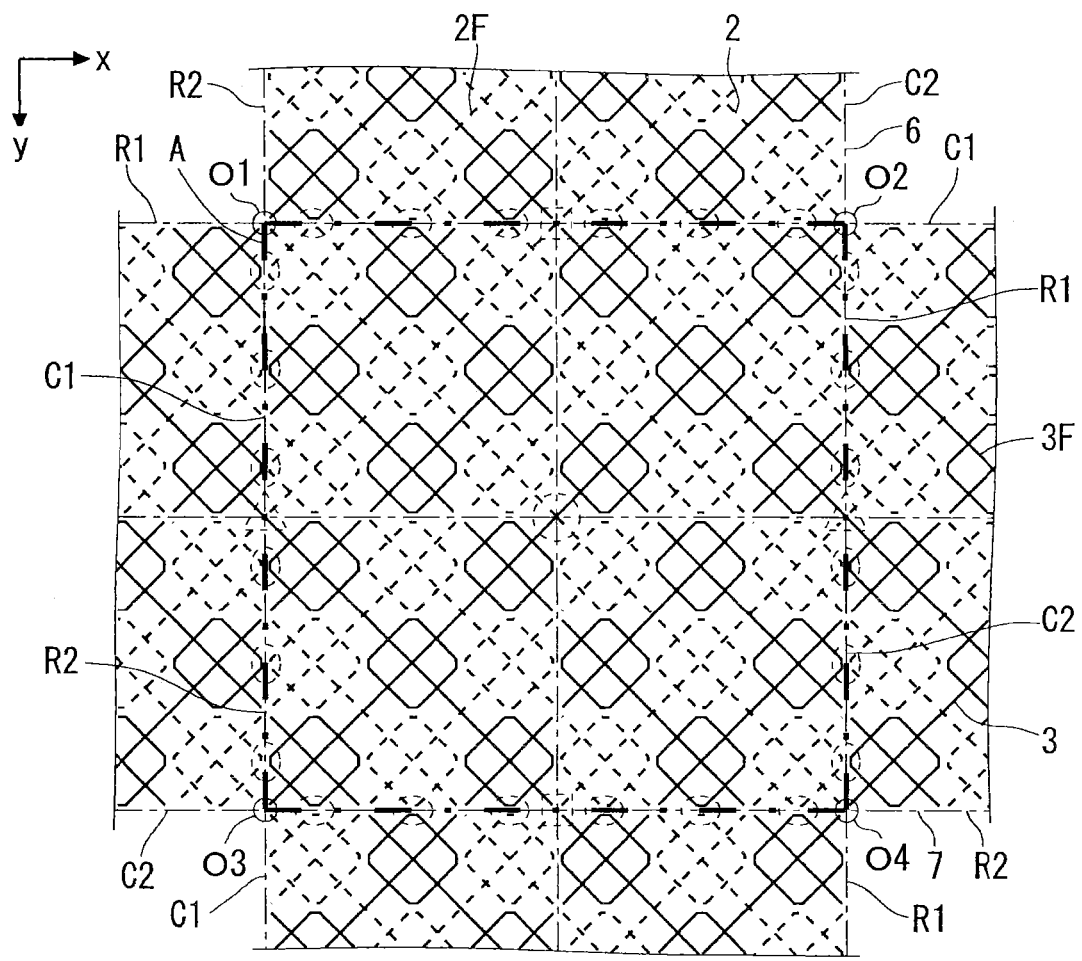

Further, in one grid A, a three-dimensional intersection between the detection column wiring 2 and the detection row wiring 3 is included only at one dotted circle (one place at which the block areas C1, C2, R1 and R2 contact) in FIG. 32, similar to the first to third preferred embodiments. That is, at the dotted circle in FIG. 32, one detection column wiring 2 in the block area C1 and one detection column wiring 2 in the block area C2 are coupled, and one detection row wiring 3 in the block area R1 and one detection row wiring 3 in the block area R2 are coupled.

Also, at the dotted triangle in FIG. 32, one detection row wiring 3 in the block area R1 and one detection row wiring 3 in the block area R2 are coupled, but the detection column wiring 2 in the block area C1 and the detection column wiring 2 in the block area C2 are arranged so that a coupling portion of the detection row wirings 3 is interposed therebetween, and are not coupled. Further, at the dotted square in FIG. 32, one detection column wiring 2 in the block area C1 and one detection column wiring 2 in the block area C2 are coupled, but the detection row wiring 3 in the block area R1 and the detection row wiring 3 in the block area R2 are arranged so that a coupling portion of the detection column wirings 2 is interposed therebetween, and are not coupled. Further, at four solid circles O1 to O4 in FIG. 32, the detection column wirings 2 in the block areas C1 and C2 are separated and not coupled, and the detection row wirings 3 in the block areas R1 and R2 are separated and not coupled.

Figure 33:
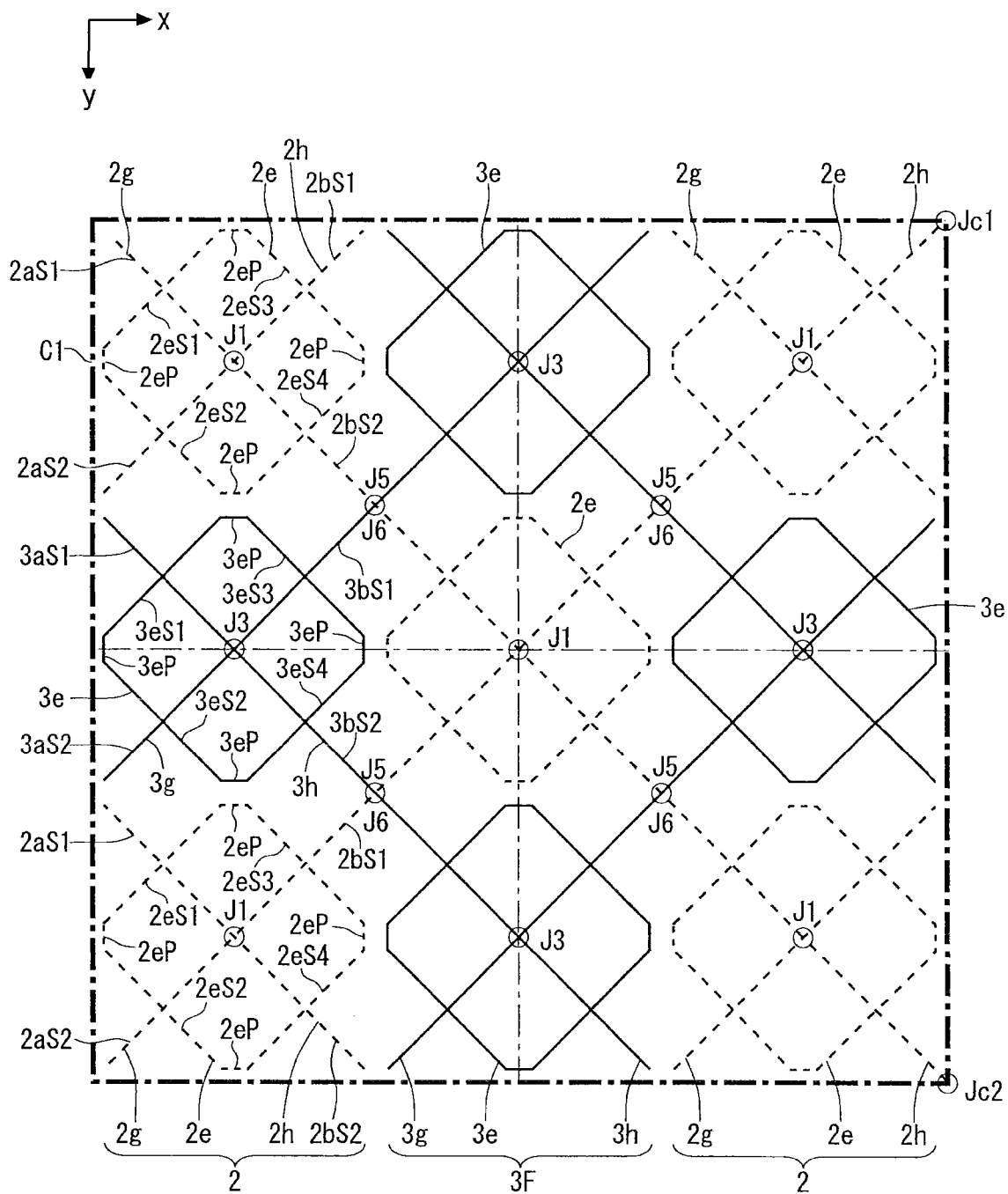
Figure 34:
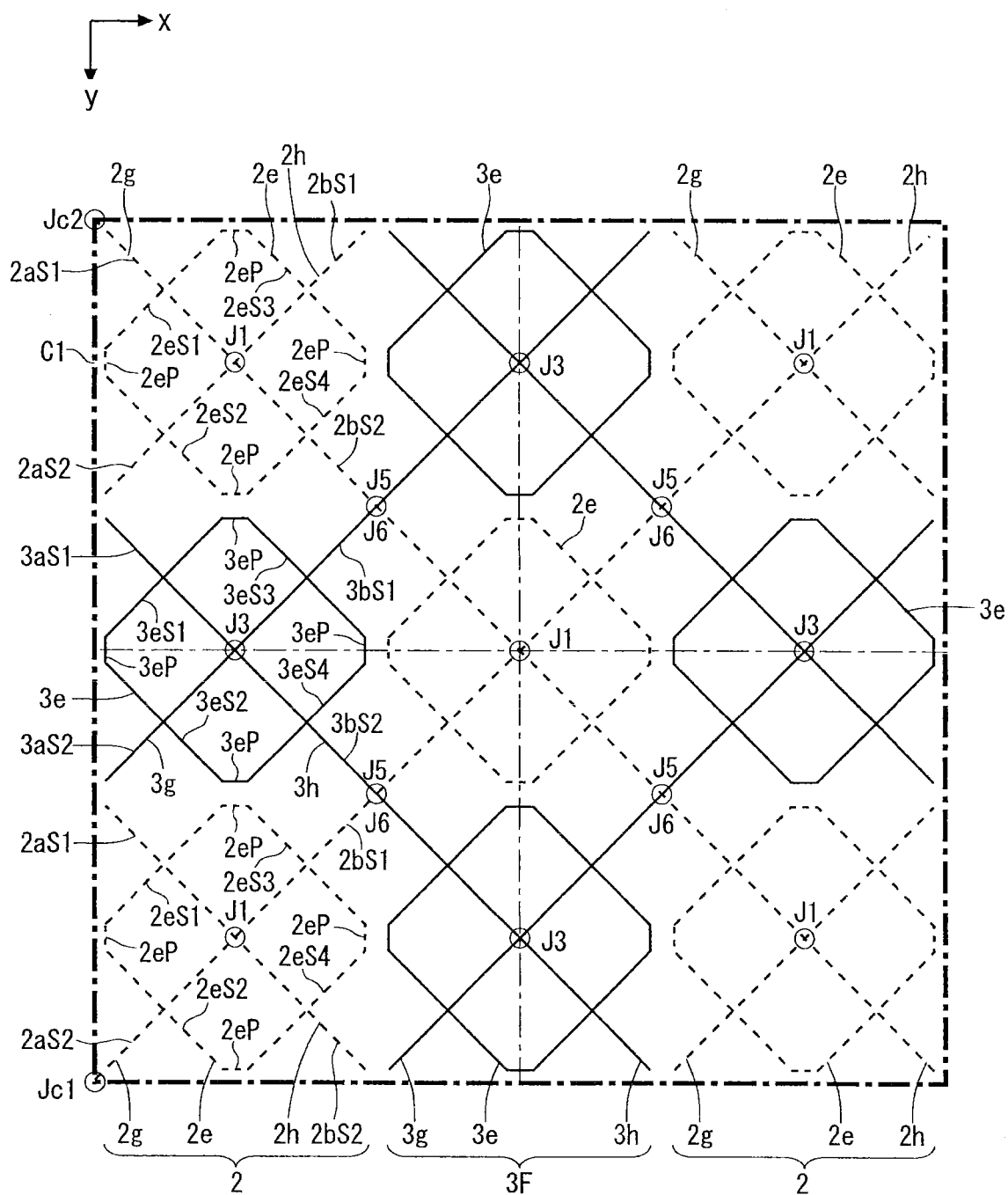

FIGS. 33 and 34 are enlarged views illustrating a configuration of the detection column wiring 2 and the floating wiring 3F in the block areas C1 and C2, respectively. As illustrated in FIGS. 33 and 34, each of the detection column wirings 2 in the block areas C1 and C2 includes inclined portions $2a$S1 and $2b$S2 each constituting a first inclined part, and inclined portions $2a$S2 and $2b$S1 each constituting a second inclined part.

Similarly, each of the floating wirings 3F in the block areas C1 and C2 includes inclined portions $3a$S1 and $3b$S2 each constituting an inclined part similar to the first inclined part (the inclined portions $2a$S1 and $2b$S2), and inclined portions $3a$S2 and $3b$S1 each constituting an inclined part similar to the second inclined part (the inclined portions $2a$S2 and $2b$S1).

Also, a >-shaped wiring $2g$ in a ">" shape including the inclined portion $2a$S1 and the inclined portion $2a$S2 of the detection column wiring 2, and a >-shaped wiring $3g$ in a ">" shape including the inclined portion $3a$S1 and the inclined portion $3a$S2 of the floating wiring 3F are alternately repeatedly arranged with a predetermined pitch in the column direction y and the row direction x.

Further, similarly, a <-shaped wiring $2h$ in a "<" shape including the inclined portion $2b$S2 and the inclined portion $2b$S1 of the detection column wiring 2, and a <-shaped wiring $3h$ in a "<" shape including the inclined portion $3b$S2 and the inclined portion $3b$S1 of the floating wiring 3F are alternately repeatedly arranged with a predetermined pitch in the column direction y and the row direction x.

Further, the >-shaped wiring $2g$ (the first detection column wiring) and the <-shaped wiring $2h$ (the second detection column wiring) of the detection column wiring 2 have a line symmetrical relationship, and the >-shaped wiring $3g$ (the first portion floating wiring) and the <-shaped wiring $3h$ (the second portion floating wiring) of the floating wiring 3F also have a line symmetrical relationship.

Here, the first inclined part (inclined portions $2a$S1 and $2b$S2) of the detection column wiring 2 and the inclined part (inclined portions $3a$S1 and $3b$S2) similar to the first inclined part of the floating wiring 3F are inclined at an inclination angle of +45° (a first angle) with respect to the column direction y.

The second inclined part (the inclined portions $2a$S2 and $2b$S1) of the detection column wiring 2, and the inclined part (the inclined portions $3a$S2 and $3b$S1) similar to the second inclined part of the floating wiring 3F are inclined in a direction opposite to the first inclined part with respect to the column direction y. That is, the inclined parts (the inclined portions $2a$S2, $2b$S1, $3a$S2, and $3b$S1) are inclined at the inclination angle of −45° with respect to the column direction y.

Next, a configuration of the detection column wiring 2 and the floating wiring 3F provided in the block area C1 will be described in greater detail with reference to FIG. 33. The configuration illustrated in FIG. 33 is a configuration in which some of the detection column wirings 2 in the block area C1 in the third preferred embodiment described with reference to FIG. 27 are replaced with the floating wiring 3F of the same layer as the detection row wiring 3. As described above, the floating wiring 3F is a wiring of the same layer as the detection row wiring 3, but does not constitute a part of the bundle of wirings 7 in the row direction and is in a state in which the wiring connection is closed in the block, i.e., in a floating state.

As illustrated in FIG. 33, in the present preferred embodiment, the coupling portions 2P1 and 2P2 of the third preferred embodiment do not exist, and the >-shaped wiring 2g including the inclined portion 2aS1 and the inclined portion 2aS2 and the <-shaped wiring 2h including the inclined portion 2bS2 and the inclined portion 2bS1 are coupled at a coupling point J1. In the block area C1, such detection wiring patterns are coupled and extended in a +45° direction and a −45° direction at a coupling point J5.

Further, the detection column wiring 2 includes a branch wiring 2e (a first branch wiring) that couples the >-shaped wiring 2g with the <-shaped wiring 2h. Further, the >-shaped wiring 2g and the <-shaped wiring 2h have a line symmetrical relationship.

Meanwhile, the >-shaped wiring 3g including the inclined portion 3aS1 and the inclined portion 3aS2 of the floating wiring 3F of the same layer as the detection row wiring 3, and the <-shaped wiring 3h including the inclined portion 3bS2 and the inclined portion 3bS1 are coupled at a coupling point J3. In the block area C1, such floating wiring patterns are coupled and extended in a +45° direction and a −45° direction at a coupling point J6.

In this case, the detection wiring pattern in which the >-shaped wiring 2g and the <-shaped wiring 2h are coupled at the coupling point J1, and the floating wiring pattern in which the >-shaped wiring 3g and the <-shaped wiring 3h are coupled at the coupling point J3 are alternately arranged in a checker pattern shape within the block area C1.

Further, an upper end (a negative y side) of a <-shaped wiring 2h located at a right upper end (a positive x side and a negative y side) of the block area C1 extends to a vertex Jc1 of the block area C1. Further, a lower end (a positive y side) of a <-shaped wiring 2h located at a lower right end (the positive x side and the positive y side) of the block area C1 extends to a vertex Jc2 of the block area C1. Also, the detection column wiring 2 in the block area C1 is coupled and electrically connected with the detection column wiring 2 in the block area C2 located at the lower right side (the positive x side and the positive y side) and the upper right side (the positive x side and the negative y side), at the vertexes Jc2 and Jc1.

Further, as described above, the detection column wiring 2 according to the present preferred embodiment includes the branch wiring 2e (the first branch wiring) that couples the >-shaped wiring 2g and the <-shaped wiring 2h connected at the coupling point J1. This branch wiring 2e includes an inclined part (inclined portions 2eS2 and 2eS3) similar to the first inclined part (the inclined portions 2aS1 and 2bS2), an inclined part (inclined portions 2eS1 and 2eS4) similar to the second inclined part (the inclined portions 2aS2 and 2bS1), and a coupling portion 2eP that couples two of the inclined portions 2eS1 to 2eS4. In the branch wiring 2e configured in this manner, the inclined portions 2eS2 and 2eS3 are parallel to the inclined portions 2aS1 and 2bS2, and the inclined portions 2eS1 and 2eS4 are parallel to the inclined portions 2aS2 and 2bS1.

Similarly, the floating wiring 3F according to the present preferred embodiment includes a branch wiring 3e (a third branch wiring) that couples the >-shaped wiring 3g and the <-shaped wiring 3h coupled at the coupling point J3. This branch wiring 3e includes an inclined part (inclined portions 3eS2 and 3eS3) similar to the first inclined part (the inclined portions 2aS1 and 2bS2), and an inclined part (inclined portions 3eS1 and 3eS4) similar to the second inclined part (the inclined portions 2aS2 and 2bS1).

Next, a configuration of the detection column wiring 2 and the floating wiring 3F provided in the block area C2 will be described in greater detail with referenced to FIG. 34. The detection column wiring 2 and the floating wiring 3F in this block area C2 are configured similar to the detection column wiring 2 and the floating wiring 3F in the block area C1 described above.

However, in this block area C2, an upper end (the negative y side) of the >-shaped wiring 2g located at a left upper end (the negative x side and the negative y side) extends to the vertex Jc2 of the block area C2. Further, a lower end (the positive y side) of the >-shaped wiring 2g located at a lower left end (the negative x side and the positive y side) of the block area C2 extends to the vertex Jc1 of the block area C2.

Also, the detection column wiring 2 in the block area C2 is coupled and electrically connected with the detection column wiring 2 in the block area C1 located at the lower left side (the negative x side and the positive y side) and the upper left side (the negative x side and the negative y side), at the vertexes Jc1 and Jc2. Further, the detection column wirings 2 in the block areas C1 and C2 have substantially the same shape before and after rotation even when the detection column wirings 2 are rotated 90° around the coupling point J1 centered at each of the block areas C1 and C2 and are point symmetrical to the coupling point J1.

Figure 35:
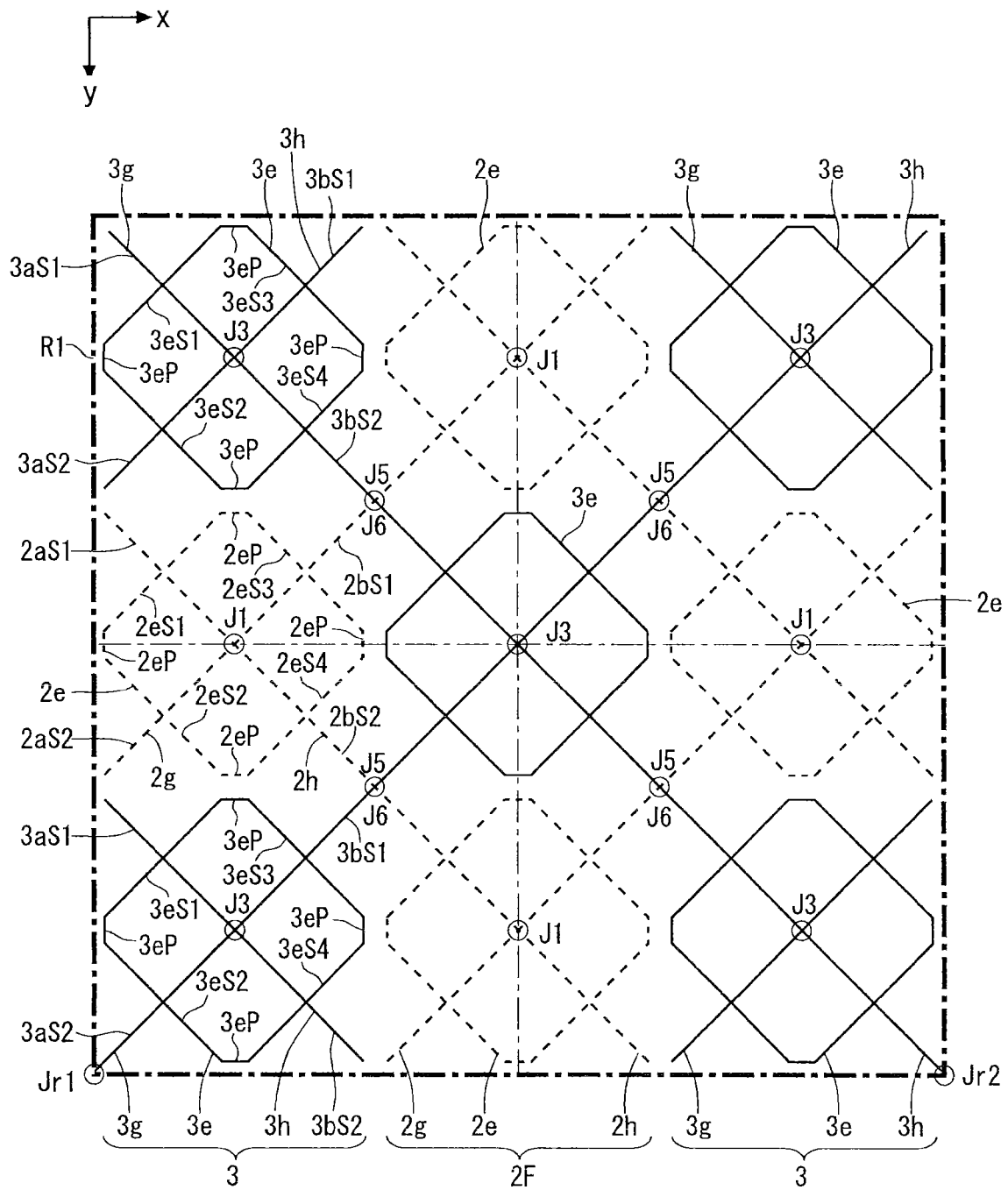
Figure 36:
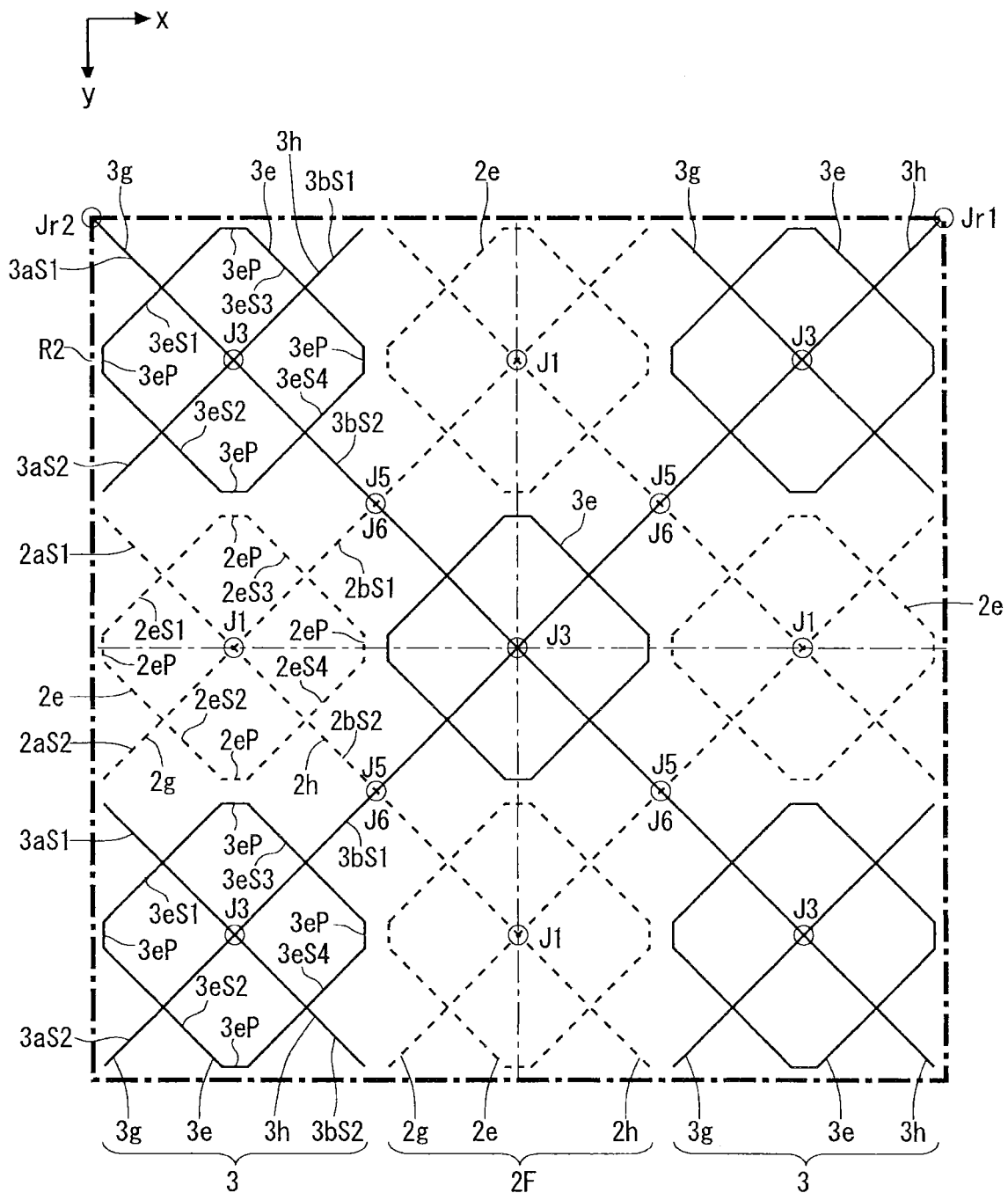

FIGS. 35 and 36 are enlarged views illustrating configurations of the detection row wiring 3 and the floating wiring 2F in the block areas R1 and R2, respectively. The configuration of the detection row wiring 3 and the floating wiring 2F in the block areas R1 and R2 is similar to the configuration of the detection column wiring 2 and the floating wiring 3F in the block areas C1 and C2 shown in FIGS. 33 and 34. That is, the configuration illustrated in FIGS. 35 and 36 is a configuration in which some of the detection row wirings 3 in the block areas R1 and R2 in the third preferred embodiment described with reference to FIGS. 29 and 30 are replaced with the floating wiring 2F of the same layer as the detection column wiring 2. As described above, this floating wiring 2F is a wiring of the same layer as the detection column wiring 2, but does not constitute a part of the bundle of wirings 6 in the column direction and is in a state in which the wiring connection is closed within the block, i.e., in a floating state.

The detection row wiring 3 in the block areas R1 and R2 includes a third inclined part (inclined portions 3aS1 and 3bS2) inclined at an inclination angle of +45° with respect to the row direction x, and a fourth inclined part (inclined portions 3aS2 and 3bS1) inclined at an inclination angle of −45° with respect to the row direction x.

Similarly, the floating wiring 2F in the block areas R1 and R2 includes inclined portions 2aS1 and 2bS2 that constitute an inclined part similar to the third inclined part (the inclined portions 3aS1 and 3bS2), respectively, and inclined portions 2aS2 and 2bS1 that constitute a similar inclined part similar to the fourth inclined part (the inclined portions 3aS2 and 3bS1), respectively.

Also, the >-shaped wiring 3g in a ">" shape including the inclined portion 3aS1 and the inclined portion 3aS2 of the detection row wiring 3 and the >-shaped wiring 2g in a ">"

shape including the inclined portion 2aS1 and the inclined portion 2aS2 of the floating wiring 2F are alternately repeatedly arranged with a predetermined pitch in the column direction y and the row direction x.

Similarly, the <-shaped wiring 3h in a "<" shape including the inclined portion 3bS2 and the inclined portion 3bS1 of the detection row wiring 3 and the <-shaped wiring 2h in a "<" shape including the inclined portion 2bS2 and the inclined portion 2bS1 of the floating wiring 2F are alternately repeatedly arranged with a predetermined pitch in the column direction y and the row direction x.

Further, the >-shaped wiring 3g (the first detection row wiring) and the <-shaped wiring 3h (the second detection row wiring) of the detection row wiring 3 have a line symmetrical relationship, and the >-shaped wiring 2g (the third portion floating wiring) and the <-shaped wiring 2h (the fourth portion floating wiring) of the floating wiring 2F have a line symmetrical relationship, i.e., both have a line symmetrical relationship.

Further, the detection row wiring 3 according to the present preferred embodiment includes a branch wiring 3e (a second branch wiring) that couples the >-shaped wiring 3g with the <-shaped wiring 3h coupled at a coupling point J3. This branch wiring 3e includes an inclined part (inclined portions 3eS2 and 3eS3) similar to the third inclined part (the inclined portions 3aS1 and 3bS2), and an inclined part (inclined portions 3eS1 and 3eS4) similar to the fourth inclined part (the inclined portions 3aS2 and 3bS1).

Further, the floating wiring 2F according to the present preferred embodiment includes a branch wiring 2e (a fourth branch wiring) that couples the >-shaped wiring 2g and the <-shaped wiring 2h coupled at a coupling point J1. This branch wiring 2e includes an inclined part (inclined portions 2eS2 and 2eS3) similar to the third inclined part (the inclined portions 3aS1 and 3bS2), and an inclined part (inclined portions 2eS1 and 2eS4) similar to the fourth inclined part (the inclined portions 3aS2 and 3bS1).

However, portions at a lower left side (the negative x side and the positive y side) and a lower right side (the positive x side and the positive y side) of the detection row wiring 3 of the block area R1 extend to the vertexes Jr1 and Jr2 of the block area R1, respectively. Also, the detection row wiring 3 of the block area R1 is coupled with the detection row wiring 3 in the block area R2 located at the lower left side (the negative x side and the positive y side) and the lower right side (the positive x side and the positive y side), at the vertexes Jr1 and Jr2. Further, portions at the upper left side (the negative x side and the negative y side) and the upper right side (the positive x side and the negative y side) of the detection row wiring 3 in the block area R2 extend to the vertexes Jr2 and Jr1 of the block area R2, respectively. Also, the detection row wiring 3 in the block area R2 is coupled with the detection row wiring 3 in the block area R1 located at an upper left side (the negative x side and the negative y side) and an upper right side (the positive x side and the negative y side), at the vertexes Jr1 and Jr2.

As described above, according to the present preferred embodiment, some of the detection column wirings 2 in the block areas C1 and C2 are replaced with the floating wiring of the same wiring layer as the detection row wiring 3, and some of the detection row wirings 3 in the block areas R1 and R2 are replaced with the floating wiring of the same wiring layer as the detection column wiring 2. Accordingly, the problem that the block area pattern is visible due to a difference in the transmittance, the reflectance, and wavelength spectrum between the block areas C1 and C2 and the block areas R1 and R2, which is caused by a slight difference in wiring width between the detection column wirings 2 and the detection row wirings 3 due to the constraints of manufacture, can be resolved. That is, a different light and shade area pattern or a colored area pattern is finer than the block area pattern, in other words, a repetition frequency of a light and shade pattern or a colored pattern increases, so that the block area pattern cannot be easily visible. Further, it is possible to obtain effects similar to those in the first to third preferred embodiments.

Further, in the present preferred embodiment, the branch wiring 2e that electrically connects the first zigzag wiring 2a with the second zigzag wiring 2b, and the branch wiring 3e that electrically connects the fifth zigzag wiring 3a with the sixth zigzag wiring 3b are included. Accordingly, when one of the plurality of detection column wirings 2 and the plurality of detection row wirings 3 is disconnected, increase in resistance of the bundle of wirings 6 in the column direction and the bundle of wirings 7 in the row direction can be suppressed. Thus, it is possible to realize highly reliable touch position detection.

Further, each of the branch wirings 2e and 3e includes the inclined parts similar to the first and second inclined part. Accordingly, the arrangement of the detection column wirings 2 and the arrangement of the detection row wirings 3 can be made uniform. Thus, when the detection column wiring 2 and the detection row wiring 3 are formed of an opaque high-conductivity material, transmittance when the display light output from the display panel passes through the touch screen 1 can be made uniform and the generation of moiré fringes can be suppressed.

Further, the patterns of the floating wiring 3F in which the >-shaped wiring 3g and the <-shaped wiring 3h are coupled at the coupling point J3 need not necessarily be coupled at the coupling point J6 and may be independent.

Fifth Preferred Embodiment

In the configuration described in the fourth preferred embodiment, coupling portions 2P1, 2P2, 3P1 and 3P2 in the configuration of the third preferred embodiment do not exist. For this reason, non-uniformity of the wiring pattern caused by presence of both a coupling part and a non-coupling part of the inclined wiring is easily visible. Further, since a repetition pitch in the x direction and the y direction of the coupling portion in the fourth preferred embodiment is twice the pitch of the third preferred embodiment, the coupling portion itself is easily visible.

Further, since one of the detection column wiring 2 and the detection row wiring 3 is separated at the coupling points Jc1, Jc2, Jr1 and Jr2 in each preferred embodiment, non-uniformity of the intersection part of the inclined wirings in the block area is easily visible.

In the present preferred embodiment, a dummy connection wiring is provided for the non-coupling portion of the inclined wiring, so that the non-uniformity of the wiring pattern cannot be easily visible.

FIG. 37 is an enlarged view illustrating the vicinity of the grid A in the present preferred embodiment. A configuration of the block areas C1, C2, R1 and R2 or a configuration of the detection column wiring 2, the detection row wiring 3, and the floating wirings 2F and 3F in the block area are similar to those described in the fourth preferred embodiment. In the present preferred embodiment, dummy connection wirings 2G and 3G are provided at places (indicated by solid circles P, Q, U, W in FIG. 37) that are boundaries between the block areas in which the inclined wirings at angles of +45° and −45° are separated in the configuration described in the fourth preferred embodiment, as illustrated in FIG. 37.

FIGS. 38A to 38D are enlarged views of the separation places P, Q, U and W of the inclined wiring, respectively. Further, FIGS. 38A and 38B are enlarged views of the separation places P and Q on the boundaries of a set of block areas (the two adjacent block areas C1 and R1, block areas C1 and R2, block areas C2 and R1, or block areas C2 and R2). Further, FIG. 38C is an enlarged view of the separation place U on the boundary of the two block areas R1 and R2 adjacent in a diagonal direction. FIG. 38D is an enlarged view of the separation place W on the boundary of the two block areas C1 and C2 adjacent in a diagonal direction.

As illustrated in FIG. 38A, the touch screen 1 according to the present preferred embodiment includes a dummy connection wiring 3G (a first dummy wiring) in a separation portion (a separation place P) at a boundary of a set of block areas (the one block area and the other block area). That is, the touch screen 1 includes, in a separation portion (a separation place P) between a first end part of the detection column wiring 2 provided in the one of the adjacent block areas and a second end part of the floating wiring 2F provided in the other block area, the dummy connection wiring 3G formed in a different wiring layer from the first and second end parts.

Similarly, the touch screen 1 according to the present preferred embodiment includes a dummy connection wiring 2G (a second dummy wiring) in a separation portion (separation place P) at a boundary between a set of block areas (the block area and the other block area). That is, the touch screen 1 includes, in a separation portion (a separation place P) between a third end part of the detection row wiring 3 provided in the one of the adjacent block areas and a fourth end part of the floating wiring 3F provided in the other block area, the dummy connection wiring 2G formed in a different wiring layer from the third and fourth end parts.

Also, both end parts of the dummy connection wiring 3G are arranged to partially overlap with the first end part of the detection column wiring 2 and the second end part of the floating wiring 2F in a plan view, respectively. Further, both end parts of the dummy connection wiring 2G are arranged to partially overlap with the third end part of the detection row wiring 3 and the fourth end part of the floating wiring 3F in a plan view, respectively. Further, such dummy connection wirings 3G and 2G of the different wiring layers are arranged to intersect. Further, the dummy connection wirings 2G and 3G are all in a floating state. Also, the dummy connection wiring 3G is inclined at +45° with respect to the column direction y, and the dummy connection wiring 2G is inclined at −45° with respect to the column direction y.

Similarly, the touch screen 1 according to the present preferred embodiment includes a dummy connection wiring 3G in a separation portion (a separation place Q) at a boundary between a set of block areas, as illustrated in FIG. 38B. That is, the touch screen 1 includes, in a separation portion (a separation place Q) between a first end part of the detection column wiring 2 provided in the one block area and a second end part of the floating wiring 2F provided in the other block area, the dummy connection wiring 3G formed in a different wiring layer from the first and second end parts.

Similarly, the touch screen 1 according to the present preferred embodiment includes a dummy connection wiring 2G in a separation portion (a separation place Q) at a boundary between a set of block areas. That is, the touch screen 1 includes, in a separation portion (a separation place Q) between a third end part of the detection row wiring 3 provided in the one block area and a fourth end part of the floating wiring 3F provided in the other block area, the dummy connection wiring 2G formed in a different wiring layer from the third end part and the fourth end part.

Also, both end parts of the dummy connection wiring 3G are arranged to partially overlap with the first end part of the detection column wiring 2 and the second end part of the floating wiring 2F in a plan view, respectively. Further, both end parts of the dummy connection wiring 2G are arranged to partially overlap with the third end part of the detection row wiring 3 and the fourth end part of the floating wiring 3F in a plan view, respectively. Further, the dummy connection wirings 3G and 2G of the different wiring layers are arranged to intersect. Further, dummy connection wirings 2G and 3G are both in a floating state. Also, the dummy connection wiring 3G is inclined at −45° with respect to the column direction y, and the dummy connection wiring 2G is inclined at +45° with respect to the column direction y.

As illustrated in FIG. 38C, the touch screen 1 includes a dummy connection wiring 2K (a second dummy wiring) in a separation portion (a separation place U) at a boundary of the block areas R1 and R2. That is, the touch screen 1 includes, in a separation portion (a separation place U) between a third end part of the detection row wiring 3 provided in the one block area R1 and a fourth end part of the detection row wiring 3 provided in the other block area R2, the dummy connection wiring 2K formed in a different wiring layer from the third and fourth end part.

Also, both end parts of the dummy connection wiring 2K are arranged to partially overlap with the third and fourth end parts of the detection row wiring 3 in a plan view, respectively. Further, the dummy connection wiring 2K is a branch wiring of the detection column wiring 2, and is inclined at +45° with respect to the column direction y.

Further, the touch screen 1 includes a dummy connection wiring 3K (a first dummy wiring) in a separation portion (a separation place W) at a boundary of the block areas C1 and C2, as illustrated in FIG. 38D. That is, the touch screen 1 includes, in a separation portion (separation place W) between a first end part of the detection column wiring 2 provided in the one block area C1 and a second end part of the detection column wiring 2 provided in the other block area C2, the dummy connection wiring 3K formed in a different wiring layer from the first and second end parts.

Also, both of the end parts of the dummy connection wiring 3K are arranged to partially overlap with the first and second end parts of detection column wiring 2 in a plan view, respectively. Further, the dummy connection wiring 3K is a branch wiring of the detection row wiring 3, and is inclined at −45° with respect to the column direction y.

As described above, in the present preferred embodiment, the dummy connection wirings are provided for a non-coupling portion of the inclined wiring, such that non-uniformity of the wiring pattern cannot be easily visible. Further, although not described herein, even when a dummy connection wiring is included in a separation portion between the floating wirings 2F or a separation portion between the floating wirings 3F, it is possible to obtain effects similar to those described above.

Further, it is desirable that the detection column wiring 2 and the detection row wiring 3 (including the branch wirings 2e and 3e) described in the first to fifth preferred embodiments all be formed with substantially the same line width. In this configuration, since transmittance or reflectance of the entire detection column wiring 2 and the entire detection row wiring 3 can be made uniform, it is possible to prevent the block area C1 from being visible. Further, it is desirable that a width of the wirings be 10 μm or less so that the wirings themselves constituting the detection column wiring 2 and the detection row wiring 3 are not visible.

In each preferred embodiment described above, the grid A has been described as including a total of four block areas, i.e., the two block areas C1 and C2 in which the detection column wiring 2 is provided and the two block areas R1 and R2 in which the detection row wiring 3 is provided. However, the number of the block areas constituting the grid A is not limited to 2 respectively, and the block areas in which the detection column wiring 2 is provided and the block areas in which detection row wiring 3 is provided may include the same even number of block areas and may be arranged in a checker pattern.

Sixth Preferred Embodiment

In a sixth preferred embodiment of the present invention, a liquid crystal display device in which the touch panel 100 and a liquid crystal display panel 61 are integrally formed by bonding the touch screen 1 described above to the liquid crystal display panel 61, which is a display panel, will be described.

Figure 39:
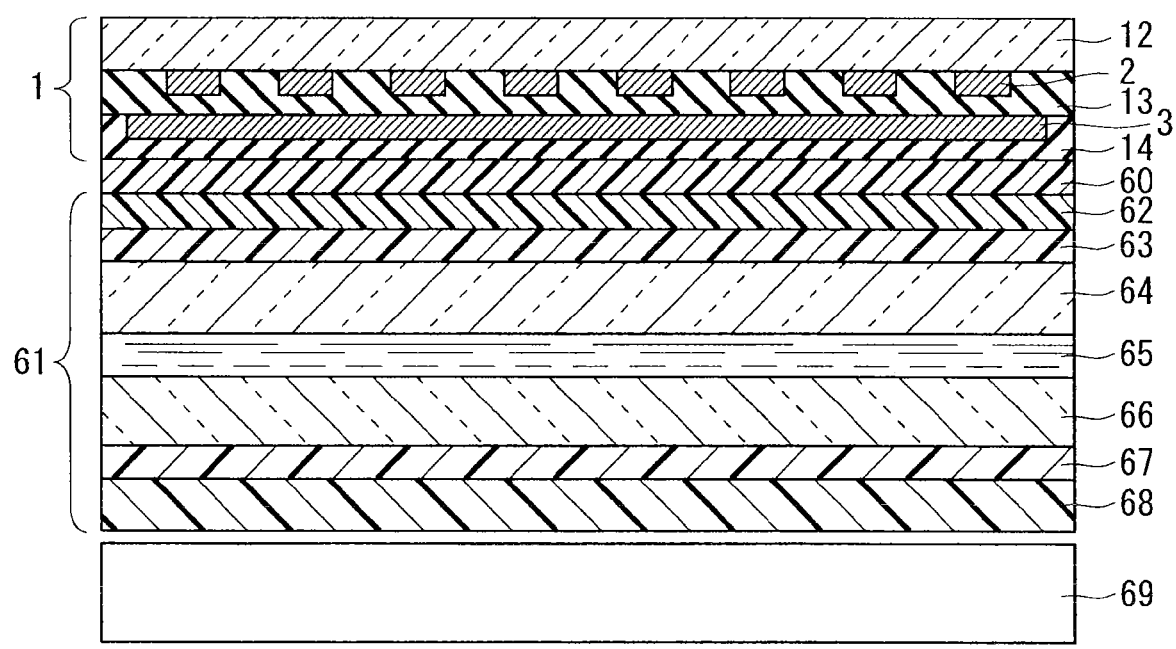
FIG. 39 is a cross-sectional view illustrating a configuration of a liquid crystal display device according to a sixth preferred embodiment.

FIG. 39 is a cross-sectional view illustrating a configuration of the liquid crystal display device according to the present preferred embodiment. This liquid crystal display device includes the touch panel 100 including a touch screen 1, which is illustrated in FIG. 14, an adhesion layer 60, the liquid crystal display panel 61, and a backlight 69. Further, the FPC 17 and the controller board 18 of the touch panel 100 are not illustrated in FIG. 39, for convenience of illustration.

The liquid crystal display panel 61 includes a polarizing plate 62, an adhesion layer 63, a color filter substrate 64, a liquid crystal layer 65, a TFT array substrate 66, an adhesion layer 67, and a polarizing plate 68. Hereinafter, an upper side in FIG. 39 is referred to as one side in a thickness direction, and a lower side in FIG. 39 is referred to as the other side in the thickness direction.

The color filter substrate 64 includes a color filter, a black matrix, a transparent electrode, and an orientation film (none of which is shown) formed on a glass substrate. The TFT array substrate 66 includes a switching element such as a thin film transistor (TFT) (which is not illustrated) formed on a glass substrate. The liquid crystal layer 65 is interposed between the color filter substrate 64 and the TFT array substrate 66 and includes, for example, twisted nematic (TN) liquid crystal.

The polarizing plate 68 is adhered and fixed to the other surface in a thickness direction of the TFT array substrate 66 by the adhesion layer 67. Similarly, the polarizing plate 62 is adhered and fixed to the one surface in a thickness direction of the color filter substrate 64 by the adhesion layer 63. Further, the backlight 69 that is a light source is arranged at a rear side (the other side in the thickness direction) of the liquid crystal display panel 61.

Further, the liquid crystal display panel 61 is mounted on the touch screen 1 of the touch panel 100. In the present preferred embodiment, the touch screen 1 is adhered and fixed to a front side of the liquid crystal display panel 61 (here, one surface in a thickness direction of the polarizing plate 62) by the adhesion layer 60.

Thus, in the liquid crystal display device according to the present preferred embodiment, the touch screen 1 is adhered and fixed to the front side of the liquid crystal display panel 61 to be integrally formed. Accordingly, a mechanism for holding the touch screen 1, which is necessary in related art, can be omitted, and the entire liquid crystal display device can be made thin. Further, for example, dust can be suppressed from entering a gap between the touch screen 1 and the liquid crystal display panel 61, and negative influence of the dust on the display can be suppressed.

Meanwhile, a signal according to an image to be displayed (hereinafter referred to as "an image signal") is input from an external driver circuit, which is not illustrated, to the TFT array substrate 66 illustrated in FIG. 39. A TFT formed for each pixel on the TFT array substrate 66 controls an applied voltage of the liquid crystal layer 65 according to the input image signal, and changes an arrangement direction of liquid crystal molecules of the liquid crystal layer 65.

An incident light from the backlight 69 passes through the polarizing plate 68 and becomes a linearly polarized light, which passes through the liquid crystal layer 65. Accordingly, a vibration direction is bent according to a signal of an image to be displayed. Also, the light whose vibration direction is bent passes through a color filter formed in the color filter substrate 64, so that the light is divided into lights of three primary colors, which pass through the polarizing plate 62 at a front side, resulting in a light having light strength according to the image signal. Further, the light passing through the polarizing plate 62 passes through the touch screen 1 at the front and is visible as a display light to a user.

Thus, the liquid crystal display device performs desired display according to an image signal by controlling the transmittance of the light from the backlight 69. Further, the touch panel 100 including the touch screen 1 calculates a touch coordinate value based on a change in an oscillation period, and outputs the calculated touch coordinate value as touch coordinate data.

Here, in the present preferred embodiment, the liquid crystal display panel 61 is mounted on the touch screen 1 in a state in which the column direction y of the touch screen 1 and the column direction of the pixel pattern in the liquid crystal display panel 61 are parallel to each other, and the row direction x of the touch screen 1 and the row direction of the pixel pattern in the liquid crystal display panel 61 are parallel to each other.

With the liquid crystal display device according to the present preferred embodiment, the zigzag wiring of each of the detection column wiring 2 and the detection row wiring 3 is arranged in an oblique direction inclined with respect to an arrangement direction of the pixel pattern, for each pixel. Accordingly, some of the pixels of the liquid crystal display panel 61 can be uniformly covered with the detection column wiring 2 and the detection row wiring 3. As a result, the transmittance when the display light output from the entire liquid crystal display panel 61 passes through the touch screen 1 can be made uniform and the generation of the moiré fringes can be suppressed.

While the invention has been shown and described in detail, the foregoing description is in all aspects illustrative and not restrictive. It is therefore understood that numerous modifications and variations can be devised without departing from the scope of the invention.

What is claimed is:

1. A touch screen comprising:
   a transparent substrate; and
   a bundle of rectangular wirings in a column direction including a plurality of detection column wirings that are electrically connected in common, and a bundle of rectangular wirings in a row direction including a plurality of detection row wirings that are electrically connected in common, said bundle of wirings in the column direction and said bundle of wirings in the row direction being formed on said transparent substrate,
   wherein a plurality of block areas each having a rectangular shape and obtained by dividing an intersection area in which said bundle of wirings in the column direction and said bundle of wirings in the row direction intersect in a plan view are defined, only said detection column wirings including a plurality of basic wiring patterns repeatedly arranged in the row direction and the column direction or only said detection row wirings including a plurality of basic wiring patterns repeatedly arranged in the row direction and the column direction is provided in each block area, except for corners of said block areas, and said detection column wirings and said detection row wirings in each block area includes a plurality of more than two inclined parts inclined by a same angle or an opposite angle with respect to said column direction, and at least two of said plurality of more than two inclined parts by the same angle or the opposite angle extend outside of the corresponding block area to connect said detection column wirings or said detection row wirings in the corresponding block area to said detection column wirings or said detection row wirings, respectively, in a diagonally neighboring block area.

2. The touch screen according to claim 1, wherein first block areas in said plurality of block areas in each of which only said detection column wirings are provided and second block areas in said plurality of block areas in each of which only said detection row wirings are provided are alternately arranged in a column direction and a row direction.

3. The touch screen according to claim 2, wherein one of said detection column wirings that diagonally connects between said first block areas that are diagonally adjacent and one of said detection row wirings that diagonally connects between said second block areas that are diagonally adjacent in a complementary manner with said first block areas intersect three-dimensionally in said intersection area.

4. The touch screen according to claim 3, wherein a three-dimensional intersection between each of said detection column wirings and each of said detection row wirings is included only at one corresponding position in said intersection area.

5. The touch screen according to claim 1,
wherein said detection column wirings in each block area includes:
a first inclined part repeatedly arranged with a predetermined pitch in said column direction and said row direction and inclined at a first angle with respect to said column direction; and
a second inclined part repeatedly arranged with said predetermined pitch in said column direction and said row direction and inclined in a direction opposite to said first inclined part with respect to said column direction, and
said detection row wirings in each block area includes:
a third inclined part repeatedly arranged with said predetermined pitch in said column direction and said row direction and inclined at a second angle with respect to said row direction; and
a fourth inclined part repeatedly arranged with said predetermined pitch in said column direction and said row direction and inclined in a direction opposite to said third inclined part with respect to said row direction.

6. The touch screen according to claim 5, wherein:
said detection column wirings in each block area includes first and second detection column wirings having a line symmetrical relationship, and
said detection row wirings in each block area includes first and second detection row wirings having a line symmetrical relationship.

7. The touch screen according to claim 5, wherein:
said first inclined part and said second inclined part are perpendicular to each other, and
said third inclined part and said fourth inclined part are perpendicular to each other.

8. The touch screen according to claim 5, wherein:
said first inclined part and said second inclined part intersect at a midpoint, and
said third inclined part and said fourth inclined part intersect at a midpoint.

9. The touch screen according to claim 6, wherein:
said detection column wirings in each block area further includes a first branch wiring that connects said first detection column wiring with said second detection column wiring, and
said detection row wirings in each block area further includes a second branch wiring that connects said first detection row wiring with said second detection row wiring.

10. A touch screen comprising:
a transparent substrate;
a bundle of rectangular wirings in a column direction including a plurality of detection column wirings that are electrically connected in common, and a bundle of rectangular wirings in a row direction including a plurality of detection row wirings that are electrically connected in common, said bundle of wirings in the column direction and said bundle of wirings in the row direction being formed on said transparent substrate;
a first floating wiring formed in the same wiring layer as said bundle of wirings in the row direction and not connected with said bundle of wirings in the column direction and said bundle of wirings in the row direction; and
a second floating wiring formed in the same wiring layer as said bundle of wirings in the column direction and not connected with said bundle of wirings in the column direction and said bundle of wirings in the row direction,
wherein a plurality of block areas each having a rectangular shape and obtained by dividing an intersection area in which said bundle of wirings in the column direction and said bundle of wirings in the row direction intersect in a plan view are defined,
only said detection column wirings and said first floating wiring including a plurality of basic wiring patterns repeatedly arranged in the row direction and the column direction or only said detection row wirings and said second floating wiring including a plurality of basic wiring patterns repeatedly arranged in the row direction and the column direction are provided in each block area, except for corners of said block areas,
first block areas in said plurality of block areas in each of which said detection column wirings and said first floating wiring are provided and second block areas in said plurality of block areas in each of which said detection row wirings and said second floating wiring are provided are alternately arranged in a column direction and a row direction, and
said detection column wirings and said detection row wirings in each block area include a plurality of more than two inclined parts inclined by a same angle or an opposite angle with respect to said column direction, and at least two of said plurality of more than two inclined parts by the same angle or the opposite angle extend outside of the corresponding block area to connect said detection column wirings or said detection row wirings in the corresponding block area to said detection column wirings or said detection row wirings, respectively, in a diagonally neighboring block area.

11. The touch screen according to claim 10, wherein:
first block areas in said plurality of block areas in each of which only said detection column wirings are provided and second block areas in said plurality of block areas in each of which only said detection row wirings are provided are alternately arranged in a column direction and a row direction; and
one of said detection column wirings that diagonally connects between said first block areas that are diagonally adjacent and one of said detection row wirings that diagonally connects between said second block areas that are diagonally adjacent in a complementary manner with said first block areas intersect three-dimensionally in said intersection area.

12. The touch screen according to claim 11, wherein three-dimensional intersection between each of said detection column wirings and each of said detection row wirings is included only at one corresponding position in said intersection area.

13. The touch screen according to claim 10,
wherein said detection column wirings in each block area includes:
a first inclined part repeatedly arranged with a predetermined pitch in said column direction and said row direction and inclined at a first angle with respect to said column direction; and
a second inclined part repeatedly arranged with said predetermined pitch in said column direction and said row direction and inclined in a direction opposite to said first inclined part with respect to said column direction,
said detection row wirings in each block area includes:
a third inclined part repeatedly arranged with said predetermined pitch in said column direction and said row direction and inclined at a second angle with respect to said row direction; and
a fourth inclined part repeatedly arranged with said predetermined pitch in said column direction and said row direction and inclined in a direction opposite to said third inclined part with respect to said row direction,
said first floating wiring in each block area includes inclined parts similar to said first and second inclined parts, and
said second floating wiring in each block area includes inclined parts similar to said third and fourth inclined parts.

14. The touch screen according to claim 13, wherein:
said detection column wirings in each block area includes first and second detection column wirings having a line symmetrical relationship,
said detection row wirings in each block area includes first and second detection row wirings having a line symmetrical relationship,
said first floating wiring in each block area includes first and second partial floating wirings having a line symmetrical relationship, and
said second floating wiring in each block area includes third and fourth partial floating wirings having a line symmetrical relationship.

15. The touch screen according to claim 13, wherein:
said first inclined part and said second inclined part are perpendicular to each other, and
said third inclined part and said fourth inclined part are perpendicular to each other.

16. The touch screen according to claim 13, wherein:
said first inclined part and said second inclined part intersect at a midpoint, and
said third inclined part and said fourth inclined part intersect at a midpoint.

17. The touch screen according to claim 14, wherein:
said detection column wirings in each block area further includes a first branch wiring that connects said first detection column wiring with said second detection column wiring,
said detection row wirings in each block area further includes a second branch wiring that connects said first detection row wiring with said second detection row wiring,
said first floating wiring in each block area further includes a third branch wiring that connects said first partial floating wiring with said second partial floating wiring, and
said second floating wiring in each block area further includes a fourth branch wiring that connects said third partial floating wiring with said fourth partial floating wiring.

18. The touch screen according to claim 10, comprising, in a boundary between two said adjacent block areas, a first dummy wiring formed in a separation portion between a first end part of said detection column wirings or the second floating wiring provided in one of said adjacent block areas and a second end part of said detection column wirings or said second floating wiring provided in the other block area, the first dummy wiring being formed in a different wiring layer from said first and second end parts.

19. The touch screen according to claim 18, wherein both end parts of said first dummy wiring partially overlap with said first and second end parts in a plan view, respectively.

20. The touch screen according to claim 10, comprising, in a boundary between two said adjacent block areas, a second dummy wiring formed in a separation portion between a third end part of said detection row wirings or the first floating wiring provided in one of said adjacent block areas and a fourth end part of said detection row wirings or said first floating wiring provided in the other block area, the second dummy wiring being formed in a different wiring layer from said third and fourth end parts.

21. The touch screen according to claim 20, wherein both end parts of said second dummy wiring partially overlap with said third and fourth end parts in a plan view, respectively.

22. A touch panel comprising:
the touch screen according to claim 1;
a switch circuit configured to sequentially select each of said plurality of bundles of wirings in the column direction and each of said plurality of bundles of wirings in the row direction; and
a detection processing circuit configured to perform a process of calculating touch coordinates in said touch screen indicating a touch position of a pointer that touches said touch screen, based on a result of detecting capacitance formed between said bundle of wirings in the column direction selected by said switch circuit and said pointer, and capacitance formed between said bundle of wirings in the row direction selected by said switch circuit and said pointer.

23. A touch panel comprising:
the touch screen according to claim 10;
a switch circuit configured to sequentially select each of said plurality of the bundle of wirings in the column direction and each of said plurality of the bundle of wirings in the row direction; and a detection processing circuit configured to perform a process of calculating touch coordinates in said touch screen indicating a touch position of a pointer that touches said touch screen, based on a result of detecting capacitance formed between said bundle of wirings in the column direction selected by said switch circuit and said pointer, and capacitance formed between said bundle of wirings in the row direction selected by said switch circuit and said pointer.

24. A touch panel comprising:
the touch screen according to claim 1;
a switch circuit configured to sequentially select each of said plurality of bundles of wirings in the column direction and each of said plurality of bundles of wirings in the row direction; and
a detection processing circuit configured to perform a process of calculating touch coordinates in said touch screen indicating a touch position of a pointer, based on a result of detecting a change in mutual-capacitance between said bundle of wirings in the column direction and said bundle of wirings in the row direction selected by said switch circuit according to touch of said pointer to said touch screen.

25. A touch panel comprising:
the touch screen according to claim 10;
a switch circuit configured to sequentially select each of said plurality of bundles of wirings in the column direction and each of said plurality of bundles of wirings in the row direction; and
a detection processing circuit configured to perform a process of calculating touch coordinates in said touch screen indicating a touch position of a pointer, based on a result of detecting a change in mutual-capacitance between said bundle of wirings in the column direction and said bundle of wirings in the row direction selected by said switch circuit according to touch of said pointer to said touch screen.

26. A display device comprising:
the touch panel according to claim 22; and
a display panel mounted on said touch screen of said touch panel.

27. A display device comprising:
the touch panel according to claim 23; and
a display panel mounted on said touch screen of said touch panel.

28. A display device comprising:
the touch panel according to claim 24; and
a display panel mounted on said touch screen of said touch panel.

29. A display device comprising:
the touch panel according to claim 25; and
a display panel mounted on said touch screen of said touch panel.

30. The touch screen according to claim 1, wherein:
said detect column wirings or said detect row wirings in each block area includes a plurality of more than two inclined parts inclined by a same angle or an opposite angle with respect to said column direction; and
all of the plurality of more than two inclined parts are arranged with a same predetermined pitch in said column direction and said row direction.

31. The touch screen according to claim 10, wherein:
said first and second floating wiring each include parts inclined by a same angle as at least a portion of the detection column wirings and at least a portion of the detection row wirings.

32. The touch screen according to claim 10, wherein:
first block areas in said plurality of block areas in each of which only said detection column wirings are provided and second block areas in said plurality of block areas in each of which only said detection row wirings are provided are alternately arranged in a column direction and a row direction; and
each of said first and second block areas includes plural unobstructed portions between parallel wirings, and a maximum distance in the unobstructed portions between each of the parallel wirings in a direction perpendicular to a respective parallel wiring is the same.

33. The touch screen according to claim 10, wherein:
first block areas in said plurality of block areas in each of which only said detection column wirings are provided and second block areas in said plurality of block areas in each of which only said detection row wirings are provided are alternately arranged in a column direction and a row direction; and
said first block areas have a same shape as said second block areas; and
said first and second floating wirings are arranged within a same portion of each of their respective block areas.

34. The touch screen according to claim 1, wherein
a shape of said detection column wirings included in each of said block areas is the same as a shape of said detection row wirings included in each of said block areas.

35. The touch screen according to claim 10, wherein
a shape including said detection column wirings and said first floating wiring included in each of said block areas is the same as a shape including said detection row wirings and said second floating wiring included in each of said block areas.

36. The touch screen according to claim 18, wherein the first dummy wiring is a branch wiring of said detection column wirings.

37. The touch screen according to claim 20, wherein the second dummy wiring is a branch wiring of said detection row wirings.

38. The touch screen according to claim 1, wherein each of the plurality of basic wiring patterns is connected at each end to a different one of the plurality of basic wiring patterns in each of said block areas, and the plurality of basic wiring patterns in each of said block areas includes a first inclined part, a second inclined part, a vertical coupling portion, and a horizontal coupling portion.

39. The touch screen according to claim 10, wherein each of the plurality of basic wiring patterns is connected at each end to a different one of the plurality of basic wiring patterns in each of said block areas, and the plurality of basic wiring patterns in each of said block areas includes a first inclined part, a second inclined part, a vertical coupling portion, and a horizontal coupling portion.

\* \* \* \* \*